(12) United States Patent
Kelleher

(10) Patent No.: US 11,890,162 B2
(45) Date of Patent: Feb. 6, 2024

(54) ORTHODONTIC DISTALIZATION AND MESIALIZATION APPARATUS AND METHOD

(71) Applicant: Robert Kelleher, Folsom, CA (US)

(72) Inventor: Robert Kelleher, Folsom, CA (US)

(73) Assignee: Robert Kelleher, Folsom, CA (US)

( * ) Notice: Subject to any disclaimer, the term of this patent is extended or adjusted under 35 U.S.C. 154(b) by 0 days.

(21) Appl. No.: 17/240,951

(22) Filed: Apr. 26, 2021

(65) Prior Publication Data
US 2021/0244504 A1 Aug. 12, 2021

Related U.S. Application Data

(63) Continuation of application No. PCT/US2019/058397, filed on Oct. 28, 2019.

(Continued)

(51) Int. Cl.
*A61C 7/10* (2006.01)
*A61C 7/08* (2006.01)

(52) U.S. Cl.
CPC . *A61C 7/10* (2013.01); *A61C 7/08* (2013.01)

(58) Field of Classification Search
CPC .................................. A61C 7/10; A61C 7/08
(Continued)

(56) References Cited

U.S. PATENT DOCUMENTS 5,439,377 A * 8/1995 Milanovich .............. A61C 7/10
433/7

7,029,472 B1 * 4/2006 Fortin ................ A61B 17/7014
606/57

(Continued)

FOREIGN PATENT DOCUMENTS

| AU | 199671698 B2 | 7/1999 | |
| CA | 3005178 A * | 6/2017 | ............ A61C 7/02 |

(Continued)

OTHER PUBLICATIONS

Kyriacou, P.A. et al., "Compliance monitor for use with removable orthodontic headgear appliances," Med. & Biol. Eng. & Comput., (Jan. 1997) 35, p. 57-60. [online] Springer Link, <https://doi.org/10.1007/BF02510393> [retrieved Nov. 17, 2022]. (Year: 1997).*

(Continued)

*Primary Examiner* — Amy R Sipp
*Assistant Examiner* — Courtney N Huynh
(74) *Attorney, Agent, or Firm* — Perkins Coie LLP

(57) ABSTRACT

Disclosed are apparatuses and techniques for distalizing, mesializing and/or expanding teeth in the upper or lower dental arch of a patient's mouth to make room for crowded or protruded teeth located in the anterior arch region to distally and laterally shift into. In some aspects, an apparatus includes a body; a first arm coupled to an adjustment mechanism of the body and attachable to a molar; a second arm coupled to the apparatus body and attachable to a non-molar tooth; and an anchorage device attachable to a bone in the mouth, which the first arm is configured to transfer a force onto the molar when the adjustment mechanism is actuated to cause movement of the molar in the dental arch, and which the anchorage device is operable to positionally stabilize the body and the second arm to prevent movement of the non-molar tooth in the dental arch.

19 Claims, 32 Drawing Sheets

Related U.S. Application Data

(60) Provisional application No. 62/751,443, filed on Oct. 26, 2018.

(58) Field of Classification Search
 USPC .......................................................... 433/7
 See application file for complete search history.

(56) References Cited

U.S. PATENT DOCUMENTS

| | | | |
|---|---|---|---|
| 7,074,036 | B1 | 7/2006 | Keles |
| 8,771,149 | B2 | 7/2014 | Rahman et al. |
| 8,939,762 | B2 | 1/2015 | Lowe |
| 9,502,730 | B2 | 11/2016 | Wang et al. |
| 9,597,162 | B2 | 3/2017 | Nobrega |
| 9,795,456 | B2 | 10/2017 | Bindayel |
| 10,172,691 | B2 | 1/2019 | Dolfi |
| 2008/0020339 | A1 | 1/2008 | Papadopoulos |
| 2010/0152734 | A1* | 6/2010 | Mulone ............... A61B 17/663 606/60 |
| 2011/0143300 | A1 | 6/2011 | Villaalba |
| 2012/0202164 | A1 | 8/2012 | Hsu et al. |
| 2013/0140289 | A1 | 6/2013 | Baratier et al. |
| 2013/0252195 | A1 | 9/2013 | Popat |
| 2015/0056566 | A1 | 2/2015 | Moon et al. |
| 2017/0056131 | A1 | 3/2017 | Alauddin et al. |
| 2017/0128162 | A1 | 5/2017 | Dalla-Bona |
| 2017/0252140 | A1 | 9/2017 | Murphy et al. |
| 2017/0340411 | A1 | 11/2017 | Askselrod |
| 2017/0354482 | A1* | 12/2017 | Kim .......................... A61C 7/10 |
| 2018/0000565 | A1 | 1/2018 | Shanjani et al. |
| 2018/0008378 | A1 | 1/2018 | Raghavan et al. |
| 2020/0337809 | A1 | 10/2020 | Kim |

FOREIGN PATENT DOCUMENTS

| | | | |
|---|---|---|---|
| EP | 0961994 | A1 | 12/1999 |
| EP | 3348225 | A1 | 7/2018 |
| WO | WO-0226155 | A2 * | 4/2002 ............... A61C 7/00 |
| WO | 2003096922 | A1 | 11/2003 |
| WO | 2005018480 | A1 | 3/2005 |
| WO | 2007137439 | A1 | 12/2007 |
| WO | 2009013371 | A1 | 1/2009 |
| WO | 2016061279 | A1 | 4/2016 |
| WO | 2017218951 | A1 | 12/2017 |
| WO | 2018-117582 | A1 | 6/2018 |
| WO | 2019063405 | A1 | 4/2019 |

OTHER PUBLICATIONS

Lantada, Andres Diaz, et al. "Novel system for bite-force sensing and monitoring based on magnetic near field communication," Sensors (12), Apr. 25, 2012, p. 11544-11558 [online] Sensors, <https://doi.org/10.3390/s120911544> [retrieved Nov. 17, 2022]. (Year: 2012).*
Young, Lee W. International Application No. PCT/US2019/041442, International Search Report and Written Opinion dated Oct. 1, 2019, p. 1-8 [online]. Global Dossier [retrieved Nov. 17, 2022]. (Year: 2019).*
European Application No. 19877458.0, Extended European Search Report dated Oct. 28, 2021, pp. 1-7.
International Application No. PCT/US19/58397 International Search Report and Written Opinion dated Feb. 18, 2020, pp. 1-21.
Brunetto, Daniel Paludo, et al. "Non-Surgical treatment of transverse deficiency in adults using Microimplant-assisted Rapid Palatal Expansion (MARPE)" Dental Press J Orthod. Jan.-Feb. 2017;22(1):110-25.
Ludwig, Björn et al. "The Skeletal Frog Appliances for Maxillary Molar Distalization" JCO, Inc., vol. XLV, No. 2, pp. 77-84.
Young, Lee W. International Application No. PCT/US2019/041442, International Search Report and Written Opinion dated Oct. 1, 2019, pp. 1-8.
Kyriacou, P.A. et al., "Compliance Monitor for use with removable orthodontic headgear appliances," Med. & Biol. Eng. & Comput., (Jan. 1997) 35, pp. 57-60.
Lapatki, B.G., et al. "Smart Bracket for Multi-dimensional Force and Moment Measurement," Journal of Dental Research, 86(1), Jan. 2007, pp. 73-78.
Lantada, Andres Diaz, et al. "Novel System for Bite-Force Sensing and Monitoring Based on Magnetic Near Field Communication," Sensors (12), Apr. 25, 2012, pp. 11544-11558.
3M Science Applied to Life, 3M™ Unitek™ TAD O-Cap, Apr. 26, 2021. https://www.3m.com/3M/en_US/company-us/all-3m-products/~/3M-Unitek-TAD-O-Cap/?N=5002385+3289441451&rt=rud, pp. 1-2.
3M™ Unitek™M TAD O-Cap, Apr. 26, 2021. https://www.3m.com/3M/en_US/company-us/all-3m-products/~/3M-Unitek-TAD/?N=5002385+3289444957&rt=rud, pp. 1-2.
Great Lakes, MSE—Maxillary Skeletal Expander, Apr. 26, 2021. https://www.greatlakesdentaltech.com/mse-maxillary-skeletal-expander.html, pp. 1-3.
""European Application No. 19877458 Examination Report dated Aug. 14, 2023, pp. 1-25.

* cited by examiner

Tabular Value Read-Out

| | LR | 6 | 5 | 4 | 3 | 2 | 1 | 1 | 2 | 3 | 4 | 5 | 6 | LL |
|---|---|---|---|---|---|---|---|---|---|---|---|---|---|---|
| Pre-Tx ↓1's + 1 (mm) | | | | | | | | | | | | | | |
| | | | | | | | | | | | | | | |
| IPR 2 - 2 (2 mm) | | | | | | .4 | .4 | .4 | .4 | | | | | |
| IPR 3d - 6m (1.2 mm) | | .2 | .4 | .4 | .4 | | | | | .4 | .4 | .4 | .2 | |
| XT | | | | | | | | | | | | | | |
| Projected ↓1's + 0 (mm) | | | | | | | .4 | .4 | | | | | | |

☐ Align (No IPR, Xt, Cl II Correction)   ☒ Correct to Class I Canine

☒ TAD   ☐ No TAD   ☒ COS ___ mm

FIG. 9C

Diagnositic (Input - Front End)

- ☐ Full Class II
- ☐ 3/4 Class II
- ☒ End-On Class II

Curve of Spee
- ☐ 1 mm
- ☒ 2 mm

Lower Crowding  2  mm

☒ Align (No IPR, No Xt)

☒ Correct to Class I Canine

☒ TAD  ☐ No TAD

☒ COS ____ mm

☐ Type I
Normal Symphysis (Example Graphic)

☒ Type II
Med. Symphysis

☐ Type III
Thin Symphysis (Example Graphic)

VTO

Pre-Tx Lower 1 to NB:  3  mm

Tx Goal Lower 1 to NB:  4  mm

FIG. 9D

ORTHODONTIC DISTALIZATION AND MESIALIZATION APPARATUS AND METHOD

CROSS-REFERENCE TO RELATED APPLICATIONS

Under 35 U.S.C. § 120, this application is a continuation-in-part of claims priorities to and benefits of International Patent Application No. PCT/US2019/058397 titled "ORTHODONTIC DISTALIZATION AND MESIALIZATION APPARATUS AND METHOD," filed on Oct. 28, 2019, which claims priorities to and benefits of U.S. Provisional Patent Application No. 62/751,443 entitled "ORTHODONTIC MOLAR DISTALIZATION AND EXPANSION APPARATUS AND METHOD" filed on Oct. 26, 2018. The entire contents of the aforementioned patent applications are incorporated by reference as part of the disclosure of this patent document.

TECHNICAL FIELD

This patent document is directed generally to orthodontic articles.

BACKGROUND

The goal of orthodontic treatment is not only to create a beautiful smile, but also a functional and healthy bite. Put another way, the result of an orthodontic treatment should be well-aligned teeth that look great while also allowing the patient's teeth and jaw movements to relate within a standard that supports jaw joint health, enamel integrity, airway patency, periodontal integrity, as well as head and neck muscle balance and comfort. Notably, orthodontic care that lacks a functional and physiologic bite correction can threaten or limit the long-term durability of the patient's teeth, optimal anatomical relationships of muscles, jaw joints, enamel integrity and periodontal status due to over-expansion of dental arches, compensatory parafunctional grinding, and/or clenching. Poor anatomical relationships can negatively impact breathing function, chewing function, periodontal health and comfort, as well. A corrected bite tends to also reduce the risk of negative nutritional effects secondary to poor function, some speech compromises, some headache pain, quality of life setbacks from muscle pain or fatigue, and lowering of self-esteem.

SUMMARY

Disclosed are articles, devices, systems and methods for orthodontic distalization, mesialization, and/or expansion treatments.

In some aspects, an apparatus for distalization or mesialization of molars in an upper dental arch of a mouth includes an apparatus body having an adjustment-drive mechanism, the adjustment-drive mechanism including an actuatable component; a first arm coupled to the adjustment-drive mechanism of the apparatus body and attachable to a molar tooth in the upper dental arch; a second arm coupled to the apparatus body and attachable to a non-molar tooth of the upper dental arch; and an anchorage device coupled to the apparatus body and attachable to a bone in the mouth, wherein the first arm is configured to transfer a force onto the molar tooth when the adjustment-drive mechanism is actuated to cause movement of the molar tooth in the upper dental arch in a direction determined by actuation of the adjustment-drive mechanism, and wherein the anchorage device is operable to positionally stabilize the apparatus body and the second arm to reduce force potentially applied to the non-molar tooth to prevent movement of the non-molar tooth in the upper dental arch.

In some aspects, an apparatus for distalization or mesialization of molars in an upper dental arch of a mouth, including an apparatus body having an adjustment-drive mechanism, the adjustment-drive mechanism including an actuatable component; a set of posterior arms coupled to the adjustment-drive mechanism of the apparatus body and attachable to molar teeth in the upper dental arch, the set of posterior arms comprising (i) a first rigid arm that spans from the apparatus body to a first molar tooth and (ii) a second rigid arm that spans from the apparatus body to a second molar tooth; a set of anterior arms coupled to the apparatus body and attachable to non-molar teeth in the upper dental arch, the set of anterior arms comprising (i) a third rigid arm that spans from the apparatus body to a first non-molar tooth and (ii) a fourth rigid arm that spans from the apparatus body to a second non-molar tooth; and an anchorage device coupled to the apparatus body and attachable to a bone in the mouth, wherein the set of posterior arms are configured to transfer a force onto the molar teeth when the adjustment-drive mechanism is actuated to cause movement of the molar teeth in the upper dental arch in a direction determined by actuation of the adjustment-drive mechanism, and wherein the anchorage device is operable to positionally stabilize the apparatus body and the set of anterior arms to reduce force potentially applied to the non-molar teeth to prevent movement of the non-molar teeth in the upper dental arch.

In some aspects, an apparatus for distalization or mesialization of molars in an upper dental arch of a mouth, including a plastic aligner configured to fit in a patient's mouth; a set of anchorage devices coupled to the plastic aligner and attachable to a bone in the mouth; and attachment articles coupled to the plastic aligner and attachable to molar teeth and to non-molar, wherein the plastic aligner is configured to transfer a force onto the molar teeth to cause movement of the molar teeth in the upper dental arch, and wherein the set of anchorage devices are operable to positionally stabilize the non-molar teeth and reduce force potentially applied upon the non-molar teeth by the plastic aligner to prevent movement of the non-molar teeth in the upper dental arch.

In some aspects, a method for determining orthodontic treatment parameters and/or determining recommendations for orthodontic treatment options, including receiving, by a computing device, image data associated of an upper dental arch, a lower dental arch, or a combination of the upper and lower dental arches of a patient; determining, by the computing device, a set of quantitative prospective pre-treatment values by analyzing the image data; calculating, by the computing device, dynamic variables associated with a prospective orthodontic treatment procedure to determine teeth movement trajectories that keep aligned teeth on the pre-treatment dental arch; and generating, by the computing device, one or more prospective treatment plans displayable on the a display of the computing device that information indicative of a long-term result for the patient for the one or more of the prospective treatment plans based on the determined set of quantitative prospective pre-treatment value.

In some aspects, the disclosed embodiments include an apparatus for distalizing the molars in the upper dental arch of a patient's mouth. In some embodiments, the apparatus includes a body having an adjustment-drive mechanism, distalization arms coupled between the apparatus body and the patient's molars, anchoring arms coupled between the apparatus body and other teeth in an anterior region of the mouth, and an anchorage device coupled to the apparatus body and attachable to bone of the patient's mouth (e.g., the bone superior to the palate of the patient's mouth or buccal bone that supports teeth in the lateral regions of the patient's mouth), in which the anchorage device acts as a stable anchoring point for the apparatus to reduce the amount of force applied to other teeth in the upper dental arch. In some embodiments, the apparatus includes the distalization arms coupled between the apparatus and a patient's molars and anchoring arms that are connected to an anchorage device attached to the bone.

In some aspects, the disclosed embodiments include a method of correcting overcrowding in the patient's upper or lower dental arch using an apparatus that applies a force on the patient's upper or lower molars using arms spanning from a body of the apparatus and attached to the upper or lower molars to move the upper or the lower molars in the posterior direction to make room for teeth located in an anterior portion of the upper or lower dental arch, respectively, to shift distally into proper alignment, or to move the upper or the lower molars in the anterior direction to make room for teeth located in a posterior portion of the upper or lower dental arch, respectively, in which an anchoring device coupled to the apparatus body with anchoring arms acts as a stable anchoring point for the apparatus, which reduces the amount of force applied to other teeth in the upper or lower dental arch, respectively, during a distalization process or a mesialization process.

In some aspects, the disclosed embodiments include a method of correcting Class II overcrowding in the patient's upper dental arch using an apparatus that applies force on the upper posterior teeth using arms spanning from the apparatus body and attached to the upper posterior teeth to move the upper posterior teeth in the lateral direction to relieve crowding and to resolve a narrow upper jaw for a corrected bite. In some example implementations, if a Class II, non-surgical orthodontic diagnostic challenge is being resolved to form a Class I bite relationship, the Class II condition equates to dental crowding in both upper and lower dental arch. Treatment from Class II to Class I occlusion would require creation of posterior space to allow upper canines and molars to move relatively backward into a more corrected bite. Lower molars, located too far distal in relation to the upper arch, would require space for them to move forward without also forcing lower front teeth too forward relative to supporting bone for bite correction. In some aspects, the disclosed embodiments include an apparatus to control the vertical dimension by using temporary anchorage or anterior teeth to move posterior teeth in order to control vertical dimension. Resolving orthodontic problems means controlling all three axes of space, especially in Class II cases where the lower dentition is positioned too distally relative to upper dentition.

BRIEF DESCRIPTION OF THE DRAWINGS

FIGS. 8A-8C show images and diagrams illustrating some examples of detrimental long-term outcomes from distalization implemented using conventional orthodontic techniques and devices.

FIGS. 9A-9E show diagrams illustrating examples of a graphic user interface (GUI) provided by an example software application in accordance with embodiments of the present technology.

DETAILED DESCRIPTION

Figure 1A:
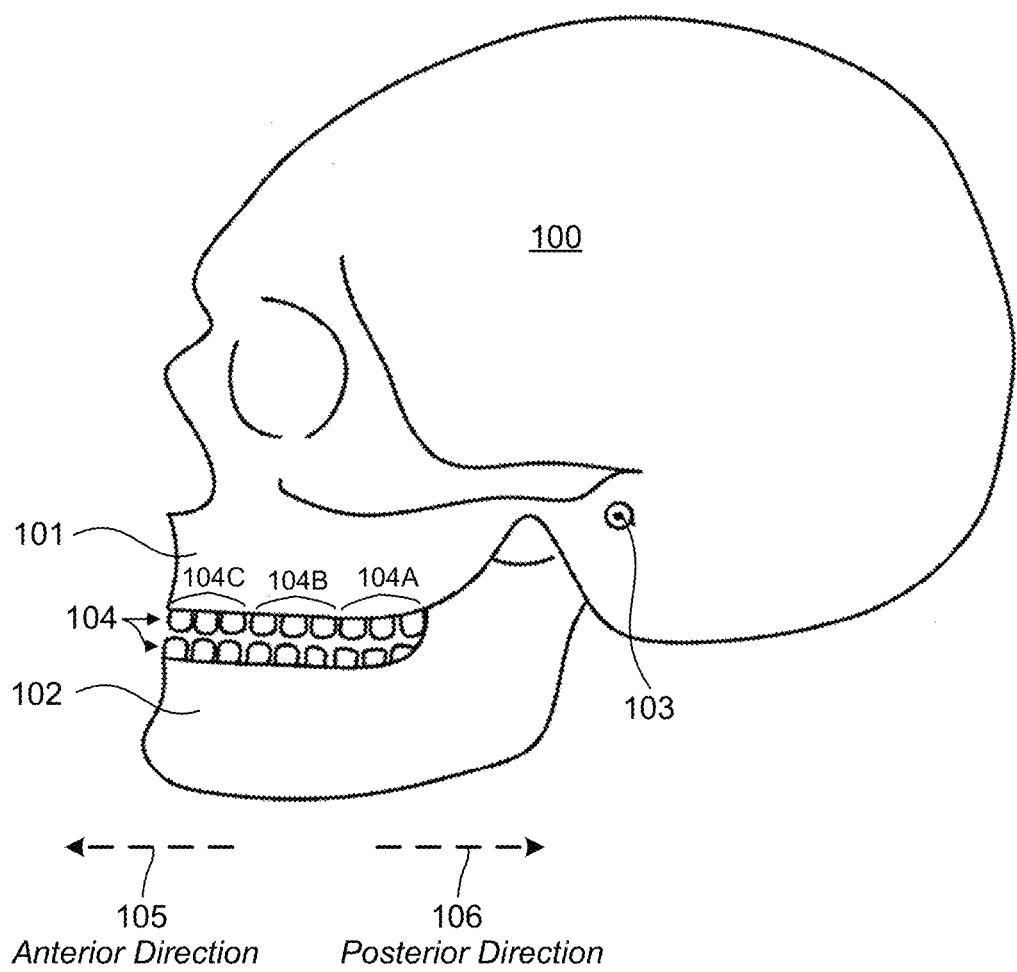
FIG. 1A shows an illustration of a skull having upper and lower dental arches.

Orthodontic therapy relies on an accurate diagnosis as a precursor to excellent results. Projected teeth to bone positions in the lower arch symphysis (i.e., the front aspect of the lower jaw) is of critical importance to planning treatment, as supporting bone is thinnest in the symphysis and bicuspid region of the lower arch, which limits the amount of space that the lower front teeth can be moved into while still maintaining a physiological relationship with the underlying bone and gingiva (i.e., gum tissue). 3D imaging reveals that nearly one third of all orthodontic patients have negligible alveolar bone in the symphysis for supporting the lower anterior and bicuspid teeth. Because of this, teeth cannot be appreciably moved forward or backward (or laterally for bicuspid teeth, for example) from pre-treatment equilibrium positions without causing some harmful collisions of roots with surrounding, hard cortical bone or without parts of roots moving entirely out of previously bone-supported positions. These new positions can lead to root resorption, root dehiscence, eventual gingival recession, or even subsequent loss of teeth if bone support is inadequate. Aligning crowded teeth will always move front teeth forward if crowding is not relieved by extraction, lateral expansion, distalization of posterior teeth, or reduction of teeth with via interproximal reduction (IPR) by sanding/removing portions of the teeth, and strategic planning. Appreciating an individual's unique bone anatomy and attendant constraints with boundaries is instrumental for not only a thorough diagnosis, but for prescribing treatment mechanics that respect the limits of anatomical support. With the shift from 2D to 3D x-ray imaging, more precise appliances that are simple and that have efficient mechanics will also be required to effectively preserve a closer pre-treatment equilibrium antero-postero (AP) position of lower incisors in patients having limited symphysis so that the lower incisors can be more closely centered in alveolar bone instead of violating cortical bone support limits. Anterior and bicuspid teeth that are not well-centered in alveolar bone at the end of treatment can appear clinically "normal" for some time but are often far from "normally" positioned in patients having very narrow alveolar bone, a reality that Cone Beam Computed Tomography (CBCT) reveals immediately and that subsequent gingival recession and/or root resorption can confirm.

In the absence of surgical assist, strict use of headgear, or of Temporary Anchorage Devices (TADs), which can provide stable anchorage and/or distalization of upper back teeth, there is far less probability that lower incisor positioning can be adjusted into ideal positions. Controlling upper molar positioning allows for the control of lower teeth positioning and for overall bite correction. Aside from headgear anchorage, historical orthodontic treatment has been limited by numerous force systems that push or pull from structures that were themselves moving due to Newton's 3rd Law, with no fixed reference point to gain finer control with mechanics. Using other moving structures as anchors often results in wasted space management and often misplaced teeth, especially lower incisors, which are often already positioned in thin bone. A single, fixed or removable appliance that first allows maxillary arch expansion, followed by distalization of the maxillary arch against a fixed anchorage, as well as control of the vertical dimension between upper and lower jaw using the fixed anchorage would simplify the demands of heretofore separate appliances (including multiple buccal or labial TADs that tend to be instable or multiple palatal arch appliances) to precisely control lower incisor AP position and to convert maximum available space gains for correcting alignment and malocclusions to Class I canines and incisors. Lacking control of all three orthodontic spatial planes precludes achieving acceptable coupling of anterior and posterior teeth.

Another historical challenge for attaining therapeutic success has been relying on inter-arch elastics and patient compliance to direct the forces for bite correction and the destination of lower anterior teeth. Headgear, elastics, and removable appliances are examples of how corrective forces are put into the voluntary hands of the patient, which is a statistically less-efficient path than one determined by a fixed, consistent appliance design/implementation under practitioner control. Relying on patient compliance is a less efficient path than employing fewer and simpler appliances that are fixed in the mouth and that have a therapeutic design that allows for consistency and greater practitioner control.

In orthodontics, consistency and control derives from forces being directed ultimately to and from one or more anchorage points, such as by TADs coupled to a patient's palate, for example, rather than multiple appliances that either rely more on patient compliance or that utilize other, movable teeth as anchorage. A reliable anchorage point (or points) conserves a demand for adding compensatory energy into orthodontic correction and increases the precision needed for correctly managing corrective forces. Lack of patient compliance can extend treatment time, which can significantly increase risks to the patient. Further, apparatuses (including unstable TADs placed in bone softer than the palatal midline) that are too numerous, inefficient and/or cumbersome can extend the term of orthodontic care with an increased risk of damage to enamel due to decay (e.g., around the orthodontic apparatuses), root resorption, or gingival recession away from roots moved too close to or through hard cortical bone boundaries. As an illustrative example, in Class II patients (i.e., retrusive lower jaw) with a very narrow AP mandibular symphysis, it is unfortunately not uncommon to violate bone boundaries by over-advancing lower anterior teeth (or over-retracting these teeth in extraction cases), and it is not uncommon for treatment to be dramatically extended due to patient non-compliance in wearing rubber bands to correct their bite. In Class II non-extraction treatment plans, for example, an orthodontist's preference may include moving maxillary posterior teeth 1-5 mm backward (distally) to both lessen the likelihood of forcing lower front teeth too far forward and relying on excess Class II elastics to correct the Class II bite. If upper molar distalization or basic anchorage control is not held, a greater probability of cortical plate violation by lower front teeth moving too far forward (or too far back in extraction cases) may occur due to inefficient use of any space gains form extraction of interproximal reduction/narrowing (IPR). Half of the space gained via IPR (e.g., to reduce the probability of lower root violations into cortical bone) is typically lost to space closure by back teeth moving forward into the gained space as a result of Newton's 3rd Law. Anterior anchorage, via TAD(s) control for example, can also be important in avoiding violation of lower lingual cortical bone due to over-retraction.

In recent years, 3D imaging is becoming more prevalent in dentistry, periodontics and orthodontics. In particular, 3D Tomography may highlight erroneous cortical bone/root violations in time, revealing past treatment indifference to a narrow symphysis foundation, with potential discovery of periodontal harm to patients and malpractice claims following the indifference. Though the orthodontist has had less means to precisely control root position within the center of supporting bone prior to new technology, the future will undoubtedly give rise to a new standard that meets increased precision for positions in line with precise 3D-diagnostic imagery demands. Unifying more precise VTO (Visualized Treatment Objective) standards by applying algorithms that involve TAD anchorage for force redirection, 3D imagery, and new appliances that incorporate fixed anchorage may well allow for more precise positioning of anterior teeth within physiologically healthy alveolar bone.

Higher VTO standards (perhaps closer to ±0.5 mm, not ±1 to 2 mm) may well follow advances in artificial intelligence and automation—perhaps even more prescient in the wake of self-directed, mail-order aligner treatment, with indifference to 3D-diagnostic imagery documenting the assumed, unsupervised effects of roots violating cortical bone. For example, in an end-on, bilateral Class II non-extraction case, performing upper molar distalization of 1.8 mm per side against TAD(s), and conserving, minimally, an otherwise 1.2 mm anchorage loss per quadrant after space-gain-sanding the widths of teeth in each quadrant, minimally, 6 mm of added available space can be produced per arch. This can result, for example, in lower anterior teeth being, minimally, 3 mm less forward than they would otherwise be without the 1.8 mm upper molar distalization, 1.2 mm sanding between canines and molars, and palatal TAD mechanics in each upper quadrant to conserve all space gain. For example, 1.2 mm IPR in the lower posterior quadrants allows lower molars to move 1.2 mm more forward relative to upper molars for resolving the Class II molar bite. This space gain allows upper canines to move 3 mm more distal relative to lower canines with upper molars moving distal 1.8 mm and lower molars moving 1.2 mm mesially relative to upper molars—for the Class II bite correction component. Put another way, in correcting an end-on, bilateral Class II case in this way, a periodontist would see, for example, nearly 3 mm greater thickness of bone in the supporting anterior mandibular symphysis with upper posterior teeth (e.g., molars) moving 1.8 mm backward and 1.2 mm effective sanding in each quadrant via anchorage control. In this manner of orthodontically resolving the above challenge, as compared to a more typical orthodontic treatment with inter-arch Class II elastics or springs often compromising the supporting bone and with reliance of patients to wear force auxillaries, treatment control, precision and efficiency can be better optimized. With reliable anchorage, orthodontic forces can be directed to where the force is desired, rather than accepting a reciprocal waste of force or energy in moving structures that were not preferred target structures to move. Reliable anchorage increases control of care that is more in the hands of the practitioner—and less with the patient. Importantly, distalization and anchorage control in Class II cases statistically shortens treatment time and reduces the likelihood of damage from protracted therapy. Also, for example, in a normal bite case of Class I occlusion, sanding 4 mm of enamel in an arch without anchorage control would waste 2 mm of space, e.g., due to Newton's 3rd Law causing lower anterior teeth to be moved 1 mm too forward within its supporting bone, e.g., compared to palatally-anchored control. Thus, controlling anchorage in both examples significantly reduces violation of symphysis cortical bone boundaries in thin symphysis phenotypes and reduces the tendency for protracted care due to relying on potentially inconsistent patient compliance.

As such, a systematic and simple orthodontic anchorage device that negates unwanted space loss and/or gain for more control in moving intended structures may be beneficial for orthodontic patients, and especially critical in thin jaw case types which is approximately 25% to 28% or more of all jaw phenotypes. Because it is envisioned that 3D imagery will invariably call for greater technological treatment execution to meet a commensurate a higher diagnostic standard of care, new approaches and devices are needed to precisely, safely, and efficiently provide orthodontic treatments for patients.

Disclosed are articles, devices, systems and methods for orthodontic distalization, mesialization, and/or expansion treatments for anterior and posterior movement of teeth. In some aspects, the disclosed embodiments include an apparatus for distalizing the molars in the upper dental arch of a patient's mouth. In some embodiments, the apparatus includes distalization arms coupled between the apparatus and a patient's molars and anchoring arms coupled between the apparatus and a temporary anchorage device screwed into the bone above the roof of the patient's mouth.

In some aspects, the disclosed embodiments include a method of correcting overcrowding or relative excess protrusion in the patient's Class II upper dental arch using an apparatus that applies a force on the patient's upper molars using distalization arms to move the molars in the posterior direction to make room for teeth located in the anterior arch regions to shift distally and thereby reducing Class II overjet, in which a temporary anchoring device coupled to the apparatus with anchoring arms acts as a stable anchoring point for the apparatus that limits the amount of force applied to other teeth in the upper dental arch during the distalization process.

FIG. 1A shows an illustration of a skull 100 for which the distalization of upper molars to reduce crowding or overjet of upper anterior teeth can be accomplished with an apparatus coupled to the upper molars and anchored with a temporary anchorage device attached to palatal alveolar bone. The skull 100 includes a mouth defined by an upper dental arch 101 and a lower dental arch 102 movably coupled to the skull 100 at a joint 103 such that the mouth can be opened and closed by rotating the lower dental arch 102 about the joint 103. The upper and lower dental arches 101 and 102 include teeth 104. The teeth 104 can include different types of teeth arranged in the arches, such that some of the teeth 104C (e.g., incisors) are positioned near the front of the skull 100, while other teeth 104B (e.g., cuspids, bicuspids) and 104A (molars) are positioned along the sides of the skull 100. For example, the teeth 104 include incisors and canines positioned near the front of the mouth and premolars and molars positioned along the sides of the mouth. Accordingly, the teeth 104 can be arranged within the mouth such that some of the teeth 104 are positioned further along an anterior direction 105 and some are positioned further along a posterior direction 106.

For many people, orthodontic problems such as crowding, spacing, protrusion, extra or missing teeth, and jaw growth problems can arise during the person's development. To correct these problems, orthodontic treatments are often required. Orthodontic treatments using wires and bracing apparatuses or aligners attached to a patient's teeth can be sufficiently rigid and can be configured to push and/or pull the patient's teeth into a selected position. Orthodontic treatments using temporary anchorage devices (TAD) coupled to the patient's bone in the roof of their mouth are also used to help reposition the patient's teeth by providing an anchor point for other orthodontic treatments to connect to. For patients having upper molars (i.e., molars 104A in the upper dental arch 101) positioned too far forward in the anterior direction 105, treatment may require moving the upper molars in the posterior direction 106 in a process sometimes referred to as distalization. Formerly, headgear was used to provide relative distalization in facially forward-growing patients. Conventional distalization solutions include rigid metal structures or aligners positioned to facilitate pushing the upper molars in the posterior direction. These solutions typically brace the rigid metal or plastic structures against other teeth (e.g., the bicuspids 104B and/or incisors 104C) positioned in anterior segments of the patient's mouth, such that these other teeth act as anchorage points for the metal or plastic structures. However, using these other teeth 104B and/or 104C as anchorage points to distalize upper molars can have the undesired consequence of these other teeth 104B and/or 104C being pushed in the anterior direction 105, which usually causes these other teeth 104B and/or 104C to be pushed into an excessively more forward position. Accordingly, these conventional rigid metal or plastic structural mechanics can prevent crowded or protruded upper teeth at the front of the mouth from effectively moving backward during a non-bone-anchored distalization process, with inter-arch elastics or springs causing lower front teeth to move forward to provide the relative distalization for backward upper movement of teeth.

Figure 1B:
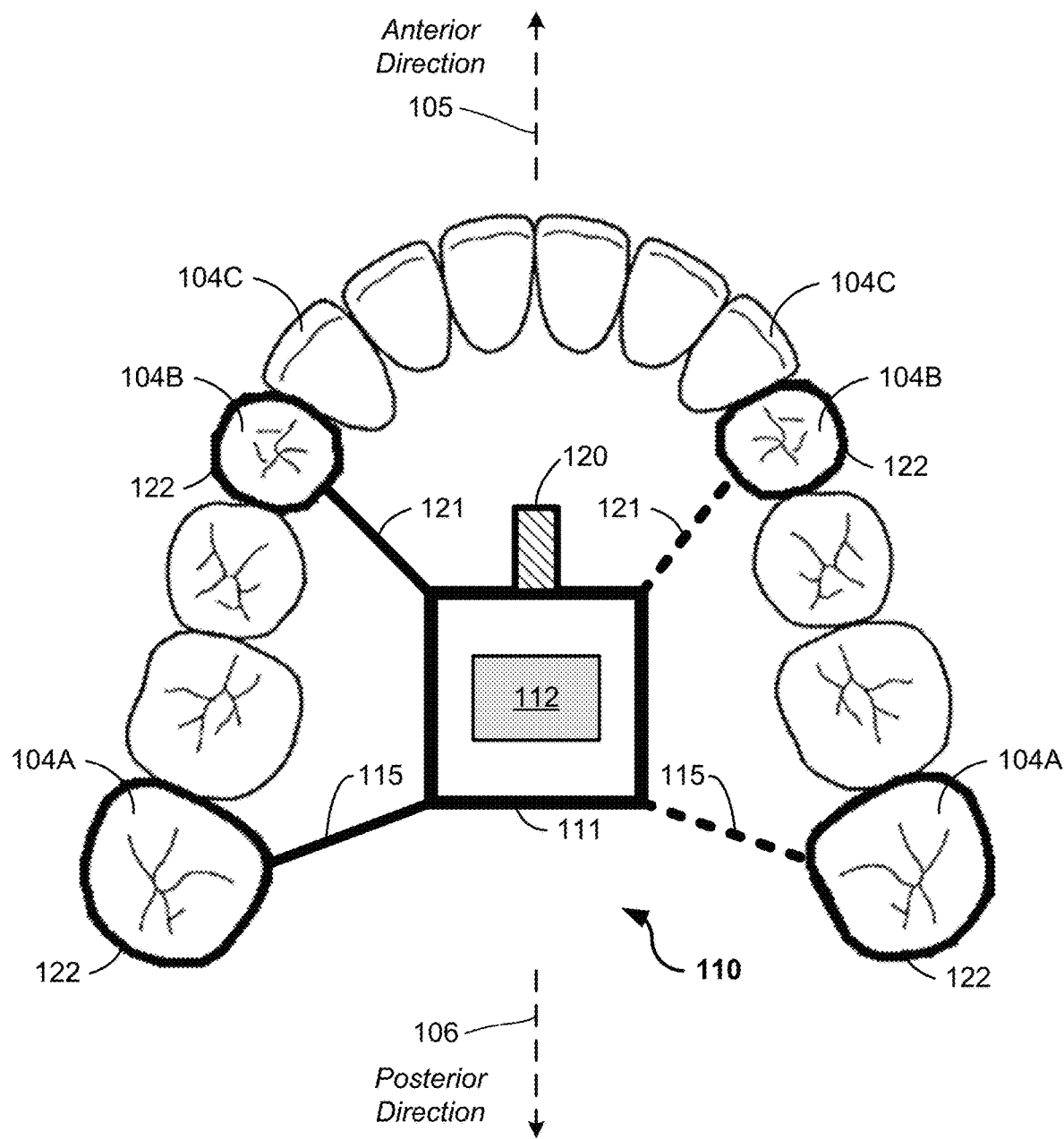
FIG. 1B shows a diagram of an example embodiment of an orthodontic distalization and/or mesialization apparatus in accordance with the present technology.

FIG. 1B shows a diagram of an example embodiment of an orthodontic distalization and/or mesialization apparatus in accordance with the present technology, labeled 110. The diagram shows the apparatus 110 worn in a patient user's mouth through attachment to the patient user's teeth 104 and display an example implementation of the apparatus 110 for illustrative purposes. The apparatus 110 includes a body portion 111, which houses an adjustment-drive mechanism 112 of the apparatus 110 configured to actuate a force one a target tooth or teeth the apparatus 110 is connected based on an input force created when a moveable component of the adjustment-drive mechanism 112 is purposely moved. The apparatus 110 includes one or more posterior arms 115 coupled to the adjustment-drive mechanism 112 and that are attachable to one or more corresponding molars 104A to cause movement of the one or more corresponding molars 104A (e.g., for distalization or mesialization of the upper molar(s) 104A) when actuated by the adjustment-drive mechanism 112. The apparatus 110 includes one or more anterior arms 121 that are attachable to one or more corresponding non-molar teeth 104B or 104C, e.g., which can provide relative static points when the upper molar(s) 104A distalize or mesialize during a distalization or mesialization treatment, or which can be caused to move as expansion sites along with the upper molars during a palatal expansion treatment). In some embodiments, the adjustment drive mechanism 112 is coupled to one or more anterior arms 121 to allow adjustment of force upon the non-molar teeth 104B or 104C; whereas in some embodiments, the one or more anterior arms 121 are couple to a rigid body of body portion 111. In various examples described herein, the one or more posterior arms 115 may also be referred to as "distalization arms," distalization and/or mesialization arms," or "mesialization arms"; the one or more anterior arms 121 may also be referred to as "forward arms" or "stabilization arms". The apparatus 110 includes an anchorage assembly 120, which is coupled to the body portion 111 and configured to be attachable to a bone in the patient's mouth (e.g., such as the palatal alveolar bone located superior to the palate of the patient's mouth). The apparatus 110 can include attachment articles 122 that attach the one or more posterior arms 115 to the one or more corresponding molars 104A and that attach the one or more anterior arms 121 to the one or more corresponding teeth 104B or 104C. For example, in some embodiments, the attachment articles 122 include hollow rings that are fitted around the molars 104A and/or bicuspids 104B or incisors 104C; whereas in some embodiments, the attachment articles 122 can include a hook or other attachment mechanism to rigidly couple the posterior arms 115 and anterior arms 121 to the appropriate teeth 104A and 104B/104C, respectively. For example, the attachment articles 122 can include a slot with a locking clip that couples to the posterior arms 115 and anterior arms 121; whereas in some examples the attachment articles 122 can include an orthodontic treatment device like a plastic aligner worn by the user to which the posterior arms 115 and anterior arms 121.

In various implementations, for example, the apparatus 110 is a multi-functional orthodontic distalization and/or mesialization device that can be used to drive movement of a patient's upper molars in the posterior direction 106 (e.g., distalization) or in the anterior direction 105 (e.g., mesialization) without utilizing other teeth of the patient as anchorage points for the apparatus 110 to push off from. That is, unlike existing devices and techniques for distalizing (or mesialzing) the upper molars for overjet correction, the apparatus 110 is structured to controllably cause movement of the upper molars along the occlusal plane toward the posterior direction (distalization) by anchoring the apparatus 110 to bone while also stabilizing the anterior, non-molar teeth (e.g., bicuspids, incisors) via a direct or indirect attachment of the apparatus 110 to a non-molar tooth (or stabilizing two or more non-molar teeth in some implementations). Similarly, the apparatus 110 is configured to allow or cause movement of the upper molars along the occlusal plane toward the anterior direction (mesialization) using the bone-based anchorage while also preserving stability of the anterior, non-molar tooth or teeth, e.g., from moving too far distally during retraction to close space or correct the antero-postero (AP) dimension of the bite. The apparatus 110 includes a structural design that is minimally obtrusive to the patient wearing the device in his/her mouth, so as to not affect the patient's ability to speak, eat, drink, or other function. The structural design of the apparatus 110 also allows the orthodontist to easily access the adjustment-drive mechanism 112 to control the adjustment of the lengths of the posterior arm(s) 115. Notably, the apparatus 110 can allow the orthodontist to also adjust the length of the anterior arm(s) 121, in case such adjustments are needed during treatment to ensure the anterior teeth are stable during distalization (or mesialization). Also, in some embodiments, the apparatus 110 can be configured to integrate into a wearable aligner (e.g., disposable aligner, such as plastic aligners) to achieve distalization and/or mesialization, whereby incremental movements caused by aspects of the apparatus 110 are built into the aligner, utilizing temporary anchorage device(s) to effect any or all three axis of orthodontic correction.

In some embodiments, for example, the apparatus 110 is attachable to an upper molar 104A via one posterior arm 115 and attachable to a bicuspid 104B or incisor 104C via one anterior arm 121 on the same side of the upper arch 101 (e.g., left side or right side). Yet, in some embodiments, for example, the apparatus is attachable to multiple molar/non-molar pairs of teeth, such as an upper left molar 104A via a posterior arm 115 and an upper left tooth 104B or 104C via an anterior arm 121, and an upper right molar 104A via another posterior arm 115 and an upper right tooth 104B or 104C via another anterior arm 121. Furthermore, in some embodiments, for example, the apparatus 110 can include a plurality of anterior arms 121 and a single posterior arm 115 for one or both sides of the upper arch 101; whereas, in some embodiments, for example, the apparatus can include a plurality of posterior arms 115 and a single anterior arm 121 for one or both sides of the upper arch 101; whereas, in some embodiments, for example, the apparatus can include a plurality of posterior arms 115 and a plurality of anterior arms 121 for one or both sides of the upper arch 101.

The adjustment-drive mechanism 112 is directly or indirectly coupled to the one or more posterior arms 115, which are configured to apply a force on the connected upper molars 104A based on the mechanism 112 adjusting a length or a tension of the one or more posterior arms 115. The one or more anterior arms 121 may be configured to remain static despite an adjustment by the adjustment-drive mechanism 112, which can be due to the anchorage assembly 120 providing a bracing or anchoring effect. Yet, in some embodiments, the adjustment-drive mechanism 112 can be coupled to the one or more anterior arms 121, which can be configured to apply a force on the other teeth 104B or 104C based on a length or tension adjustment of the mechanism 112.

In some embodiments, for example, the adjustment-drive mechanism 112 can include a screw assembly having a screw encased within an outer shroud that couples to the body portion 111, in which the screw is accessible to be turned such that rotation of the screw causes separable parts of the body portion 111 to expand (separate) and contract (come together) based on the direction of rotation of the screw, and by which the expansion or contraction of the body portion 111 in turn drives the posterior arm(s) 115 (and/or the anterior arm(s) 121) to exert force on the upper molar(s), thereby causing movement of the upper molar(s). In some embodiments, for example, the adjustment-drive mechanism 112 can include a screw assembly having a screw encased within an outer shroud that couples to the body portion 111, in which one end of the screw is coupled to the posterior arm 115 to cause a change in length of the posterior arm 115 for exerting a force on the upper molar(s) In some embodiments, the adjustment-drive mechanism 112 can additionally or alternatively include a separate screw assembly that couples to the anterior arm 121.

In some embodiments, for example, the adjustment-drive mechanism 112 can include a rack and pinion assembly having a rotatable shaft with a pinion gear at a first end of the shaft that interfaces with a rack gear having a linear array of rack teeth. The rack and pinion assembly can operate such that, when the rotatable shaft is rotated in a first rotational direction, the adjustment-drive mechanism 112 translates rotational motion of the rotatable shaft into linear motion of the rack gear to generate a force that is ultimately applied on the one or more posterior arms 115 to cause the movement of the molar 104A in the upper dental arch 101, e.g., in the posterior direction for distalization. Similarly, when the rotatable shaft is rotated in the opposite rotational direction, the adjustment-drive mechanism 112 translates the rotational motion of the rotatable shaft into linear motion of the rack gear to generate a force ultimately applied on the one or more posterior arms 115 to cause the reverse movement of the molar 104A, e.g., in the anterior direction for mesialization. For example, the rack and pinion assembly can be integrated with the body portion 111 such that the linear motion of the rack gear drives a structure of the body portion 111 to apply the force on the posterior arm(s) 115 and/or anterior arm(s) 121. In some embodiments, separable parts of the body portion 111 to expand (separate) and contract (come together) based on actuation of the rack and pinion assembly to drive movement and generate force of the one or more posterior arms 115 and/or one or more anterior arms 121.

In some embodiments, the body portion 111 includes a single piece formed of a rigid, biocompatible material, including a rigid or semi-rigid plastic, metal or composite material. In some embodiments, the posterior arm(s) 115 and the anterior arm(s) 121 include a rigid, biocompatible material, including a rigid plastic, metal or composite material.

Figure 2A:
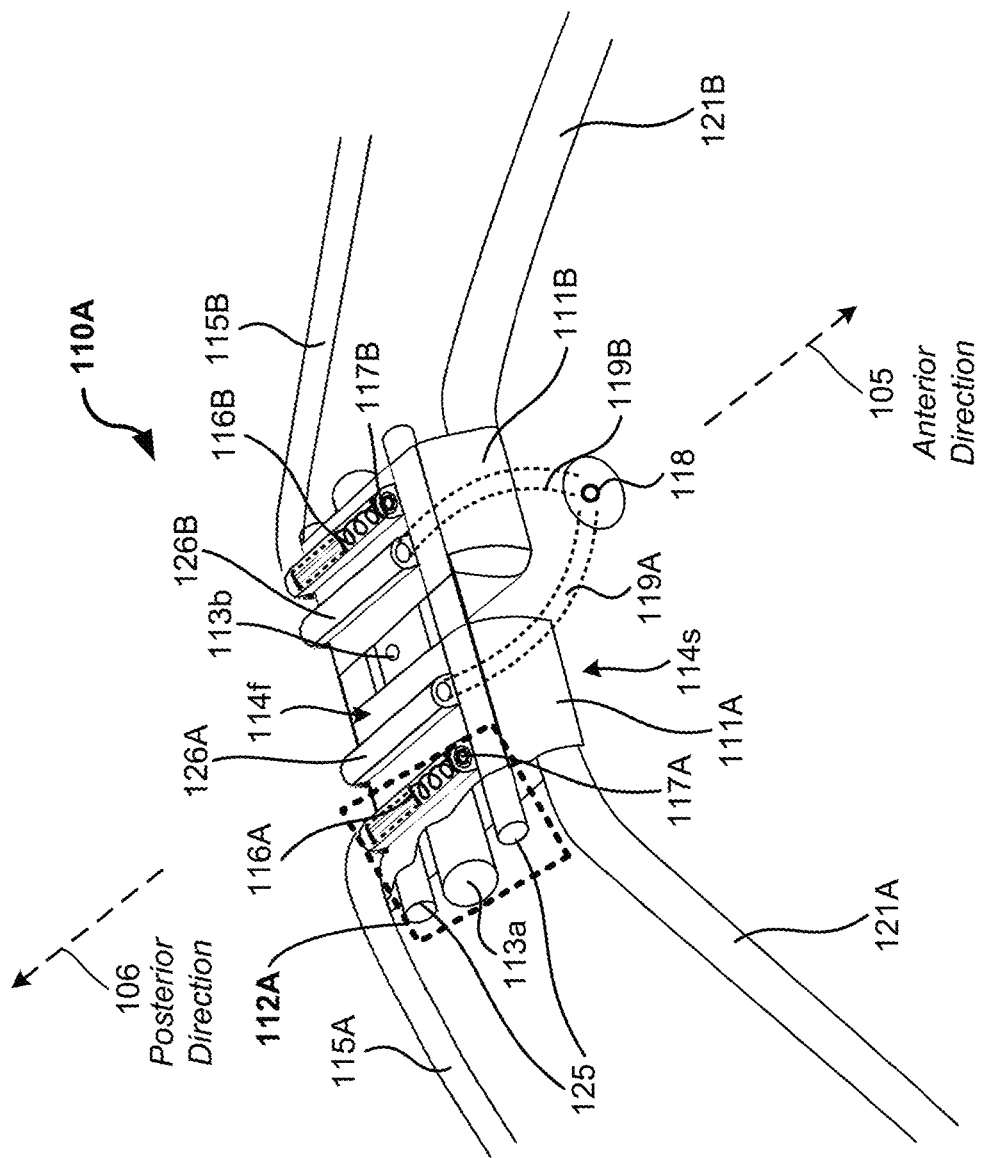
FIG. 2A shows a diagram depicting an isometric view of an orthodontic distalization and/or mesialization apparatus in accordance with embodiments of the present technology.
Figure 2B:
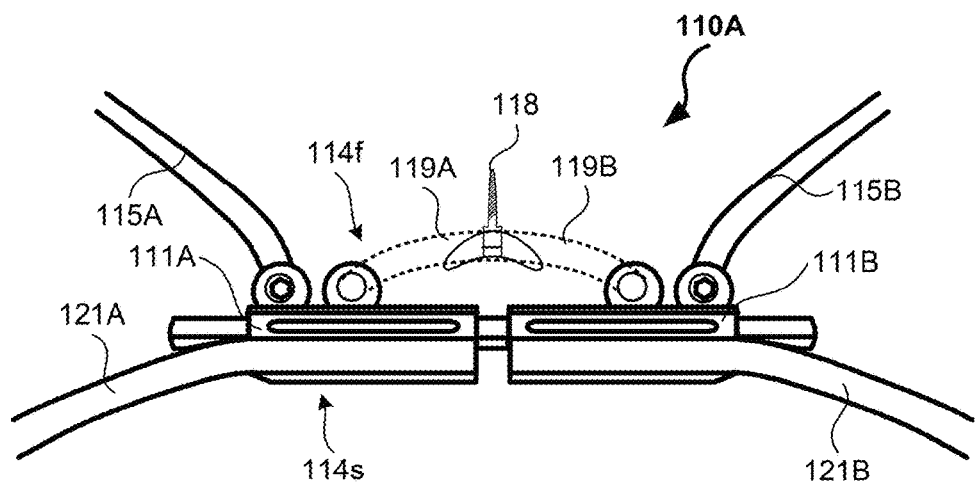
FIG. 2B shows a diagram depicting a rear elevation view of the orthodontic distalization and/or mesialization apparatus shown in FIG. 2A

FIGS. 2A and 2B show diagrams of an orthodontic distalization and/or mesialization apparatus in accordance with embodiments of the apparatus 110 shown in FIG. 1B, labeled apparatus 110A, which depicts an example embodiment of the adjustment-drive mechanism 112, labeled as adjustment-drive mechanism 112A. FIG. 2A shows a perspective view of the apparatus 110A, and FIG. 2B shows a rear elevation view of the apparatus 110A. In some implementations, for example, the example apparatus 110A can be used for distalization orthodontic treatment to drive movement of a patient's upper molars in the posterior direction without utilizing other teeth as anchorage points for the apparatus 110A to push off from. In some implementations, for example, the distalization treatment includes a palatal expansion, in which the apparatus 110A can first drive the upper molars and the stabilizing anterior teeth (e.g., bicuspids) prior to driving the movement of the patient's upper molars in the posterior direction.

The apparatus 110A includes two body portions 111A and 111B (collectively as an example embodiment of the body portion 111), which can be spaced apart and brought together by the adjustment-drive mechanism 112A. In the example embodiment shown in FIGS. 2A and 2B, the adjustment-drive mechanism 112A includes a rods assembly 125, including one or more rods, disposed within channel(s) of the body portions 111A and 111B and that spans across a separation gap between the body portions 111A and 111B. The rods assembly 125 is operable to guide an expansion movement of the body portions 111A and 111B apart from each other (or toward each other, if desired) across the separation gap. The body portions 111A and 111B are coupled to distalization arms 115A and 115B, respectively, via distalization housings 116A and 116B that are configured to receive the distalization arms 115A and 115B, respectively. The distalization arms 115A and 115B, which can be formed from metal for example, are configured to extend from the body portions 111A and 111B to the patient's upper molars. The adjustment-drive mechanism 112A includes distalizing screws 117A and 117B, which are coupled to the distalization housings 116A and 116B, respectively, and which are operable to adjust the length of the distalization arms 115A and 115B. For example, splines within the distalization housings 116A and 116B can prevent the distalization arms 115A and 115B from rotating inward or outward within the distalization housings 116A and 116B, respectively. The body portions 111A and 111B are also coupled to forward arms 121A and 121B, respectively, which extend from the body portions 111A and 111B and to attach the apparatus 110A to anterior teeth 104B or 104C in the upper dental arch, e.g., directly to bicuspids or indirectly to incisors. The forward arms 121A and 121B, which can be formed from metal for example, can help to secure the apparatus 110A to the anterior teeth 104B or 104C in a fixed position within the patient's mouth, e.g., without transferring significant forces on the anterior teeth. The apparatus 110A includes the anchorage assembly 120, which in this example includes anchoring arms 119A and 119B coupled to and spanning outward from the body portions 111A and 111B and coupled to an anchorage device 118 that is attachable to bone, such that the anchorage assembly 120 creates a temporary anchorage device (TAD) for the apparatus 110A. In the example embodiment, the end of each of the anchoring arms 119A and 119B is received within anchoring tubes 126A and 126B, respectively, that are coupled to the body portions 111A and 111B; whereas the other end of the each of the anchoring arms 119A and 119B is securely coupled to the anchorage device 118.

For some patients, the upper dental arch 101 and/or lower dental arch 102 are too narrow and, as a result, their teeth 104 are crowded as the dental arches 101 and 102 do not have sufficient space for all of the teeth 104 to be properly positioned. For example, in some cases, a narrow upper jaw poses a challenge for a correct bite with the lower teeth. One solution to correct these problems is to use the disclosed apparatuses that are configured to distalize and/or mesialize and/or expand a patient's upper and/or lower dental arches 101 and 102 to improve arch width and bite or increase the amount of space for the teeth 104.

For example, in some embodiments of the present technology, the apparatus 110A can be used to expand the upper dental arch 101. In the illustrated embodiment shown in FIG. 2A, the apparatus 110A includes an expansion screw 113a that spans the separation gap between the body portions 111A and 111B and that can be used to adjust the size of the gap. The expansion screw 113a can include a length adjustment mechanism (e.g., a spring or screw) accessible via a hole 113b in the expansion screw 113a, and the length adjustment mechanism can be used to adjust the effective length of the expansion screw 113a. By increasing the effective length of the expansion screw 113a, the size of the separation gap increases as the body portions 111A and 111B, which can slideably move along the guide rods of the rod assembly 125, are pushed away from each other. As the gap increases, the distalization arms 115 and forward arms 121 are pushed outwards by the body portion 111. As the body portions 111A and 111B move towards the teeth 104 along the guide rods of the rod assembly 125, the distalization arms 115 and forward arms 121, which are generally rigid and do not easily bend or deform, apply a force on the teeth 104 (e.g., molars 104A and bicuspids 104B or incisors 104C) in the upper dental arch 101 to which they are connected. As a result, the arms 115 and 121 can push the teeth 104 and supporting palatal bone outwards, thereby causing the upper dental arch 101 to expand laterally. The effective length of the expansion screw 113a can continue to be increased until the dental arch 101 reaches a selected size.

After causing the upper dental arch 101 to expand to a suitable size, the apparatus 110A can then be used to push the molars in the upper arch 101 in the posterior direction 106. The distalization arms 115A and 115B, which are coupled to molars 104A in the upper arch 101, apply a force on the upper molars to push the upper molars to in the posterior direction 106, e.g., by using a spring or screw contained in within the body portions 111A and 111B. However, as per Newton's 3rd Law, the upper molars apply an equally-strong force back on the distalization arms 115. As a result, the distalization arms 115A and 115B push the body portions 111A and 111B in the anterior direction 105, which the body portions 111A and 111B, in turn, apply a force on the forward arms 121A and 121B. Accordingly, if care is not taken, the forward arms 121A and 121B can apply a force on the anterior teeth 104B or 104C and can even push additional anterior teeth 104 excessively forward and out of position. To prevent the forward arms 121 from pushing the anterior teeth 104 out of position, or at least reduce the amount of force that the forward arms 121 apply onto the teeth 104, the anchoring assembly, including the anchoring device 118 and connected anchoring arms 119, of the apparatus 110A that coupled to the body portion 111 provides a temporary anchorage device (TAD) of the apparatus 110A, thereby absorbing the force from the forward arms 121 to alleviate such forces on the connected anterior teeth 104B or 104C, and thus also on any additional anterior teeth.

Each of the body portions 111A and 111B includes a first surface 114f and a second surface 114s on an opposite side of the first surface 114f. In the embodiments shown in FIGS. 2A and 2B, the apparatus 110A is configured such that, when the apparatus 110A is coupled to the upper dental arch 101, the first surface 114f faces downwards toward the lower dental arch 102 while the second surface 114s faces in an opposite, palatal direction. In other embodiments, for example, the apparatus 110A can be configured to be oriented in the opposite direction.

Figure 2C:
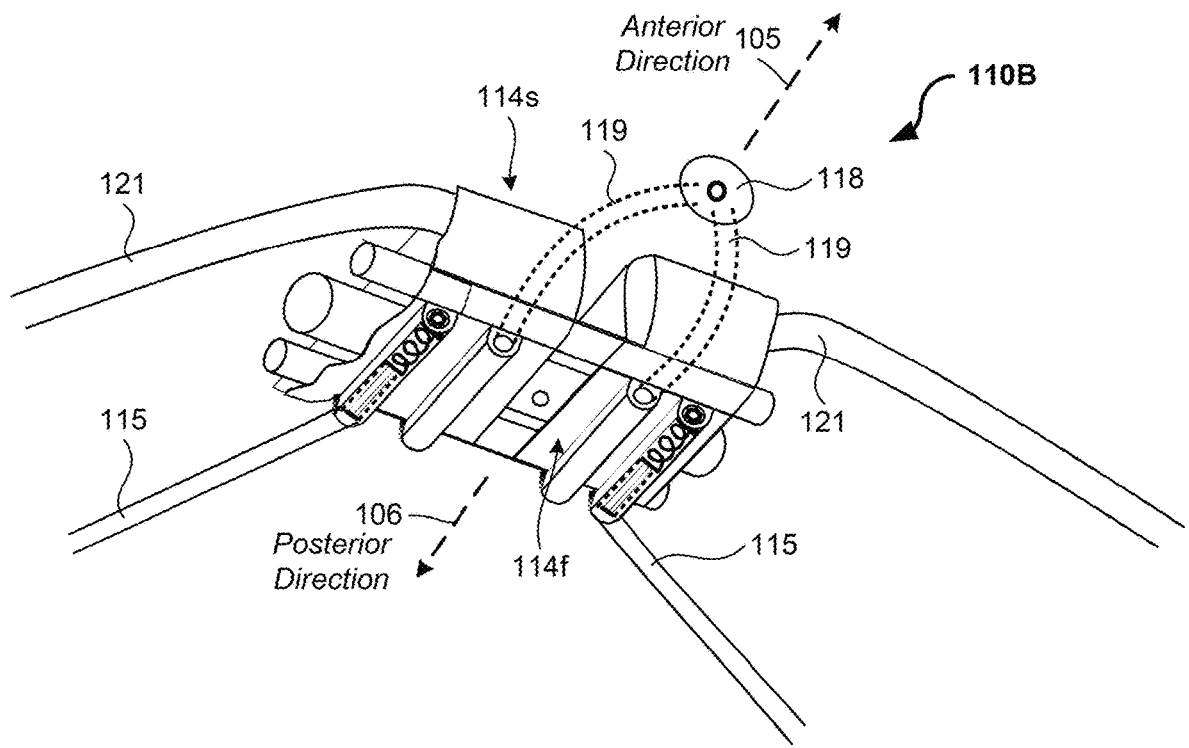
FIG. 2C shows a diagram depicting an isometric view of another example embodiment of an orthodontic distalization and/or mesialization apparatus in accordance with the present technology.

FIG. 2C shows a diagram of an example embodiment of the apparatus 110, similar to the apparatus 110A and labeled apparatus 110B, in which the first surface 114s faces upwards toward the roof of the patient's mouth while the second surface 114f faces generally downwards toward the lower dental arch 102.

Figure 3A:
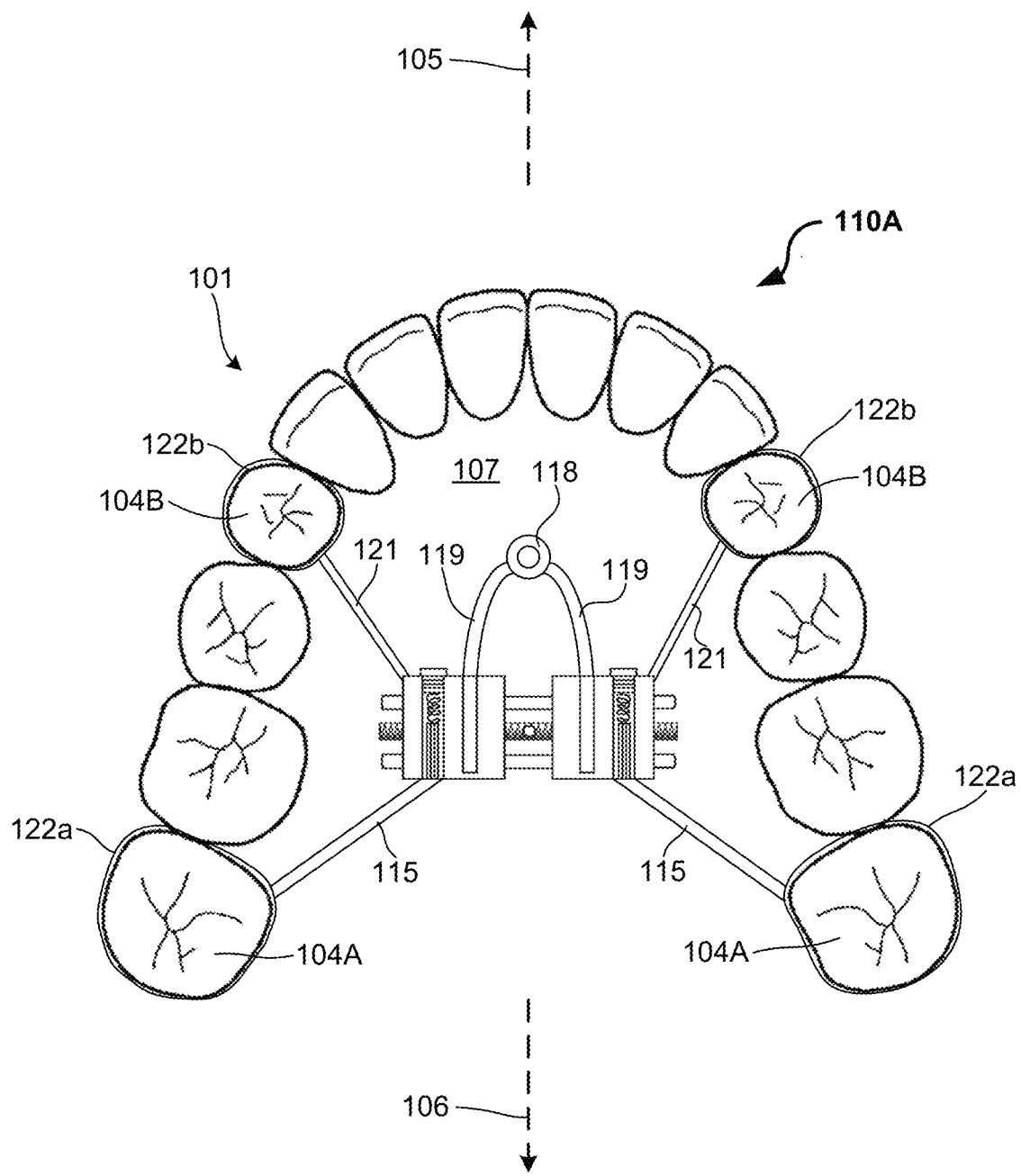
FIG. 3A shows a diagram depicting a plan view of the example orthodontic distalization and/or mesialization apparatus shown in FIGS. 2A and 2B coupled to teeth in the upper dental arch of a patient's mouth, in accordance with embodiments of the present technology.

FIG. 3A shows a plan view of the apparatus 110A positioned within the patient's mouth and coupled to the upper dental arch 101, which includes molars 104A and bicuspids 104B. To couple the distalization arms 115 to the molars 104A, attachment articles (e.g., metal rings) 122a are disposed around the molars 104A and distalization arms 115 are rigidly coupled between the metal rings 122a and the apparatus 110. Similarly, to couple the forward arms 121 to the bicuspids 104B, attachment articles (e.g., metal rings) 122b are disposed around the bicuspids 104B and the forward arms 121 are rigidly coupled between the rings metal 122b and the apparatus 110. In other embodiments, the distalization arms 115 and the forward arms 121 can be attached to the molars 104A and the bicuspids 104B using some other attachment component or mechanism. For example, in some embodiments, the distalization arms 115 and the forward arms 121 can be coupled to the molars 104A and bicuspids 104B using structures coupled to inner surfaces of the teeth 104, such as lingual bracing strut.

In some embodiments of the anchorage assembly 120, the anchorage device 118 can include a tapered component that screws through the palatal tissue and into the deeper palatal alveolar bone located superior to the palate 107 of the patient's mouth and/or a pad or button on the non-insertable end of the tapered component that can press against the outer palatal tissue of the palate 107. In implementations of the anchorage device 118 employing the tapered component, because the anchorage device 118 is screwed directly into the bone, any forces applied to the anchorage device 118 (or cap of the anchorage device 118, for some example embodiments) will not be significantly directed onto any of the other teeth 104 in the upper dental arch 101. Instead, the alveolar bone holds the anchorage device 118 in a generally fixed position, which allows the anchorage assembly 120 to act as a TAD for various embodiments of the apparatus 110. Because of this, all or at least most of the forces applied by the distalization arms 115 onto the body portions 111 can be directed onto the TAD (e.g., anchorage device 118) via the generally rigid anchoring arms 119, instead of onto the bicuspids 104B or incisors 104C connected to the forward arms 121.

In this way, for example, the anchorage assembly 120 can act as a stable anchoring point for the apparatus 110, and the amount of reciprocal force applied by the apparatus 110 onto the bicuspids 104B (or other anterior teeth) during the distalization process can be reduced. Further, because the forward arms 121 do not act as bracing arms for the apparatus 110 and because the anchorage assembly 120 (e.g., anchorage device 118) remains fixedly attached to the alveolar bone in the patient's mouth, all of the energy and force applied by the apparatus 110 onto the molars 104A is conserved and is used to move the molars 104A. Additionally, because the body portion 111 and anchorage assembly 120 can be generally aligned with the tipping center of the molar 104A, the distalization force can be applied close to the center of rotation of the root of the molar 104A. In contrast, conventional distalizing solutions can include springs that direct forces through the coronal portion of the molars, which tends to tip the molars distally as the molar moves. By directing the distalization force closer to molar's center of rotation, the risk of causing the molar 104A to tip backward can be reduced, which can therefore reduce forward rebound molar movement after force cessation.

In some embodiments, for example, the anchorage device 118 and anchoring arms 119 are installed when the apparatus 110 is first attached to the patient's upper dental arch 101. In other embodiments, such as for expansion treatment implementations, for example, the anchorage device 118 and anchoring arms 119 may not be installed until the apparatus 110 has finished expanding the patient's dental arch 101.

In the illustrated embodiments shown in FIGS. 1B-3A, for example, the anchorage device 118 is positioned near the palatal midline of the mouth and is placed posterior to the front teeth 104C. Typically, the anchorage device 118 is positioned slightly posterior to the nasopalatine foramen at approximately the transverse line in the middle of the first bicuspids and in the region just mesial to upper first molars. In some implementations, for example, the anchorage device 118 is placed approximately 1 mm to 3 mm off the palatal midline of the mouth and located at about the 3rd ruggae of the palate 107 or in line with the mesial of the upper first molar. At this position, the anchorage device 118 can be screwed into a maximum amount of cortical bone, which offers improved support and stability, while avoiding the nasopalatine foramen. In other implementations, for example, the anchorage device 118 can be located at a different position within the mouth or multiple anchorage device 118 of the anchorage assembly 120 can be located at multiple other positions within the mouth. In some embodiments, the anchorage assembly 120 does not include a TAD screw, and instead, anchorage relies only on a pad or surface interface (e.g., acrylic button) pressed against palatal tissue.

Figure 3B:
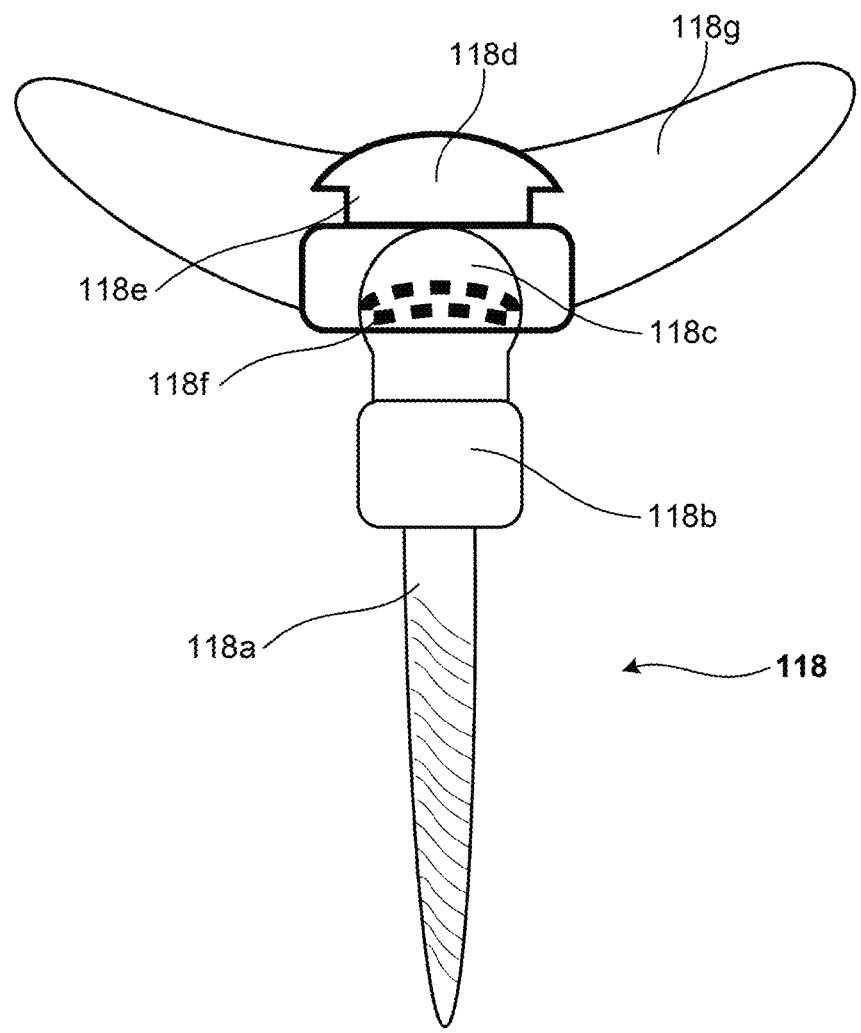
FIG. 3B shows a diagram depicting a side elevation view of a temporary anchorage device (TAD) for coupling the example apparatus shown in FIG. 3A to a patient's palatal alveolar bone, in accordance with embodiments of the present technology.

FIG. 3B shows a diagram depicting a side elevation view of an example embodiment of the anchorage device 118. The anchorage device 118 includes a tapered portion 118a that can be inserted into the patient's palatal alveolar bone. In some embodiments, the tapered portion 118a can be threaded such that the anchorage device 118 can be screwed into the bone and the threads can securely hold the anchorage device 118 to the bone. The anchorage device 118 can also include a head portion 118c and a collar portion 118b positioned between the tapered portion 118a and the head portion 118c. In some embodiments, the head portion 118c can be generally spherical. A cap 118d can be removably coupled to the head portion 118c to aid in inserting the anchorage device 118 into the patient's mouth as well as simplifying the disassembly and removal of the anchorage device 118 when treatment is complete. In some embodiments, the cap 118d includes a retention groove 118e that extends around the circumference of the cap 118d and that is configured to receive the anchoring arms 119 (FIG. 3A), and an O-ring 118f is disposed between the cap 118d and the head portion 118c to securely attach the cap 118d to the head portion 118c. In some embodiments, the anchorage device 118 can additionally or alternatively include a surface-interfacing pad or button 118g (e.g., an acrylic structure or portion of the anchorage device 118). In some of these embodiments, for example, the apparatus 110 can include anchoring arms 119 but the anchoring arms 119 can be embedded in the acrylic portion 118 that rests on soft tissue (e.g., without the anchorage device structures 118a-118f) if less-fixed anchorage is deemed acceptable. Furthermore, in some embodiments, the anchorage device 118 can have receiving threads at the head portion to allow an attaching screw to fasten the device anchoring arms to the anchorage device 118. In some embodiments, the anchorage device 118 can be screwed into place, through the acrylic of various thickness, with the thickness changing which teeth contact first during therapy. In some embodiments, the anchoring arms 119 can attach to receiving threads of anchorage device 118 via screws. In some embodiments, a broader surface-palatal acrylic coverage to transfer forces to the palate from the device body can be used, e.g., instead of forward arms 121.

In some implementations, for example, as the distalization arms 115 push on the molars 104A, the molars 104A can move towards the back of the patient's mouth by moving in the posterior direction 106. This can cause the molars 104A to move away from adjacent teeth in the upper dental arch 101, which can result in space forming between the molars 104A and the more forward adjacent teeth.

Figure 4A:
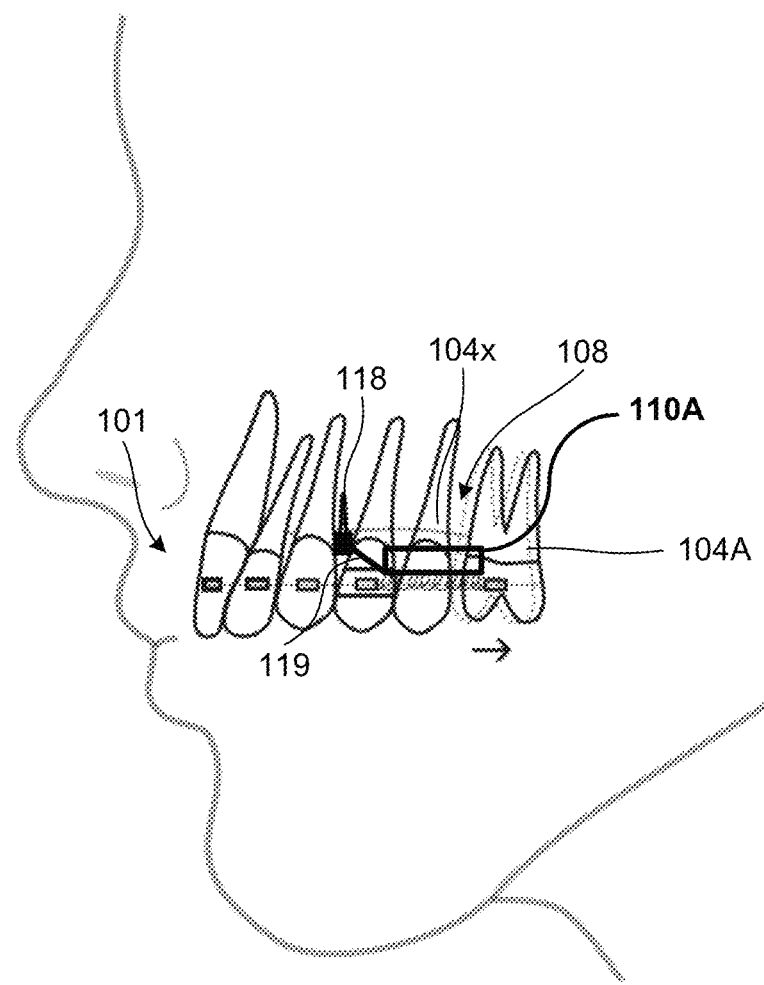
FIG. 4A shows a side view diagram depicting an example distalization implementation of the example orthodontic distalization and/or mesialization apparatus of FIG. 2A within the patient's mouth.
Figure 4B:
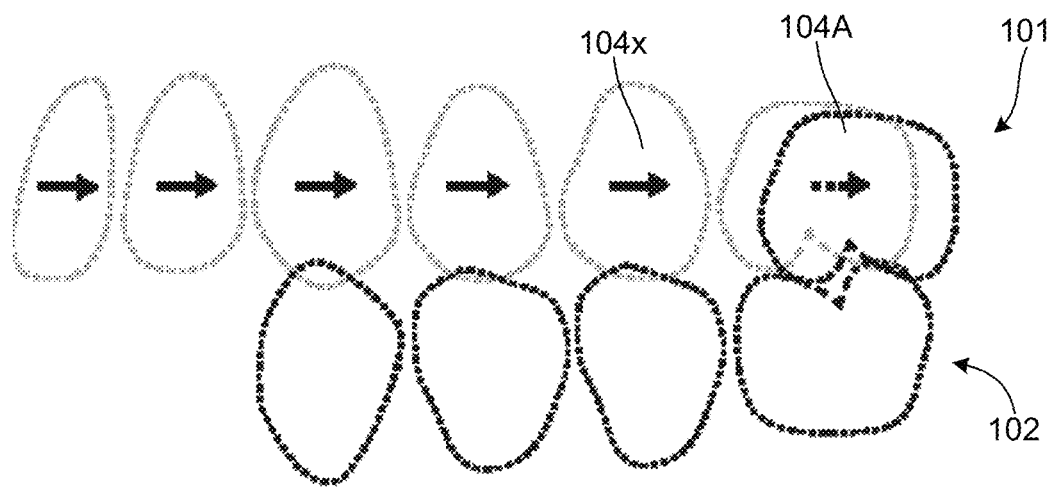
FIG. 4B shows a diagram depicting the patient's teeth in their upper dental arch moving to fill the opening formed by moving the patient's upper molar from the example implementation the apparatus shown in FIG. 4A.

FIGS. 4A and 4B show diagrams illustrating an example distalization implementation of the apparatus 110A in a patient's mouth. FIG. 4A shows a side diagram depicting an example implementation of the apparatus 110A positioned within the patient's mouth for distalization of the molar 104A, which spaces the molar 104A apart from an adjacent tooth 104x by a gap 108. FIG. 4B shows a diagram illustrating how the other teeth 104 and the adjacent tooth 104x in the upper dental arch 101 can move to fill the gap 108, based on implementation of the apparatus 104A, e.g., with both upper and lower teeth already having undergone width narrowing by IPR, which creates added space. For example, in some implementations, the apparatus 110A causes the molars 104A to move by about 1-5 mm in the posterior direction. Accordingly, the gap 108 can be about 1-5 mm as well. In another example implementation, the apparatus 110A can cause the upper molar 104A to shift by about 1-3 mm or less, and the gap 108 can be between 1 mm and 3 mm or less. The gap 108 provides sufficient space for the other teeth in the upper more anterior dental arch 101 to space out from each other by moving in the posterior direction. Yet, as discussed above for some embodiments, the anterior arms 121 can be configured in the apparatus 110 to prevent these other teeth from moving in the posterior direction 106. In implementations of such embodiments, once the distalization process of the molars 104A is finished, the anterior arms 121 can be disconnected from the body portion 111 so that the other teeth 104 are not prevented from moving towards the molars 104A, such as via retraction force originating from braced molars 104A.

In some embodiments, the apparatus 110 can be integrated with another orthodontic device such that the apparatus 110 is configured to utilize existing orthodontic therapies, such as braces or removable aligners. For example, in some implementations, the apparatus 110 is utilized for distalization of the target molar 104A, and another orthodontic device (e.g., braces, removable aligner, or other) can be used to shift these other teeth backwards by utilizing a palatal TAD or TADs (e.g., the anchorage assembly 120 of the apparatus 110) to direct all distalizing energy and forces in the posterior direction 106. Yet, in some implementations, the crowded teeth 104 may naturally move into the gap 108 without additional orthodontic therapies being required.

Figure 4C:
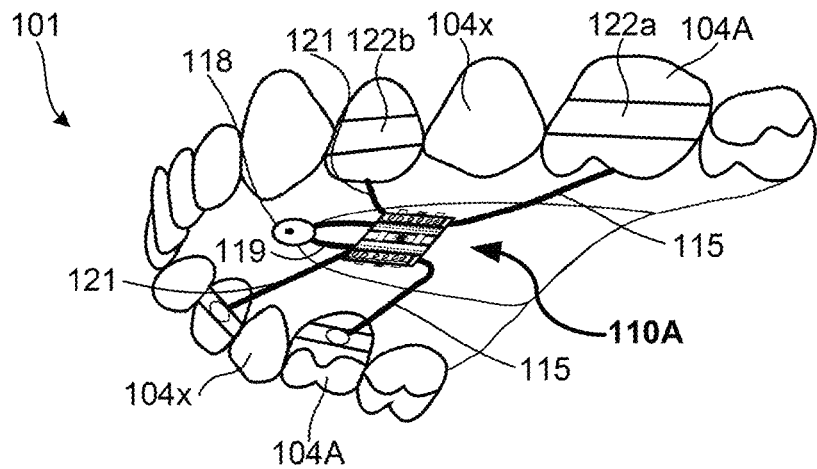
FIGS. 4C-E shows diagrams with oblique views depicting a process by which the example apparatus of FIG. 4A can be implemented to reduce overcrowding in the patient's upper dental arch, in accordance with embodiments of the present technology.
Figure 4D:
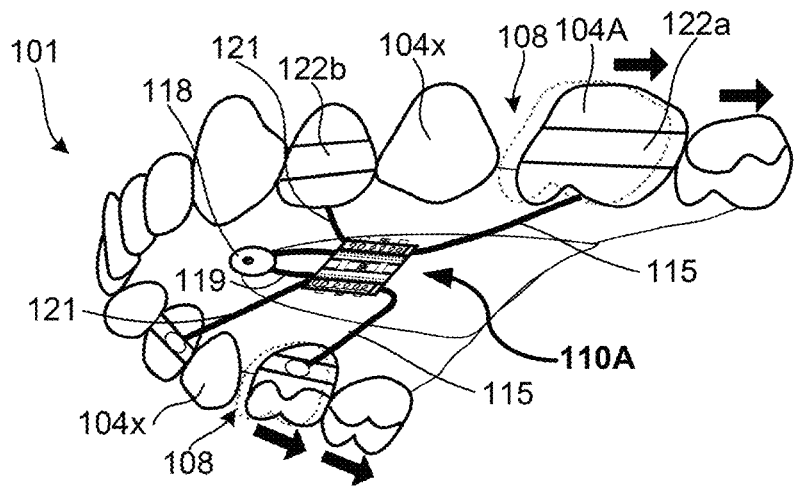
Figure 4E:
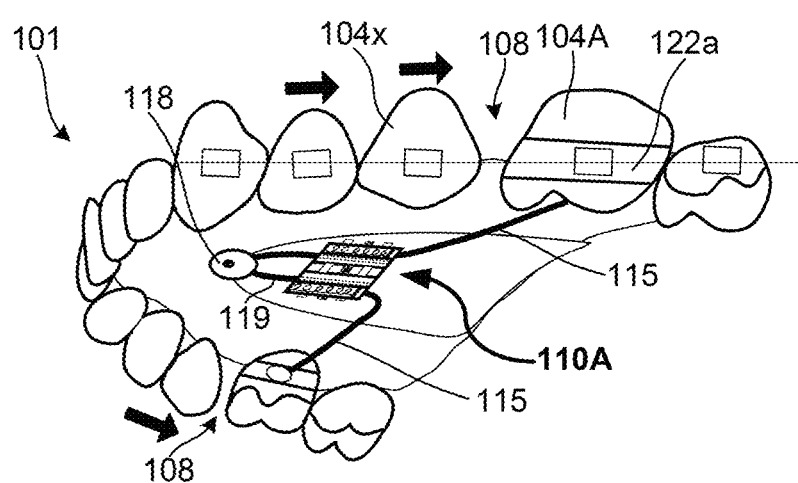

FIGS. 4C-4E show a series of oblique view diagrams illustrating an example distalization implementation of the apparatus 110A within the upper dental arch 101 of the patient's mouth, in which the apparatus 110A can be used to reduce overcrowding in the patient's mouth. The diagram of FIG. 4C shows the apparatus 110A installed in the patient's mouth, with the anchorage assembly 120 anchored by attachment of the anchorage device 118 to the patient's palatal alveolar bone and secured to the body portion 111 of the apparatus 110A by anchoring arms 119. The diagram of FIG. 4D shows distalizing movement of the molars 104A based on applied forces transferred through posterior arms 115, creating the gap 108 between the molars 104A and the adjacent teeth 104x. The diagram of FIG. 4E shows the patient's teeth in their upper dental arch moving to fill the gap 108 created by the implementation of the apparatus 110A. Note, in FIG. 4E, the apparatus 110A shows an example modification of the apparatus 110A where the anterior arms 121 and metal rings 122b (e.g., previously around bicuspids) are removed, and the modified apparatus 110A is integrated with another orthodontic treatment device (e.g., braces) to assist in movement of the teeth into the gap 108.

For patients having overcrowding of approximately 3 mm to 4 mm or more, and especially for patients having an already ideal face profile, conventional methods of treating overcrowding can have some significant drawbacks.

Figure 4F:
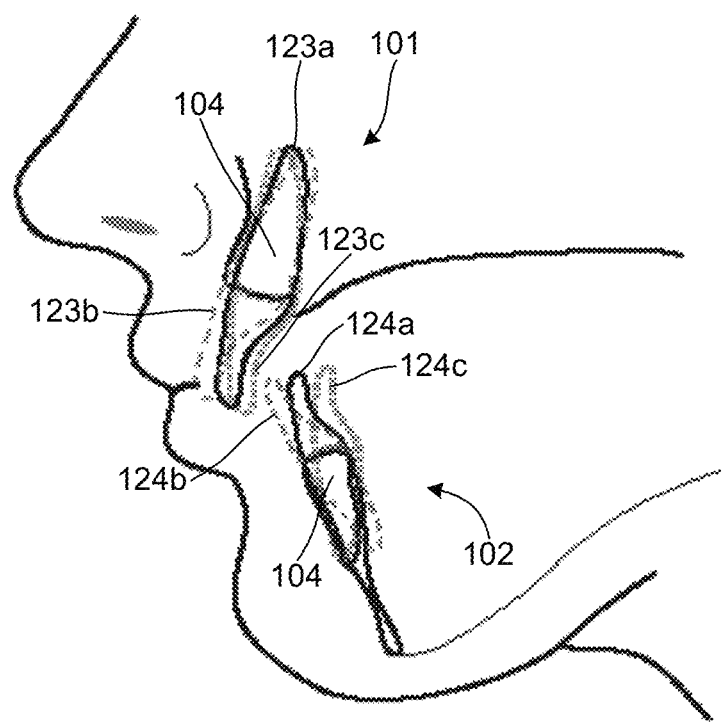
FIG. 4F is a diagram showing how the anterior teeth can move in response to conventional methods of treating overcrowding.

FIG. 4F shows a diagram of how the orientation of the anterior teeth 104 in a patient's upper and lower dental arches 101 and 102 can move due to conventional overcrowding treatment options. Some conventional orthodontic treatment options include aligning the patient's teeth 104 without extracting any of the teeth 104 by expanding the arch circumference to gain extra room within the upper dental arch 101, which can sometimes result in the patient's front teeth undesirably flaring forward from more neutral orientations 123a and 124a to flared orientations 123b and 124b. Other options for negating the overcrowding includes extracting one or more of the teeth to create additional room for the remaining teeth to move into. However, extracting the teeth 104 can sometimes result in over-retraction of the remaining teeth 104 from the neutral orientations 123a and 124a to retracted orientations 123c and 124c if anchorage is not used to control for anterior over-retraction. Another option is to reduce the width of individual teeth via interproximal reduction/narrowing (IPR) by sanding/removing side aspects of the teeth. However, neutralizing 3-4 mm of crowding via IPR would require excessively sanding 6-8 mm from the teeth 104 to relieve the 3-4 mm of crowding if TAD anchorage is not used as the back teeth (e.g., molars 104A) will reciprocally move into the space gained via IPR during space closure. All of these conventional orthodontic options are wrought with challenging issues for the orthodontist to contend with and potential negative risks for the patient to endure.

Yet, on the other hand, using the apparatus 110 (e.g., the example apparatus 110A) in combination with 0.2 mm/surface IPR can help to effectively gain 3-4 mm of added space in the upper dental arch 101 (or lower dental arch) since the anchorage assembly 120 can support the molars 104A during alignment. For example, utilizing the apparatus 110A in conjunction with IPR (e.g., 0.2 mm/surface of first molar to first molar in the dental arches) can correct up to 4 mm of crowding and 3 mm of Class II canine per side in Class II cases utilizing 3 mm of upper molar distalization. In ideal occlusion cases, for example, IPR without distalization of the upper molars 104A can correct up to approximately 5 mm of crowding in ideal occlusion cases without changing the antero-postero position of the incisors. For example, by removing only 2 mm total from the teeth in the anterior portion of the mouth and 1.5 mm total from the teeth in each of the posterior quadrants, the 5 mm of crowding can be neutralized as the apparatus 110A keeps the molars 104A from moving into the space gained using IPR—without distalization. As a counter example, if the apparatus 110A are not used, approximately 10 mm of teeth enamel would likely have to be removed via IPR for there to be sufficient room in the upper dental arch 101 for all of the teeth relieving 5 mm of crowding in the crowded upper arch.

Conventional treatment solutions, such as elastics, headgear, and other removable appliances, are often used to pull the teeth in the upper and lower dental arches in selected directions. However, these appliances can extend the treatment time required for bite correction if the patient does not wear them regularly and appliances (including TADs) that are too numerous, inefficient or cumbersome can extend the patient's care, which can increase the risks of damage to enamel from decay around appliances, resorption of roots, or recession from teeth destructively too close to hard cortical bone boundaries. As a result, it is not uncommon to violate the bone boundaries by over advancing the teeth (or over-retracting teeth in extraction cases), or having patients in orthodontic appliances for too long. For patients having a retrusive lower jaw, a common solution includes the use of elastics coupled between teeth in the upper and lower dental arches to pull the teeth in the lower dental arch in the anterior direction. To reduce the likelihood of the elastics forcing the lower front teeth too far forward during this process, treatment can sometimes include moving the teeth in the upper dental arch distally to reduce the amount of force applied to the teeth in the lower dental arch. However, if the distalization of the upper molars is not properly anchored, a greater probability of cortical plate violation by the lower front teeth moving too far forward (or too far backward in extraction cases), can occur. Accordingly, using the apparatus 110 can help to reduce the likelihood of cortical plate violation in the lower front teeth by anchoring the upper molars in position after distalization, or, indirectly anchoring front teeth during mesialization, for example. Some illustrative examples of this are described.

For example, for patients having 2 mm of overcrowding, an end-on Class II bite and a thin symphysis with a non-extraction preference, distalizing the upper molar 1.8 mm in conjunction with IPR of 1.2 mm between the canines and first molars per quadrant allows full correction of an end-on Class II malocclusion to Class I occlusion by moving the upper canine into gained IPR and molar distalization space, with lower molars moving forward 1.2 mm. Additionally, removing 2 mm total from the teeth between the upper or lower canines can provide 2 mm extra space to fully relieve crowded anterior teeth in either arch. This method of adjusting the antero-postero position of the upper molars without changing the ultimate antero-postero position of the lower anterior teeth is possible due to the anchorage by the apparatus 110A allowing for the distalization of the upper molars by 1+mm due to utilizing 100% of the space gained via the IPR of 2 mm from the upper/lower molars to the canines (e.g., 0.2 mm/surface×6 surfaces). The 1-2.5 mm upper molar distalization equates to less anterior advancement and less IPR demand, which is very significant in a thin symphysis, and can result up to 3-5 mm less of forward movement of the lower incisors due to anchorage control.

Figure 4G:
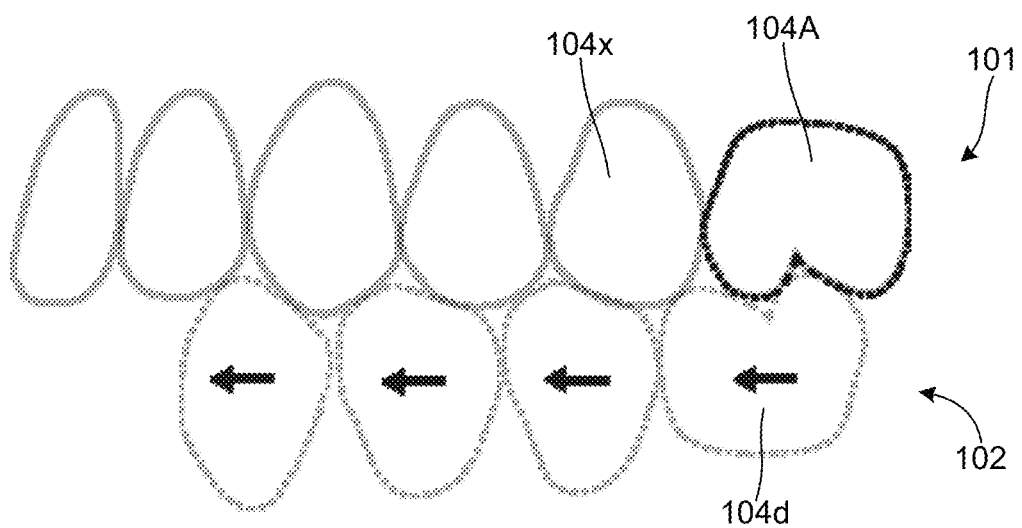
FIG. 4G is a diagram showing the patient's teeth in their lower dental arch moving to reduce crowding in the lower dental arch after using the example apparatus shown in FIG. 2A to reduce crowding in the upper dental arc.

FIG. 4G shows a diagram of the teeth 104d in the lower dental arch 102 moving forward to compensate for retruded teeth in a retruded lower jaw. Accordingly, combining upper molar distalization with IPR can conserve facial balance, can prevent unnecessary flaring of front teeth, can spare teeth from extraction, can reduce treatment time, root or enamel damage, and can lessen compliance issues while also protecting bone from unnecessary cortical plate violation.

In the some previously illustrated embodiments, the apparatus 110A can include expansion screw 113a that can be used to adjust the size of the gap between the body portion 111 so that the upper dental arch 101 can be expanded. However, for some patients, the upper dental arch 101 is sufficiently wide and expanding the upper dental arch 101 is not required. Accordingly, in some embodiments, the apparatus 110A does not include the expansion screw 113a.

Figure 5:
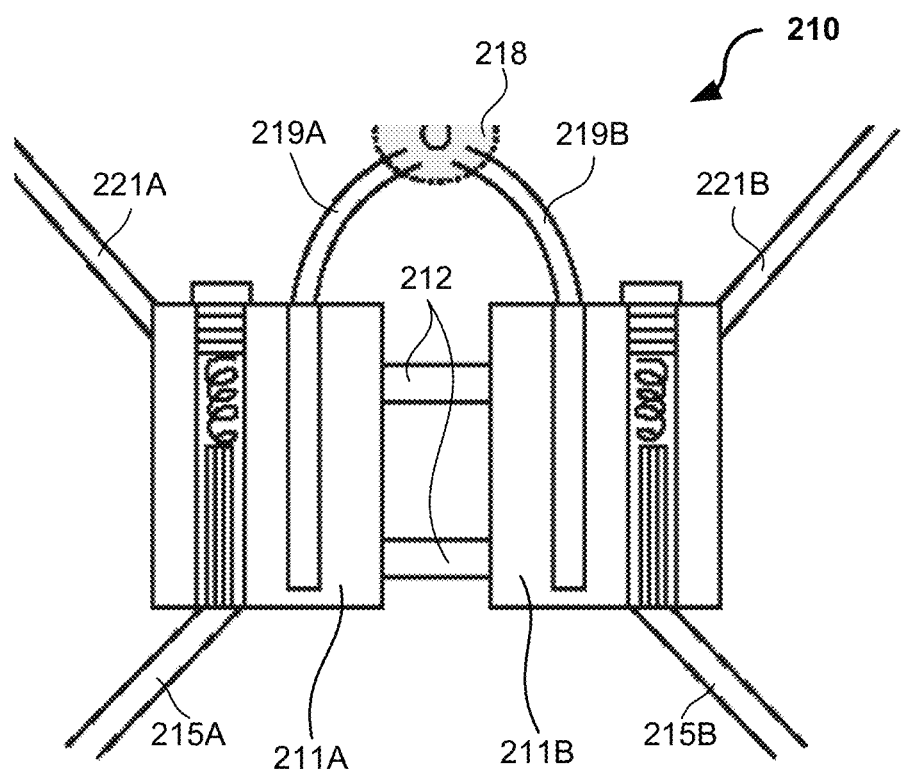
FIG. 5 shows a diagram with a plan view depicting another example embodiment of an orthodontic distalization and/or mesialization apparatus in accordance with embodiments of the present technology.

FIG. 5 shows a diagram featuring an isometric view of an example embodiment of an orthodontic distalization and/or mesialization apparatus in accordance with embodiments of the apparatus 110 shown in FIG. 1B, labeled apparatus 210. The apparatus 210 includes many of the features of the example apparatus 110A, but does not include the expansion screw 113a. The apparatus 210 includes two body portions 211A and 211B, which are spaced apart from each other by a gap. The apparatus 210 includes rods 212 that are coupled between the body portions 211 such that the gap remains at a fixed size. The apparatus 210 includes the one or more posterior arms 115, embodied as distalization arms 215A and 215B that extend from the body portions 211A and 211B, which are used to couple the apparatus 210 to the molars 104A in the upper dental arch 101. The apparatus 210 includes the anchorage assembly 120, embodied as anchoring arms 219A and 219B that couple the apparatus 210 to an anchorage device 218. The apparatus 210 includes the one or more anterior arms 121, embodied as forward arms 221A and 221B that extend from the body portions 211A and 211B, which couple the apparatus 210 to bicuspids or incisors in the upper dental arch 101 to support the apparatus 210 during the distalization process of the molars while the anchoring arms 219 brace the apparatus 210 against the anchorage device 218.

In various distalization implementations of the apparatus 210, for example, once the distalization process is complete, the forward arms 221 can be disconnected so that the bicuspids and other teeth located in the more anterior segment can move distally towards the molars. In some embodiments, for example, the apparatus 210 may not include the forward arms 221. Instead, the apparatus 210 is not directly coupled to the bicuspids and only the anchoring arms 219 (with anchorage device 218) and distalization arms 215 support the apparatus 210 within the mouth during the anchorage control, with or without the distalization process occurring.

In some of the previously illustrated embodiments of the apparatus 110A, the anchorage device 118 is spaced apart from the body portions 111A and 111B of the apparatus 110A and anchoring arms 119 are used to secure the apparatus 110A to the patient's mouth. Yet, in some other embodiments, for example, the anchorage device 118 can be coupled to the apparatus 110A in a different manner.

Figure 6A:
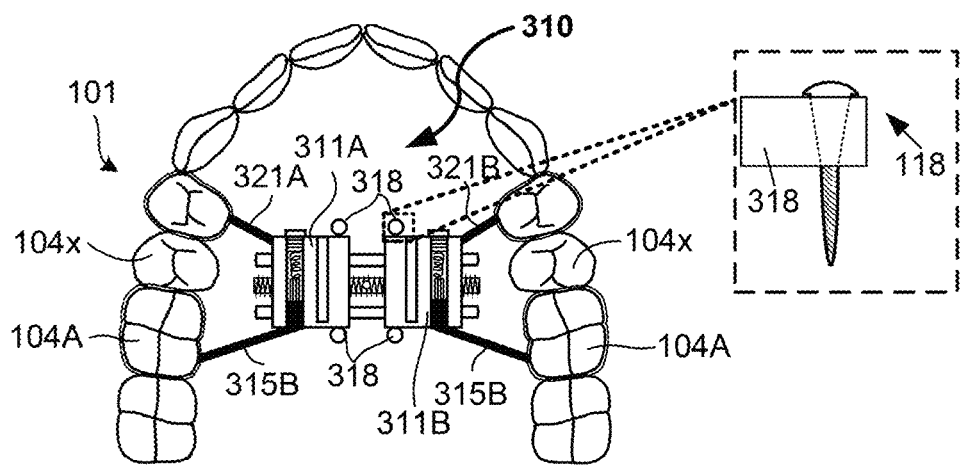
FIGS. 6A-6C shows diagrams with plan views depicting another example embodiment of an orthodontic distalization and/or mesialization apparatus in accordance with the embodiments of the present technology implemented in a distalization process to reduce overcrowding and to expand the patient's upper dental arch.
Figure 6B:
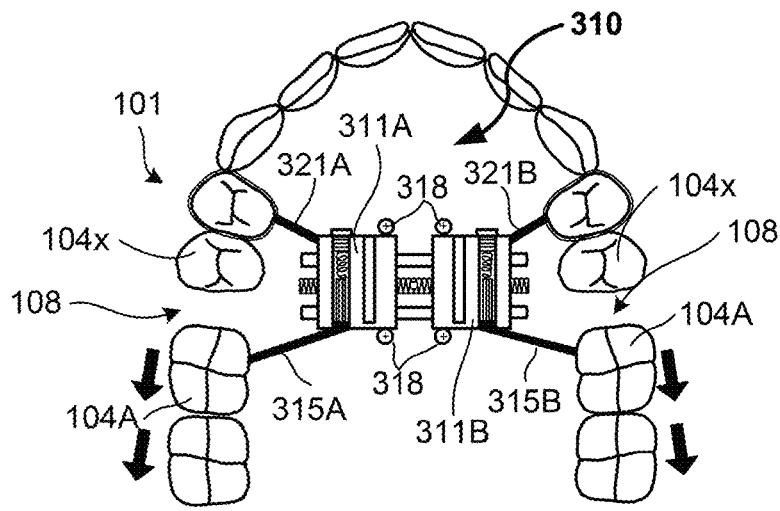
Figure 6C:
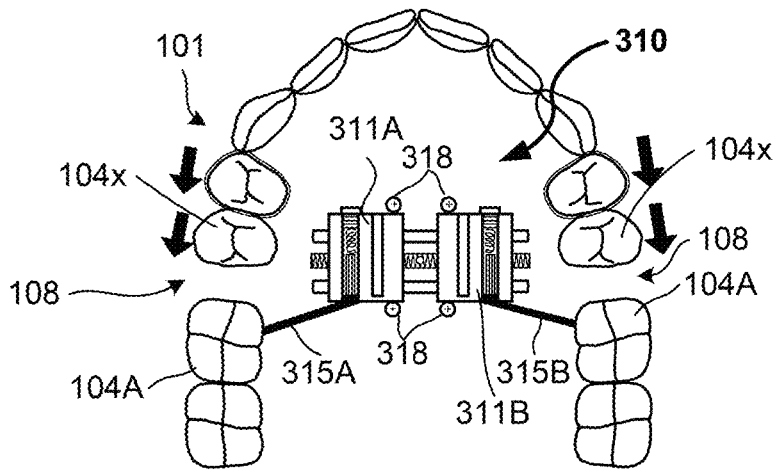

FIGS. 6A-6C show a series diagrams of an example embodiment of an orthodontic distalization and/or mesialization apparatus in accordance with embodiments of the apparatus 110 shown in FIG. 1B, labeled the apparatus 310, within a patient's mouth during an example implementation of a distalization process. As shown in FIG. 6A, the diagram depicts the apparatus 310 within the patient's mouth before the molars 104A have been distalized. The apparatus 310 includes many of the features of the example apparatus 110A. The apparatus 310 includes two body portions 311A and 311B, which are spaced apart from each other by a gap. The apparatus 310 includes the one or more posterior arms 115, embodied as distalization arms 315A and 315B that extend from the body portions 311A and 311B, which are used to couple the apparatus 310 to the molars 104A in the upper dental arch 101. The apparatus 310 includes the one or more anterior arms 121, embodied as forward arms 321A and 321B that extend from the body portions 311A and 311B, which couple the apparatus 310 to bicuspids or incisors in the upper dental arch 101 to support the apparatus 310 during an expansion or distalization process of the molars while the apparatus 310 anchors itself to bone of the patient's mouth via an apparatus assembly. For the apparatus 310, the anchorage assembly 120 is embodied by an embodiment of the anchorage device 118 and one or more securements disposed on the body portions 311A and 311B.

For example, the apparatus 310 includes eyelets 318 coupled to the body portions 311A and 311B. Each of the eyelets 318 is configured to receive an anchorage device 118 such that each of the respective anchorage devices 118 can pass through their respective eyelets 318 and screw into palatal alveolar bone to securely attach the apparatus 310 to the patient's mouth. In this way, the apparatus 310 can be coupled to the anchorage devices 118 without using anchoring arms 119, while the distalization arms 315 can still apply a distalization force on the molars 104A. The inset of FIG. 6A shows a side view of an example anchorage device 118 secured by an example eyelet 318 that protrudes from the body portion 311, such that the anchorage device 118 can attach the apparatus 310 to bone while received through an opening in the eyelet 318. In some embodiments, for example, the example anchorage device 118 does not include the button or pad 118g; whereas in some embodiments, for example, the apparatus 310 can be coupled to the anchorage devices 118 via the eyelets 318 where an example acrylic broad-palatal coverage pad 118g is formed to contact the palate to absorb or transfer forces in anchoring the apparatus 310.

In the example shown in FIGS. 6A-6C, the apparatus 310 includes four eyelets 318 (e.g., one eyelet on a posterior side and one eyelet on an anterior side of each of the body portions 311A and 311B), but the apparatus 310 can include less or more eyelets 318 to secure the respective temporary anchorage devices 118. Further the eyelets 318 can be disposed at any suitable portion of the apparatus 310.

FIG. 6B shows the apparatus 310 within the patient's mouth after the distalization of the patient's molars 104A is completed and gap 108 is formed between the molars 104A and the adjacent teeth 104x. FIG. 6C shows the apparatus 310 within the patient's mouth after the forward arms 321 have been removed and the adjacent teeth 104x (e.g., and other teeth 104) retract in the posterior direction to fill the gap 108 and reduce crowding in the anterior portion of the patient's mouth.

While many of the above examples are described for distalization, mesialization and/or expansion with respect to teeth in the upper dental arch 101, the apparatus 110 can be implemented for distalization and/or mesialization in the lower dental arch 102. One example embodiment suitable for distalization and/or mesialization in the lower dental arch 102 includes the apparatus 310, where separate apparatuses 310 are used on the left and right sides of the lower dental arch 102, e.g., buccally or lingually, with size-reduced form factors. In such example embodiments, the apparatus 310 includes one distalization arm 315 and one forward arm 321 coupled to the lower body portion 311, which can be oriented with respect to the embodiment of the adjustment-drive mechanism 112 implemented in the apparatus 310. The eyelet(s) 318 can provide a securement proximate to the tongue-facing side of the jaw bone or cheek-facing jaw bone, to which the anchorage device 118 may be secured.

Figure 7A:
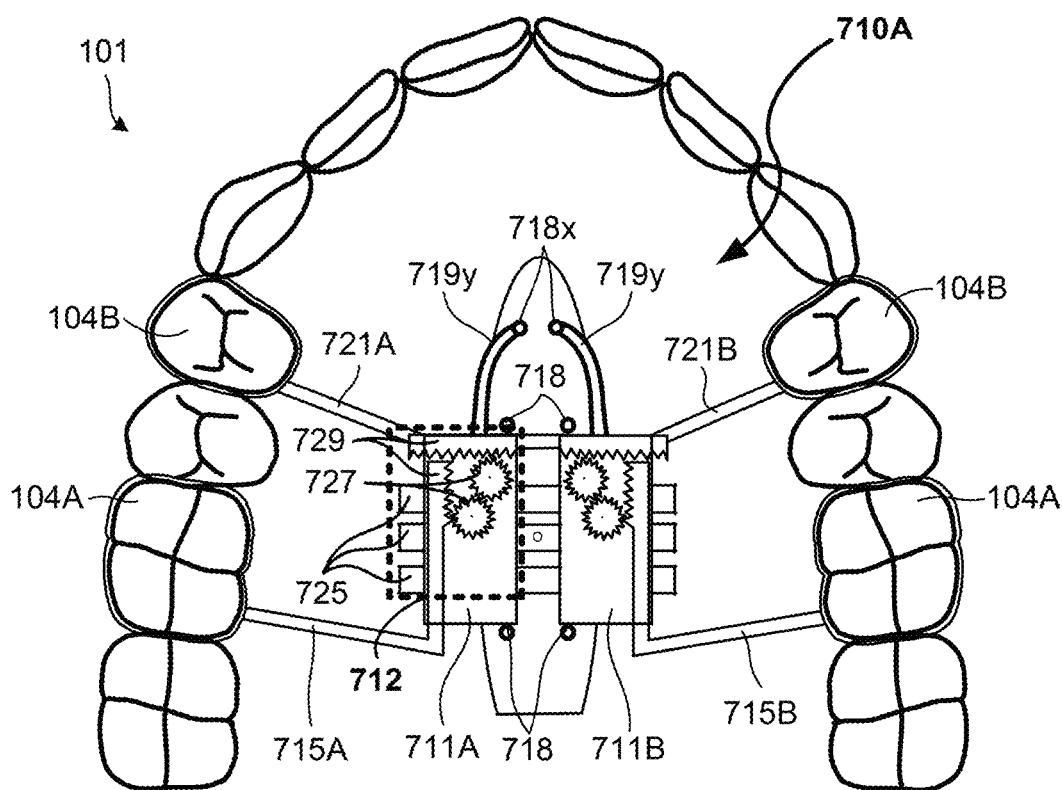
FIGS. 7A-7C show diagrams of other example embodiments of an orthodontic distalization and/or mesialization apparatus in accordance with embodiments of the present technology.

FIG. 7A shows a diagram of an example embodiment of an orthodontic distalization and/or mesialization apparatus in accordance with embodiments of the apparatus 110 shown in FIG. 1B, labeled the apparatus 710A, which depicts an example embodiment of the adjustment-drive mechanism 112, labeled adjustment-drive mechanism 712. In some implementations, for example, the example apparatus 710A can be used for distalization orthodontic treatment to drive movement of a patient's upper molars in the posterior direction without utilizing other teeth as anchorage points for the apparatus 710A to push off from. The apparatus 710A includes two body portions 711A and 711B (collectively as an example embodiment of the body portion 111), which can be spaced apart and brought together by the adjustment-drive mechanism 712. The apparatus 710A includes posterior arms 715A and 715B that are coupled to the body portions 711A and 711B, respectively. The posterior arms 715A and 715B are attachable to molar teeth 104A, e.g., via an attachable article. The apparatus 710A includes anterior arms 721A and 721B that are coupled to the body portions 711A and 711B, respectively. The anterior arms 721A and 721B are attachable to anterior teeth 104B or 104C and can help to secure the apparatus 710A to the anterior teeth 104B or 104C without transferring significant forces on the anterior teeth.

Like the adjustment-drive mechanism 112A of apparatus 110A, the adjustment-drive mechanism 712 includes a rods assembly 725, including one or more rods, disposed within channel(s) of the body portions 711A and 711B and that spans across a separation gap between the body portions 711A and 711B. The rods assembly 725 is operable to guide an expansion movement of the body portions 711A and 711B apart from each other across the separation gap. Yet, in this embodiment of the adjustment-drive mechanism 112, the adjustment-drive mechanism 712 includes a rack and pinion assembly having a pinion set 727 and a rack set 729 disposed in each of the body portions 711A and 711B. The pinion set 727 includes a rotatable shaft with a pinion gear at a first end of the rotatable shaft. The rack set 729 includes a rack gear having a linear array of rack teeth that is fixed to the respective body portion 711A and 711B. As shown in FIG. 7A, each pinion set 727 includes two pinions, a first pinion and a second pinion, each with their rotatable shafts and pinion gears; and each rack set 729 includes two rack gears, a first rack gear and a second rack gear, where the array of linear teeth of the first rack gear interfaces the pinion gear of the first pinion, and where the array of linear teeth of the second rack gear interfaces the pinion gear of the second pinion. In some embodiments, the pinion gears of the first pinion and the second pinon may interface each other; whereas in some embodiments, the first pinion and the second pinion do not interface each other. The rack and pinion assembly (in each body portion 711A and 711B) can operate such that, when the rotatable shaft of a pinon in the pinion set 727 is rotated in a first rotational direction, the rack and pinion assembly translates that rotational motion of the rotatable shaft into linear motion of the rack gear in the corresponding rack set 729 to generate a force that is ultimately applied on the posterior arms 715A and 715B to cause the movement of the molar 104A in the upper dental arch 101, e.g., in the posterior direction for distalization. Yet in some embodiments, the rack and pinion assembly of the adjustment-drive mechanism 712 can be disposed in a different or reverse configuration, where the gear set of the rack and pinion assembly 112 is configured to allow the posterior arms 715A and 715B to move in reverse (forward, mesialization) with the rotating shaft turning in the same rotational direction as when moving posterior arms 715A and 715 B distally, such that the rack and pinion assembly translates the rotational motion of the rotatable shaft into linear motion of the rack gear to generate a force ultimately applied on the posterior arms 715A and 715B to cause the reverse movement of the molar 104A, e.g., in the anterior direction for mesialization.

As shown in FIG. 7A, the apparatus 710A includes the anchorage assembly 120, which in this example embodiment includes one or more TAD receiving elements 718 coupled to the body portions 711A and 711B, e.g., such as an eyelet. Each of the eyelets 718 is configured to receive an anchorage device (e.g., such as embodiments of the anchorage device 118 shown in FIG. 3B or other embodiments), such that each of the respective anchorage devices 118 can pass through their respective eyelets 718 and securely attach into bone (e.g., palatal alveolar bone) to anchor the body portions 711A and 711B of the apparatus 710A to the patient's mouth. In this way, the apparatus 710A can be coupled to the anchorage devices 118 without using anchoring arms 119, like shown in FIG. 7C, while the posterior arms 715A and 715B can still apply a distalization force on the molars 104A, for example. The apparatus 710A can also include anchoring arms 719y coupled to and spanning outward from the body portions 711A and 711B and coupled to eyelets 718x positioned at the outer ends of the anchoring arms 719y. The eyelets 718x are each structured to couple to an anchorage device (e.g., embodiments of the anchorage device 118) that is attachable to bone.

Figure 7B:
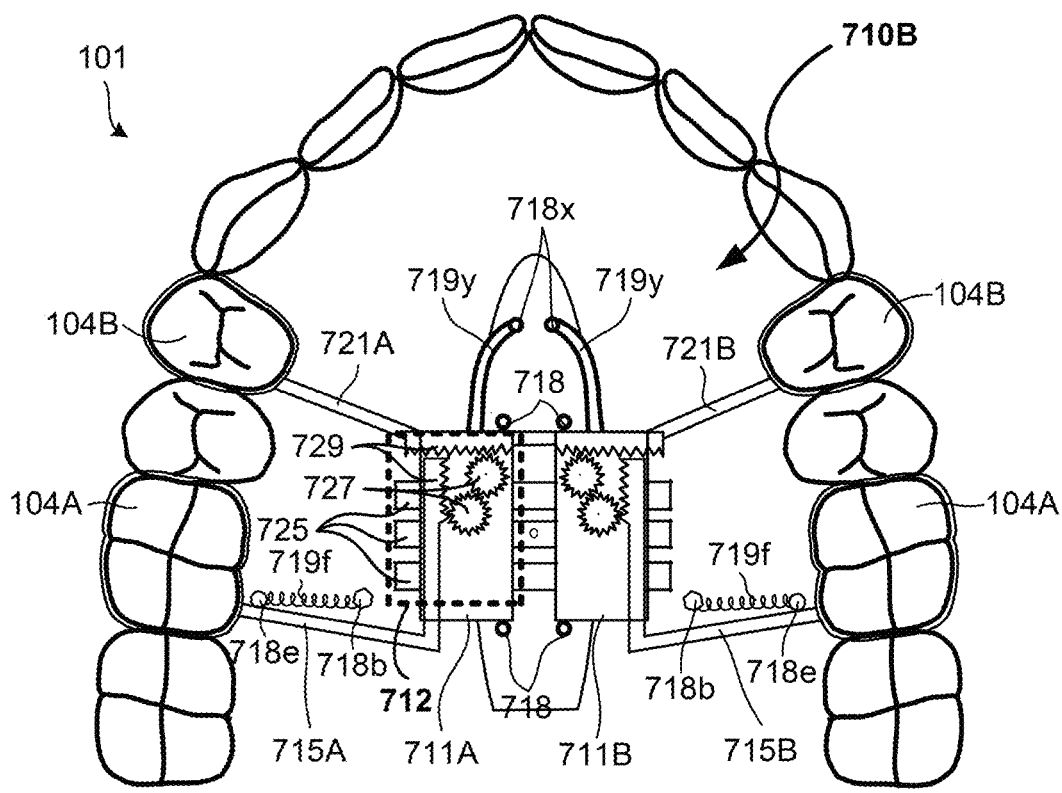

FIG. 7B shows a diagram of an example embodiment of an orthodontic distalization and/or mesialization apparatus in accordance with embodiments of the apparatus 110 shown in FIG. 1B, labeled the apparatus 710B, which includes the adjustment-drive mechanism 712. The apparatus 710C includes the components and mechanisms of the apparatus 710A, yet in this example embodiment, the apparatus 710C can also include a palatal anchorage attachment assembly for each of the posterior arms 715A and 715B, where the palatal anchorage attachment assembly includes an eyelet 718e attached to the posterior arm 715 close to molar 104A and a more superiorly-located anchorage device 718b that is coupled via an elastic or pulling spring 719f. The superior/lateral location of the anchorage device 718b, which can be securely attached (e.g., screwed) to palatal bone, intrudes posterior teeth so that the eyelet 718e moves superiorly, which can close the bite, vertically. In some embodiments, the eyelet 718e attaches to the posterior arm 715 in a superior/medial location on arm 715 with the elastic or pulling spring 719f anchoring to the anchorage device 718b, positioned inferiorly, so that the eyelet moves inferiorly to extrude the molar 104A to open the bite, vertically.

Figure 7C:
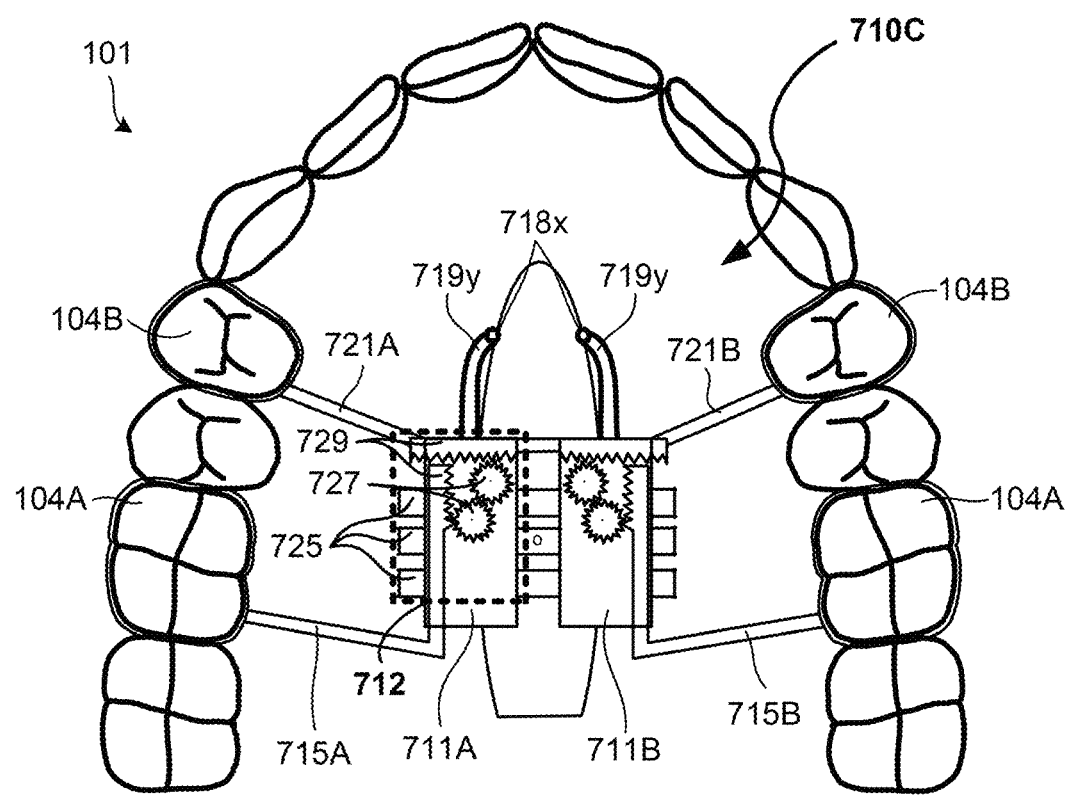

FIG. 7C shows a diagram of an example embodiment of an orthodontic distalization and/or mesialization apparatus in accordance with embodiments of the apparatus 110 shown in FIG. 1B, labeled the apparatus 710C, which includes the adjustment-drive mechanism 712. The apparatus 710C includes the components and mechanisms of the apparatus 710A, except in this example embodiment, the apparatus 710C can securely attach to bone in the patient's mouth based on the anchorage devices 118 through the eyelets 718x positioned at the end of anchoring arms 719y without using eyelets 718 attached to the body portions 711A and 711B, like that shown in FIG. 7A.

Figure 7D:
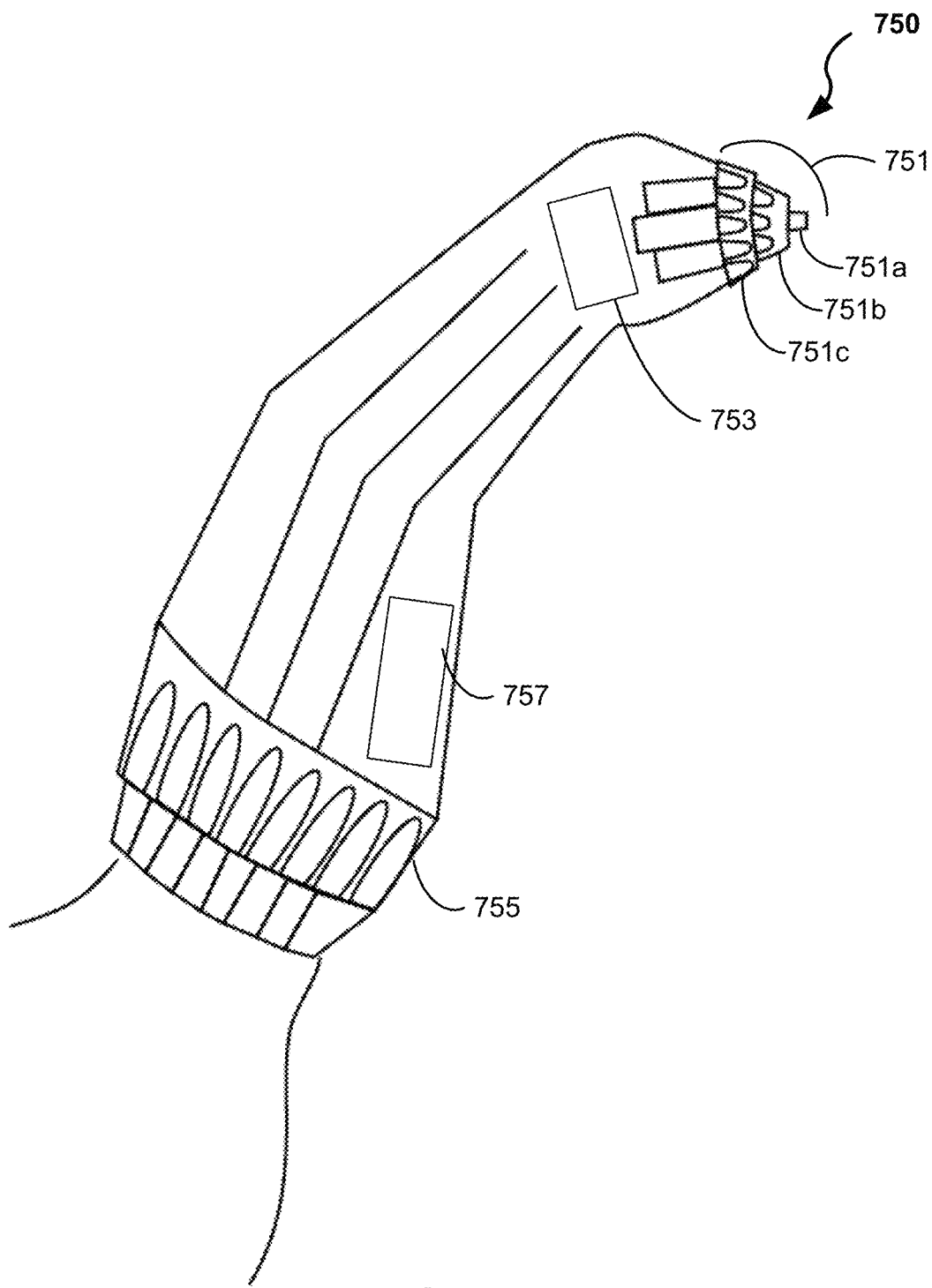
FIG. 7D shows a diagram of an example embodiment of an adjustment tool for interfacing an adjustment dial of an orthodontic distalization and/or mesialization apparatus in accordance with the present technology.

FIG. 7D shows a block diagram of an example embodiment of an adjustment tool 750 (also referred to as a "wrench") for interfacing an adjustment dial of an embodiment of the adjustment-drive mechanism 112 to enable a user of the wrench 750 (e.g., orthodontist) to actuate the posterior arm(s) 115 and/or anterior arms(s) 121 for an expansion, distalization or mesialization procedure of the molars in the patient's mouth. Notably, in some embodiments of the adjustment-drive mechanism 112, the mechanism includes separate adjustment dials corresponding to each of the x-axis and the y-axis for causing molar movement in the dental arch for expansion, distalization or mesialization. In the example shown in FIG. 7D, the wrench 750 includes an adjustment tip 751 that fits with the outward structure of the adjustment dial on the mechanism 112, e.g., such as hex dial, and can address each of the axes of the adjustment-drive mechanism 112 that are to be adjusted. For example, the adjustment tip 751 includes a multi-stage tip including a first (outward) tip 751a, a second (middle) tip 751b, and a third tip 751c. The tips 751b and 751c can interface with a corresponding two-stage dial of the adjustment-drive mechanism 112 to adjust the mechanism in one or two of the x-axis and/or y-axis. The wrench 750 can include multi-axis gear system 753 comprising multiple gears interfaced to structures of a user control to allow optimal ergonomics for adjustment by the user. The tip 751a of the wrench 750 can include a spring-loaded guide pin at the adjustment tip, such that when pressed, the spring-loaded guide pin frees up the hex-tipped supply of energy to turn adjuster dials. Upon removal, for example, the spring-loaded tip can lock the relative positions of the adjusters in the wrench 750 for a next engagement/activation. In some embodiments, for example, within the tip 751 of the wrench 750 includes a sensor that helps direct the patient, e.g., via blinking light and audible beep, that assists in guiding where to exactly position the wrench 750 within the example adjustment dial interface of the apparatus 110.

For example, in some embodiments, the wrench 750 includes one or more interface buttons or rotating dials 755 that can be activated by the user (e.g., via the user's finger(s) or thumb). In such embodiments, each of the one or more interface buttons or rotating dials 755 causes a corresponding tip of the example multi-stage tip 751 to rotate based on the user's adjustment set by the button or rotating dial 755. For example, the user can thereby direct the adjustment energy to the separate adjustment tips 751b, and/or 751c (e.g., hex-shaped tips) of the wrench 750 to drive the adjustment-drive mechanism 112 of the apparatus 110.

In some embodiments, the wrench 750 can include an electronics unit 757, e.g., embedded within the handle of the wrench 750, operable to measure the degree of rotation for each adjustment of the one or more interface buttons or rotating dial 755. In some examples, the electronics unit includes a rotary encoder. In some examples, the electronics unit 757 can include a data processing unit coupled to the rotary encoder or other sensor to measure the degree of rotation for adjustment of the interface button or dial 755. In some embodiments, for example, the signal generated by each incremental turn sends data to a processor of the data processing unit (e.g., on a printed circuit board (PCB) that is battery powered), so that the signals can be stored in a memory of the data processing unit and/or wirelessly transmitted via a wireless transmitter (Tx) or transceiver (Tx/Rx), e.g., via Bluetooth® or other radio signal, to a remote computer. In some implementations, for example, the transmitted data can be sent to the patient's health record or provided to the patient, e.g., via email, to inform the patient as to progress with adjustments and/or to report on how many equivalent months with elastics have been saved, months in treatment, can show a progress graphic of bite correction so that the patient can visualize what is changing in the relationships of their bite.

Figure 7E:
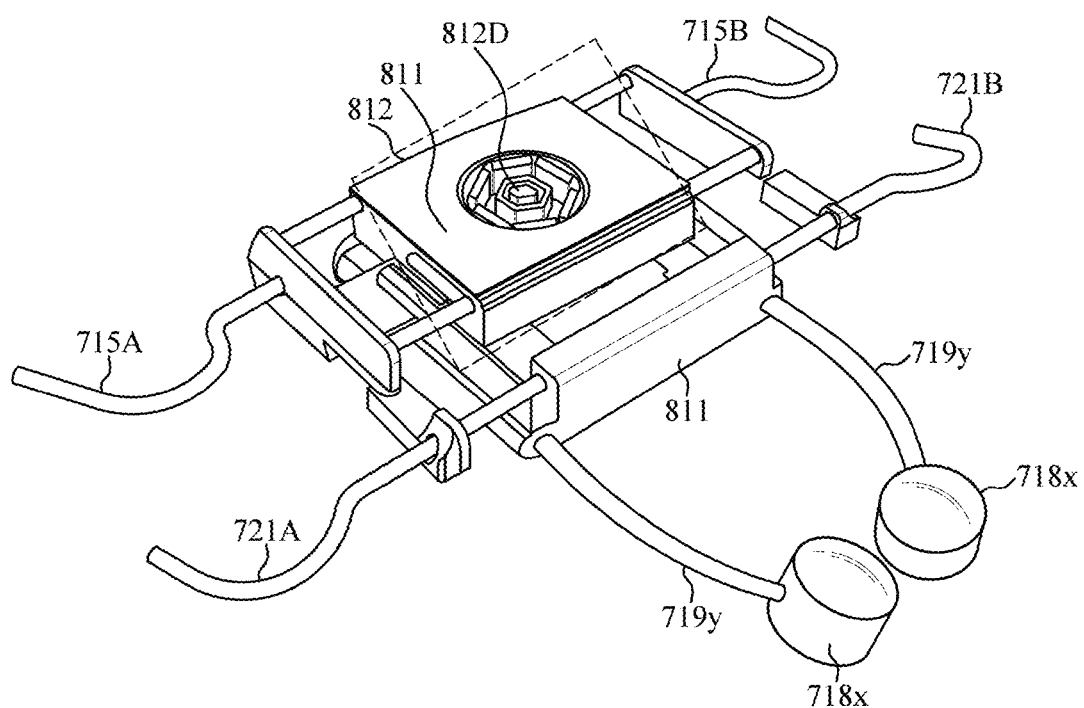
FIGS. 7E-7G show diagrams of another example embodiment of an orthodontic distalization and/or mesialization apparatus in accordance with embodiments of the present technology.

FIG. 7E shows a diagram of an example embodiment of an orthodontic distalization and/or mesialization apparatus in accordance with embodiments of the apparatus 110 shown in FIG. 1B, labeled the apparatus 710E, which depicts an example embodiment of the adjustment-drive mechanism 112, labeled adjustment-drive mechanism 812. In some implementations, for example, the example apparatus 710E can be used for distalization orthodontic treatment to drive movement of a patient's upper molars in the posterior direction without utilizing other teeth as anchorage points for the apparatus 710E to push off from. The apparatus 710E includes a main body portion 811, which houses the adjustment-drive mechanism 812. The adjustment-drive mechanism 812 includes a cam mechanism to convert a rotational motion of an adjustment dial 812D to a linear translation motion of cam arms that a structure in a particular translational direction (e.g., along the x-axis and/or y-axis). The cam dial 812D is coupled to the main cam mechanism (e.g., cam shaft and cam) to translationally drive one or more structures (e.g., one or more cam arms) upon adjustment (e.g., rotation) of the cam dial 812D. The apparatus 710E includes posterior arms 715A and 715B that are coupled to the body portion 811 via the structure driven by the cam arms of the adjustment-drive mechanism 812. Like in other examples, the posterior arms 715A and 715B are attachable to molar teeth 104A, e.g., via an attachable article. The apparatus 710E includes anterior arms 721A and 721B that are coupled to the body portion 811 via the structure driven by the cam arms of the adjustment-drive mechanism 812. Like in other examples, the anterior arms 721A and 721B are attachable to anterior teeth 104B or 104C and can help to secure the apparatus 710A to the anterior teeth 104B or 104C without transferring significant forces on the anterior teeth.

The cam mechanism of the adjustment-drive mechanism 812 can operate such that, when the cam dial 812D is rotated in a first rotational direction, the main cam mechanism translates that rotational motion of the cam shaft into linear motion of a cam arm interfaced with the cam of the cam mechanism to generate a force that is ultimately applied on the posterior arms 715 and/or anterior arms 721. For example, the cam mechanism of the adjustment-drive mechanism 812 can apply force by the cam arms upon the posterior arms 715A and 715B to cause the movement of the molar 104A in the upper dental arch 101, e.g., in the posterior direction for distalization.

As shown in FIG. 7E, the apparatus 710E includes an example embodiment of the anchorage assembly 120, which in this example embodiment includes anchoring arms 719y coupled to and spanning outward from the body portion 811 and coupled to TAD receiving elements 718x (e.g., eyelets) positioned at the outer ends of the anchoring arms 719y. The eyelets 718x are each structured to couple to an anchorage device (e.g., embodiments of the anchorage device 118) that is attachable to bone.

Figure 7F:
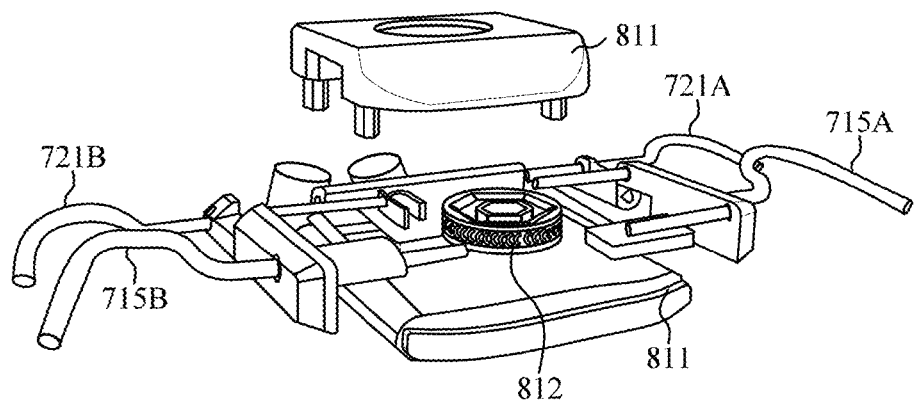

FIG. 7F shows an exploded diagram of the apparatus 710E, showing a detailed view of the example cam adjustment-drive mechanism 812, labeled adjustment-drive mechanism 812.

Figure 7G:
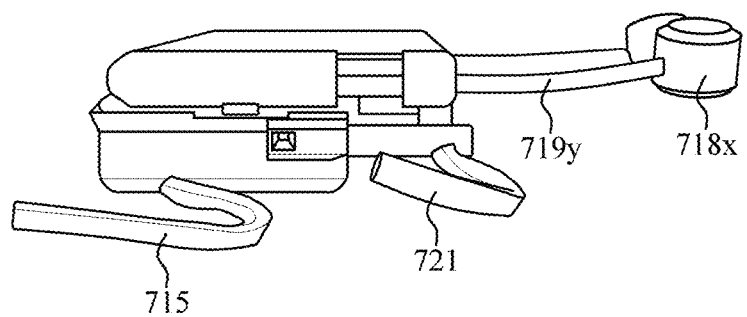

FIG. 7G shows a side view diagram of the apparatus 710E.

The example embodiments of the orthodontic distalization and/or mesialization apparatus 110, including those described in FIGS. 2A-7C and 7E-7G, can include various combinations of the features described for any particular embodiment in other embodiments.

As discussed above, the lack of appropriate consideration of teeth movement for distalization, mesialization, expansion or other process can have long-term detrimental outcomes long after the procedures are concluded and the patient experiences the initial outcomes, even if the outcomes may be satisfactory in the short term. These detrimental long-term outcomes can include root protrusions and gum recession due to the tooth or teeth being moved outside of the supporting bone.

Figure 8A:
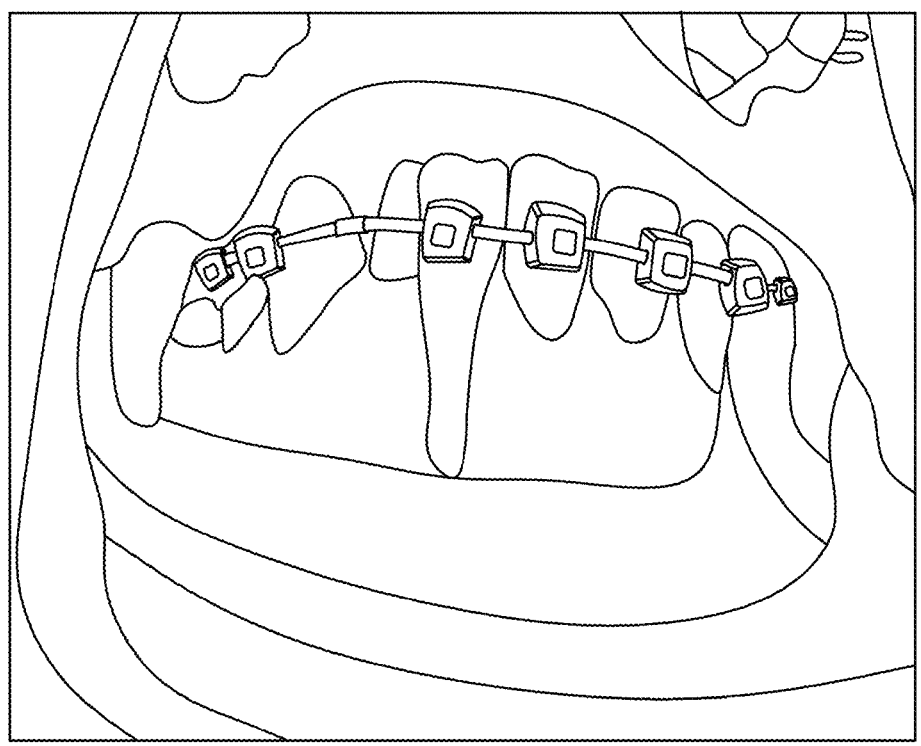
Figure 8C:
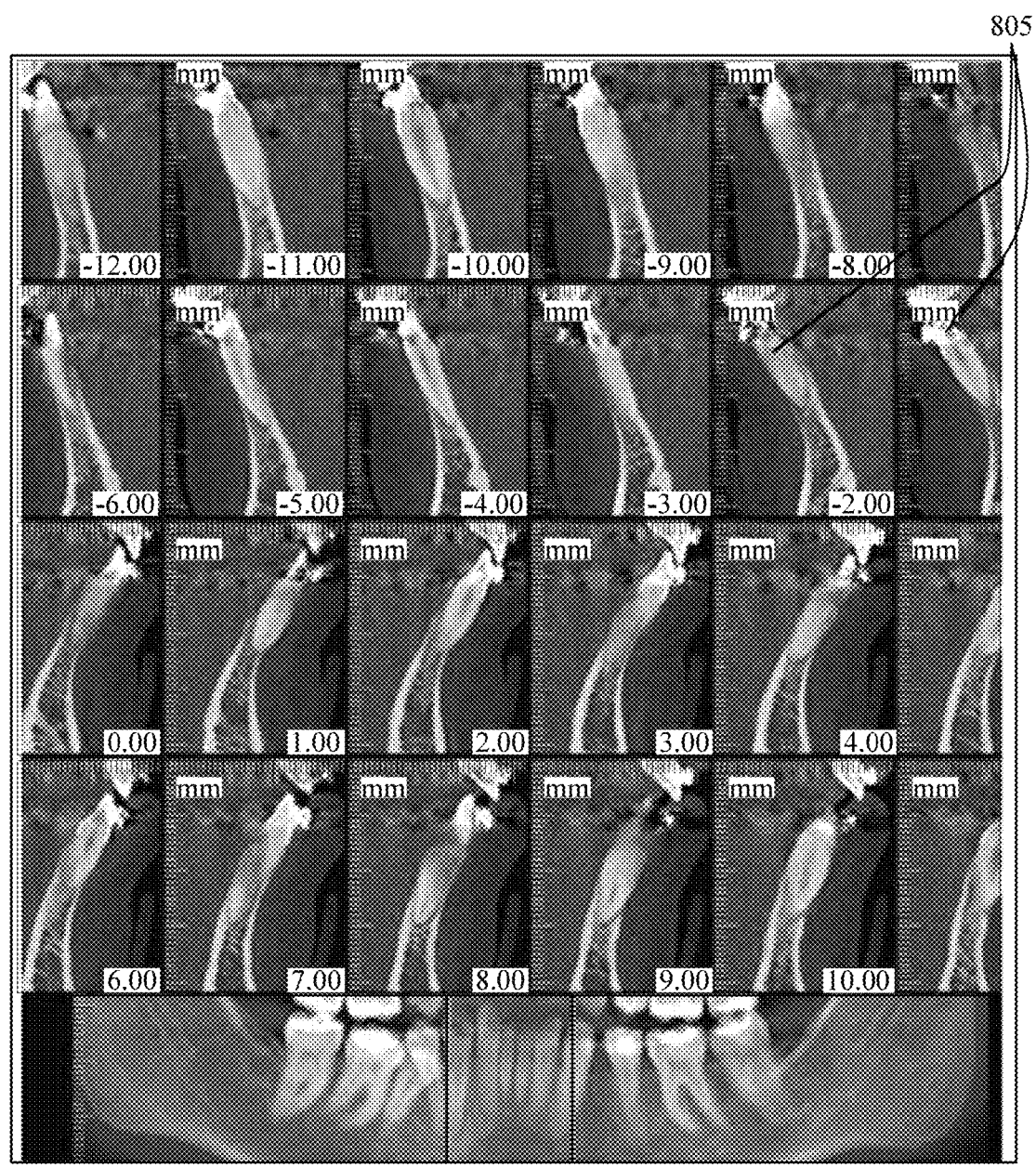

FIGS. 8A-8C show images and diagrams illustrating some examples of detrimental long-term outcomes from over-advancement in moving lower front teeth too forward, implemented using conventional orthodontic techniques and devices. FIG. 8A shows an image demonstrating root protrusion and gum recession in a patient caused by forward-misplaced teeth off of the patient's bone support. FIG. 8B shows a diagram 801 (on right) illustrating normal symphysis and bone support. FIG. 8B also shows a diagram 802 (on left) illustrating thin symphysis and thin bone support, where there is little room for change such that the tooth leaves the supporting bone (like in the image shown in FIG. 8A). FIG. 8C shows an image showing X-rays demonstrating how front tooth 805 cannot move forward (i.e., to the left in the X-ray images) without worsening even more thinned-out bone support. If this thin bone was intended to support an implant placed in a comparable position of orthodontic over-advancement of lower front teeth, such that the implant was only partially immersed in very thin bone at a comparable angle excessively-flared angle, the biting force load would cause the implant to eventually fail (e.g., loosen) from excess stress of the implant not absorbing the vertical bite load in the root's axial dimension (similar to building a highway bridge with generally, non-vertically oriented pillars).

Also disclosed are automated methods, systems and devices for determining a teeth movement plan for precisely positioned teeth (e.g., such as anterior teeth) based on three-dimensional image analysis of a patients' mouth. In some embodiments, the disclosed method is implementable on a software application operating on a computing device, including a mobile device such as a smartphone, tablet, or wearable computing device, for example. In some implementations, the images are derived from Cone Beam Tomography diagnostics systems. The disclosed 3D methods, systems and devices can be implemented for the benefit of patients with extremely limited antero-postero (AP) osseous boundaries within the lower dental.

For example, in order to align crowded teeth, typically one of two decisions must be made. One decision is whether to expand the circumference size ($C=2\pi r$), via non-extraction of the pre-treatment arch curve (equilibrium position) that teeth resided in before alignment to create more space. The other decision is whether to remove tooth structure to align teeth, via extraction or slenderizing teeth (Interproximal Reduction "IPR"), to fit within a reasonable new curve, as close to the pretreatment (equilibrium) position as possible. In more than 25% of patients, for example, the tolerance for teeth being physiologically positioned on a curve different from the pre-treatment (non-equilibrium) curve is almost negligible (like in diagram 802 of FIG. 8B), which can be due to extremely narrow constraints of anatomical bone housing the teeth. Teeth that are positioned too outward or too inward into surrounding cortical plates of bone are far less physiologically placed than in centered, alveolar bone. Significant damage can occur when boundaries of bone are violated. As discussed earlier, because conventional therapeutic orthodontic produce forces commonly derived from structures that are themselves also moving, achieving precision for physiological positioning is left to chance in the absence of (a) meticulous assessment of anatomical limits, (b) mathematical calculation, (c) anchorage reference where needed, and (d) precise treatment planning.

As such, implementations of the disclosed methods are envisioned to accurately calculate the mechanics and predict virtual outcomes in order to generate a recommended orthodontic treatment plan for a patient that may need preservation of the pre-treatment equilibrium AP position of anterior teeth after alignment, e.g., particularly in patients with extremely narrow bone confines. For instance, the disclosed methods can be implemented to recommend to a practitioner an orthodontic treatment protocol that can control where lower incisors are to be moved, if at all, during the treatment and where they will be positioned after the treatment, such that they are always maintained close to within a healthy amount of bone (like in example 801 of FIG. 8B, and not example 802 of FIG. 8B).

The disclosed method can be implemented in software and incorporate 3D CBT X-ray imagery to visualize and plan orthodontic movement of teeth (e.g., in a virtual 3D Matrix). In some implementations, the disclosed method (e.g., software app) can provide a graphical display vector read-out which dynamically changes in response to any planned treatment decisions, pictorially confirming the effect of those decisions. Moreover, the disclosed method (e.g., software app) can be implemented in conjunction with any of the disclosed embodiments of the orthodontic distalization, mesialization, and/or expansion apparatus described herein. For example, this integrated approach of an exemplary 3D orthodontic treatment software app with use of an exemplary orthodontic distalization, mesialization, and/or expansion apparatus can produce and execute the treatment decisions to more precisely control the destinations of aligned teeth in very thin bone (e.g., narrow symphysis).

Figure 9A:
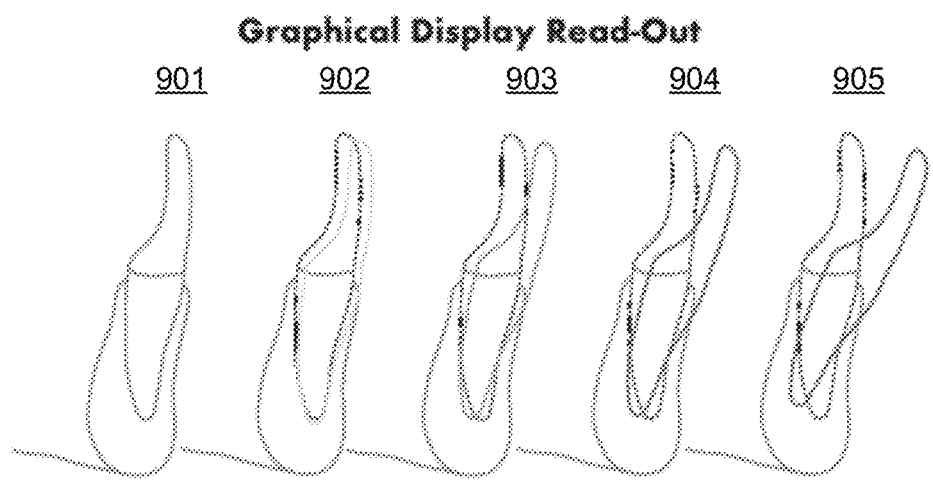

FIG. 9A shows a diagram illustrating an example graphic user interface (GUI) of the software application, displayable on a display screen of a computing device, that provides a graphical display of a tooth orientation in response to a particular treatment option determined by the algorithm of the software application. In one example, the GUI shows an image 901 of a tooth oriented upright and situated in normal symphysis. In this example, the image 901 displays the tooth in a color representing an optimal outcome, e.g., such as green. In another example, the GUI shows an image 902 of a tooth oriented upright but somewhat forward-leaning and situated slightly anteriorly in normal symphysis. In this example, the image 902 displays the tooth in a color representing a good outcome, e.g., such as yellow, but with a broken-line outlay of an optimal situation. In another example, the GUI shows an image 903 of a tooth oriented upright but significantly forward-leaning outward of the cortical bone. In this example, the image 902 displays the tooth in a color representing a concerning outcome, e.g., such as orange, and with a broken-line outlay of a better situation for the tooth in a normal symphysis. In other examples, the GUI shows images 904 and 905 of a tooth oriented in a dangerous forward-leaning direction and outward of the cortical bone to extended degrees, respectively.

The software application includes an algorithm that can operate by determining quantitative values associated with an orthodontic patient based on analysis of image data received and/or processed by the software application. The quantitative values can include (i) pre-treatment equilibrium values of where front teeth are positioned with reference to bony landmarks (e.g., in mm) and values that characterize a degree of teeth crowding in the upper or lower dental arch, (ii) curve of Spee values (e.g., in mm, based on a height between one end of the curve and the other), and (iii) variance from ideal antero-postero (AP) plane of occlusion (e.g., Class II, or Class III severity in mm). The software app is configured to quantitatively compare the received values to an accepted or standard set of values associated with an ideal alignment of teeth and corrected occlusion, e.g., including teeth located within a centered, physiologic position of bone.

The algorithm can be configured to determine teeth movement trajectories that keep aligned teeth on the pre-treatment arch, thereby diminishing the risk of forcing teeth into surrounding cortical bony plates as a result of orthodontic therapy. This requires a precision that is rendered more possible via software projection and calculation within a 3D matrix of the simulated mouth. For example, in a significant percentage of cases treated with disposable aligners, it is perceived that insufficient consideration is given to positioning aligned teeth within more or less centered regions of alveolar bone, and notably cases treated with braces can also involve similar oversights. The software application can provide dental, orthodontic and/or periodontic practitioners with an automated tool for generating a treatment plan for the patient.

The algorithm can be configured to determine (a) space-gain requirements with no anchorage assistance (e.g., in minimal crowding cases) while keeping teeth in a physiologic equilibrium position; and (b) space-gain requirements that includes anchorage reference to either minimize wasted mechanics from Newton's 3rd Law (over-expanding) or minimize closing excess space with extractions (over-retraction) to preserve physiologic positioning.

In some implementations, the software application can generate a user interface that can provide a user input prompt including data entry blanks (e.g., text box entry) near an indication (such as text or an image) of parameter measured, so that the entered data corresponds to pre-treatment diagnostic values. In some implementations, the user interface can provide a user input prompt including check boxes and/or selective scroll down list for the practitioner to select tentative treatment choices (e.g., IPR or extraction) and/or pre-treatment diagnostic values for entry for the algorithm to produce a prospective resolution to the patient's problem(s). For example, the choice of space gain can reflect a numerical suggestion for IPR (e.g., where there is a maximum amount set in app preferences) or for extraction, with a graphical vector representation of whether the teeth are straying from their pre-treatment, equilibrium position. In some implementations, such as in the event that these two choices (e.g., IPR or extraction) predictively fail to prevent the forcing of teeth into cortical bone (e.g., which can be indicated via a graphic, like in FIG. 9A), the algorithm can determine a need for a TAD (temporary anchorage device) option, such that the user interface of the software app can present the TAD in the user input prompt of tentative treatment choices.

Figure 9B:
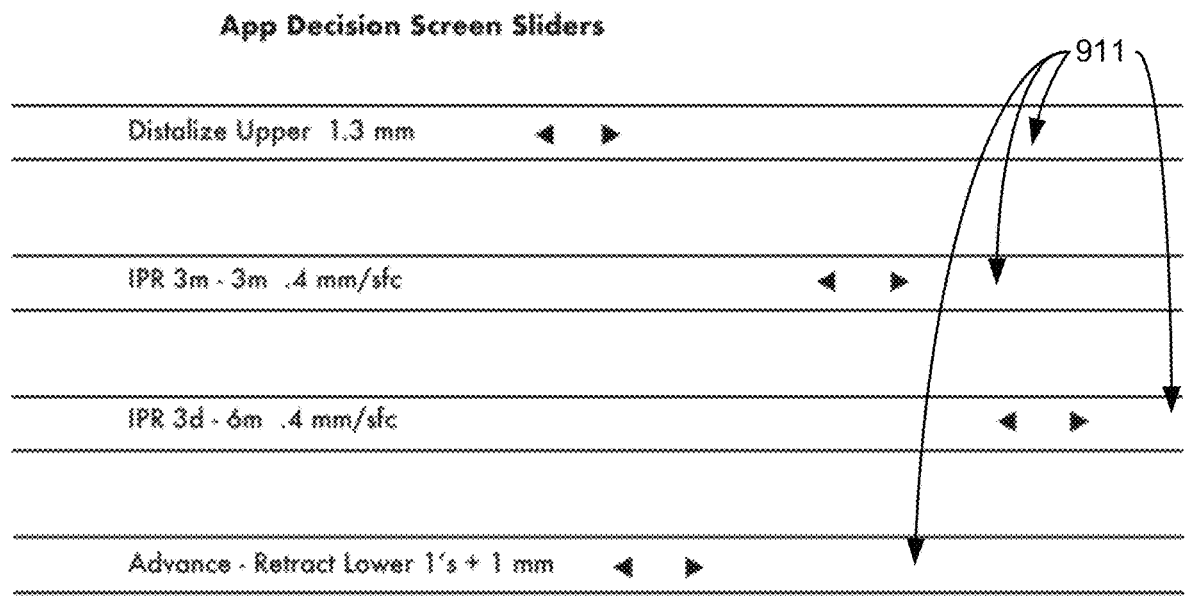

FIG. 9B shows a diagram illustrating an example graphic user interface (GUI) of the software application, displayable on a display screen of a computing device, that provides a graphical display for user input, for data selections and/or data entry. In the example, the GUI 910 includes app decision screen sliders 911 that provide a display interface for a user to slide an icon (e.g., a button, arrow, or other) along the slider box in order to display a desired value associated with a pre-treatment diagnostic value, e.g., such as distalization of upper arch and/or IPR.

FIG. 9C shows a diagram illustrating an example graphic user interface (GUI) of the software application, displayable on a display screen of a computing device, that provides a pseudo-graphical, pseudo-textual display for user input, for data selections and/or data entry. In this example, the GUI includes a tabular value read-out to confirm value decisions of entered text into selected boxes, in which the entered data is associated with practitioner treatment preferences that support the prospective tentative treatment choices (e.g., for IPR or extraction) and/or re-treatment diagnostic values.

FIG. 9D shows a diagram illustrating an example graphic user interface (GUI) of the software application, displayable on a display screen of a computing device, that provides a pseudo-graphical, pseudo-textual display for user input, for data selections and/or data entry from diagnosis. In this example, the GUI includes a check box display for a user to select among presented choices, which can be presented in text and accompanied by graphics, or vice versa. For example, the choice boxes can include prospective tentative treatment options (e.g., for IPR or extraction) and/or pre-treatment diagnostic values.

Figure 9E:
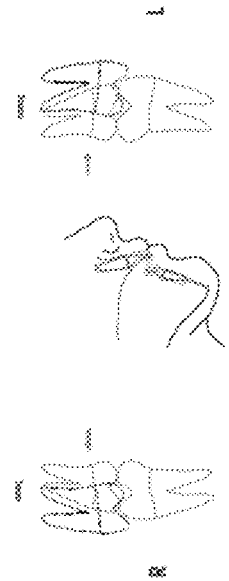
Figure 9E:
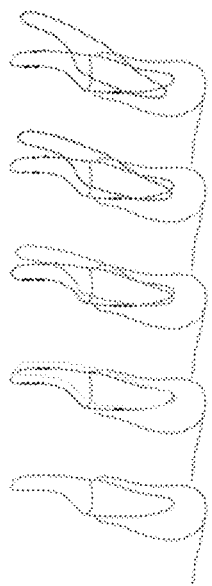

FIG. 9E shows a diagram illustrating an example graphic user interface (GUI) of the software application, displayable on a display screen of a computing device, that provides a combination of graphical and textual displays among the displays shown in FIGS. 9A-9D for user input, for data selections and/or data entry. In this example, the GUI includes the tabular value read-out for a user to confirm values (e.g., displayed as text) in selected boxes, which is accompanied by graphics demonstrating example predictive results based on the prospective tentative treatment options (e.g., for IPR or extraction) and/or pre-treatment diagnostic values entered.

Figure 10:
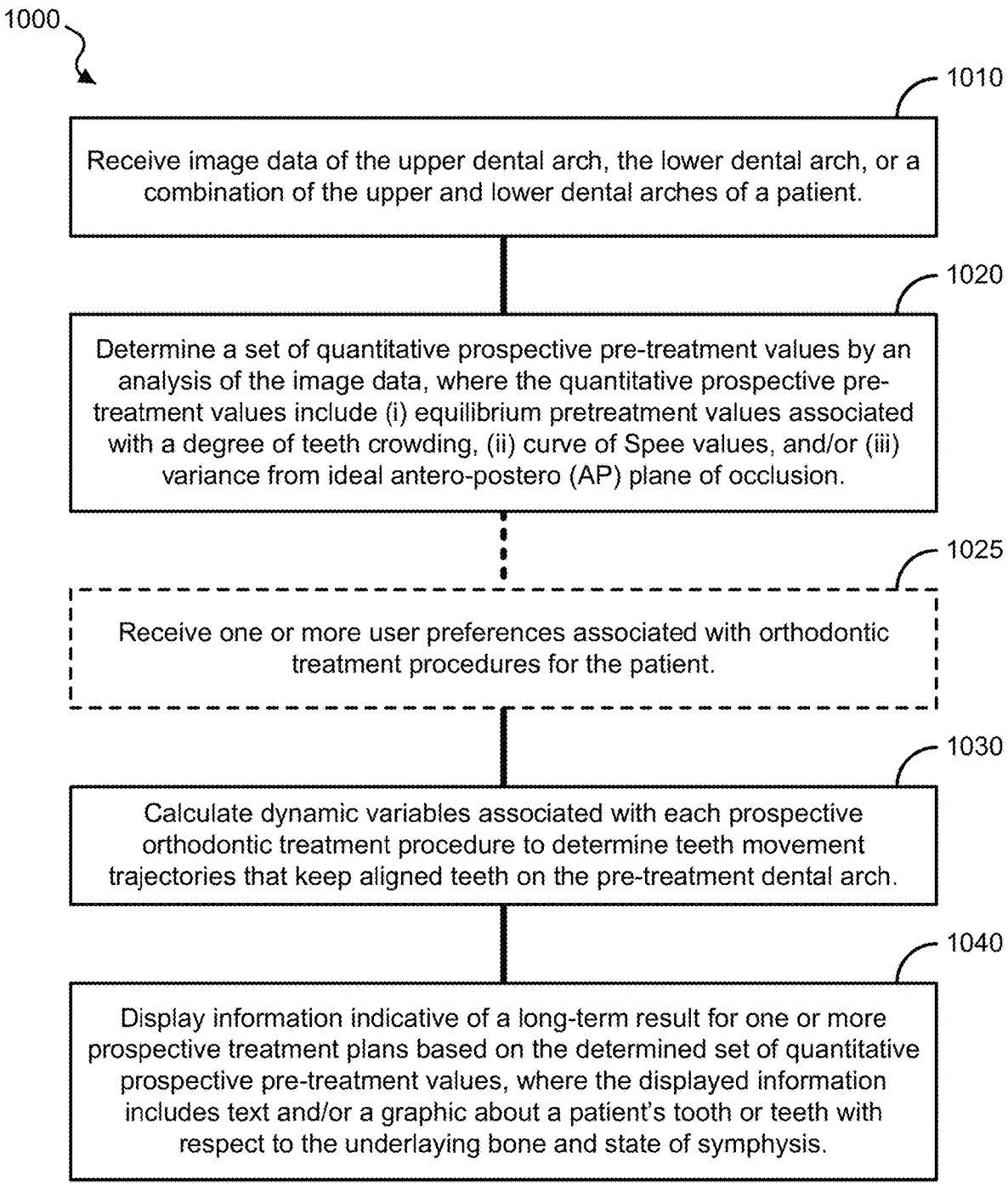
FIG. 10 shows a block diagram of an example embodiment of a method for determining orthodontic treatment parameters and/or determining recommendations for orthodontic treatment options in accordance with the present technology.

FIG. 10 shows a block diagram of an example embodiment of a method for determining orthodontic treatment parameters and/or determining recommendations for orthodontic treatment options, labeled 1000, in accordance with the present technology. The method 1000 includes a process 1010 to receive, e.g., by the software application on a computing device, image data (e.g., 3D images) associated of the upper dental arch, the lower dental arch, or a combination of the upper and lower dental arches of a patient. In some implementations of the process 1010, for example, the image data is obtained by a computed tomography (CT) system, such as a Cone Beam Tomography (CBT) diagnostics system. In some implementations, the image data is in the form of digital (binary) data (e.g., data sets containing parameters associated with dental, orthodontic and/or periodontic information) corresponding to producible images (e.g., 3D images of the patient's dental arch(es)). Whereas, in some implementations, the image data includes the visual images. In such implementations, the method 1000 can include a process to perform image processing on the visual images to extract digital data containing parameters associated with the patient's teeth, bone structure, soft tissue density and other dental, orthodontic and/or periodontic information of interest.

The method 1000 includes a process 1020 to determine, e.g., by the software application on the computing device, a set of quantitative prospective pre-treatment values by an analysis of the image data received and/or processed by the software application. The quantitative prospective pre-treatment values can include one or more of (i) equilibrium pretreatment values (e.g., in mm) that characterize a degree of teeth crowding in the upper or lower dental arch, (ii) curve of Spee values (e.g., in mm, based on a height between one end of the curve and the other), and (iii) variance from ideal Class I antero-postero (AP) plane of occlusion (e.g., in mm). In some implementations of the process 1020, the method 1000 can include quantitatively comparing the parameters extracted from the image data to a standard set of values associated with an ideal alignment of teeth and corrected occlusion, such that the determined quantitative prospective pre-treatment values are within an original pre-treatment curve.

The method 1000 can optionally include a process 1025 to receive, e.g., by the software application on the computing device, one or more user preferences associated with orthodontic treatment procedures for the patient. The user preferences would typically be entered by a practitioner, e.g., an orthodontist, dentist or periodontist. In some examples, the user preferences can include max- or min-constraints for certain parameters associated with the practitioner's tentative treatment choices, which can include an extraction, IPR and/or installation of a TAD. Also, the user preferences can include a pre-treatment diagnostic values or constraint thereof determined by the user (e.g., practitioner) for a tentative treatment choice as a prospective resolution to the patient's problem(s). In implementations of the optional process 1025, the received user preferences can be incorporated in the process 1020 to determine the set of quantitative prospective pre-treatment values.

The method 1000 includes a process 1030 to calculate, e.g., by the software application on the computing device, dynamic variables associated with each prospective orthodontic treatment procedure to determine teeth movement trajectories that keep aligned teeth on the pre-treatment dental arch. In some implementations of the process 1030, the method 1000 includes determining a ranked set of the prospective orthodontic treatment procedures based on a degree of risk in forcing teeth into surrounding cortical bone as a result of the prospective orthodontic treatment procedure (e.g., which procedure has the lowest or highest risk). For example, the dynamic variables can include force vectors, torque, translational motion vectors, degrees of rotation, etc. with respect to teeth.

The method 1000 includes a process 1040 to display, e.g., by the software application on a display screen of the computing device, information indicative of a long-term result for one or more of the prospective treatment plans based on the determined set of quantitative prospective pre-treatment values, where the displayed information includes text and/or a graphic about a patient's tooth or teeth with respect to the underlaying symphysis bone. In some implementations of the process 1040, the display includes a GUI like any of the example GUIs shown in FIGS. 9A-9E.

While implementations of the method 1000 can be implemented to address a variety of orthodontic, dental or periodontic problems or challenges of a patient, the method 1000 is designed to provide a user with a means to protect a patient's lower front teeth when correcting occlusal orthodontic issues, such as Class II overjet. For instance, the disclosed methods can be implemented to recommend to a practitioner an orthodontic treatment protocol that can control where lower incisors are to be moved, if at all, during the treatment and where they will be positioned after the treatment. Conventionally, this is corrected using floating anchorage by elastics; yet as discussed above, elastics often lead to inconsistent and unrepairable long-term damage. The method 1000 is envisioned to provide an automated predictive tool for orthodontic treatment planning that addresses long-term effects of prospective plans contemplated (or not) by the practitioner.

Notably, the method 1000 is described as implemented on the software application of the computing device. Yet, in some implementations, the method 1000 or at least some of the processes of the method 1000 can be implemented on a remote computer in communication with the computing device on which the software application is resident. In some examples, the remote computer that can implemented some or all of the processes of the method 1000 can include a computer in the cloud.

Figure 11:
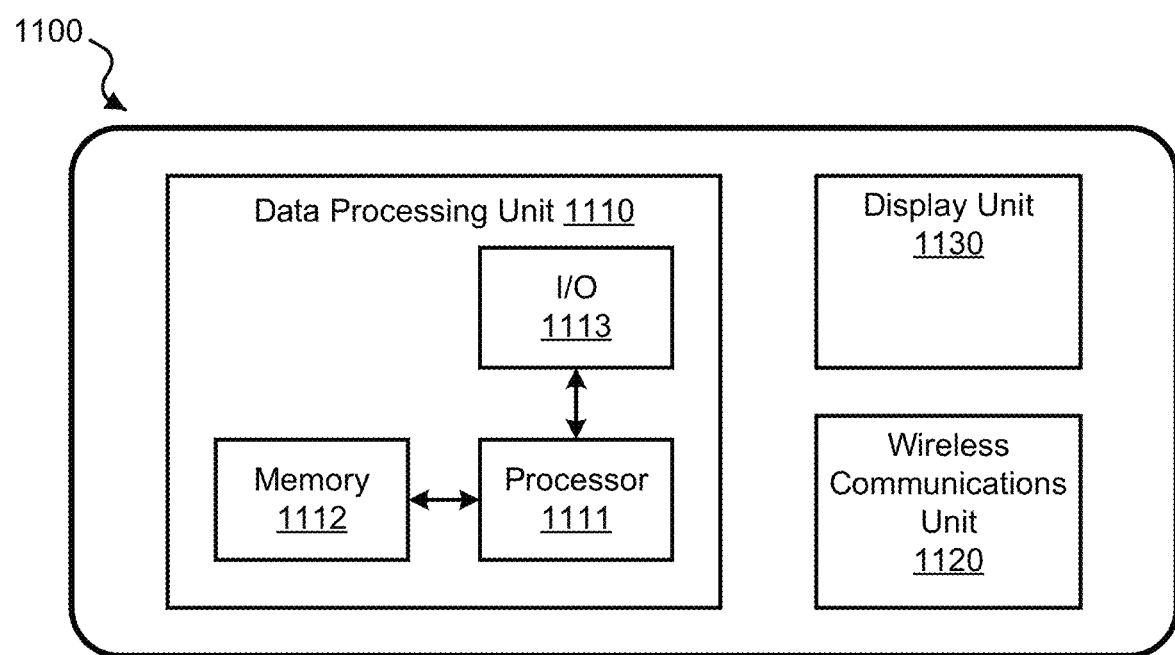
FIG. 11 shows a block diagram of a computing device operable to implement a software application in accordance with the present technology.

FIG. 11 shows a block diagram of an example embodiment of the computing device 1100 operable to store and execute the software application and algorithms and implement the disclosed methods for determining orthodontic treatment parameters and/or determining recommendations for orthodontic treatment options, including the method 1000. In various implementations, the computing device 1100 can be implemented as a desktop computer or a mobile communications device, such as a smartphone, tablet or wearable device, like a smartphone. The computing device 1100 includes a data processing unit 1110 includes a processor 1111 to process data, a memory 1112 in communication with the processor 1111 to store data, and an input/output unit (I/O) 1113 to interface the processor 1111 and/or memory 1112 to other modules, units or devices, including other external computing devices. For example, the processor 1111 can include a central processing unit (CPU) or a microcontroller unit (MCU). For example, the memory 1112 can include and store processor-executable code, which when executed by the processor, configures the data processing unit 1100 to perform various operations, e.g., such as receiving information, commands, and/or data, processing information and data, and transmitting or providing information/data to another device. In some implementations, the data processing unit 1100 can transmit raw or processed data to a computer system or communication network accessible via the Internet (referred to as 'the cloud') that includes one or more remote computational processing devices (e.g., servers in the cloud). To support various functions of the data processing unit 1100, the memory 1112 can store information and data, such as instructions, software, values, images, and other data processed or referenced by the processor. For example, various types of Random Access Memory (RAM) devices, Read Only Memory (ROM) devices, Flash Memory devices, and other suitable storage media can be used to implement storage functions of the memory 1112. In some embodiments, the data processing unit 1100 includes a wireless communication unit 1120, such as a wireless transmitter to transmit stored and/or processed data or a wireless transceiver (Tx/Rx) to transmit and receive data. The I/O 1113 of the data processing unit 1100 can interface the data processing unit 1100 with the wireless communications unit 1120 to utilize various types of wired or wireless interfaces compatible with typical data communication standards, for example, which can be used in communications of the data processing unit 1100 with other devices, via a wireless transmitter/receiver (Tx/Rx) unit, e.g., including, but not limited to, Bluetooth®, Bluetooth® low energy, Zigbee®, IEEE 802.11, Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, NFC (Near Field Communication), and parallel interfaces. In some embodiments, the data processing unit 1100 includes a display unit 1130, which can include a visual display such as a display screen, an audio display such as a speaker, or other type of display or combinations thereof. The I/O 1113 of the data processing unit 1100 can also interface with other external interfaces, sources of data storage, and/or visual or audio display devices, etc. to retrieve and transfer data and information that can be processed by the processor 1111, stored in the memory 1112, or exhibited on an output unit (e.g., display unit 1130) of the computing device 1100 or an external device. For example, the display unit 1130 can be configured to be in data communication with the data processing unit 1100, e.g., via the I/O 1113, to provide a visual display, an audio display, and/or other sensory display that produces the user interface of the software application. In some examples, the display unit 1130 can include various types of screen displays, speakers, or printing interfaces, e.g., including but not limited to, light emitting diode (LED), or liquid crystal display (LCD) monitor or screen, cathode ray tube (CRT) as a visual display; audio signal transducer apparatuses as an audio display; and/or toner, liquid inkjet, solid ink, dye sublimation, inkless (e.g., such as thermal or UV) printing apparatuses, etc.

Example Embodiments of Distalizing/Expansion Devices in Aligner Articles

Figure 12A:
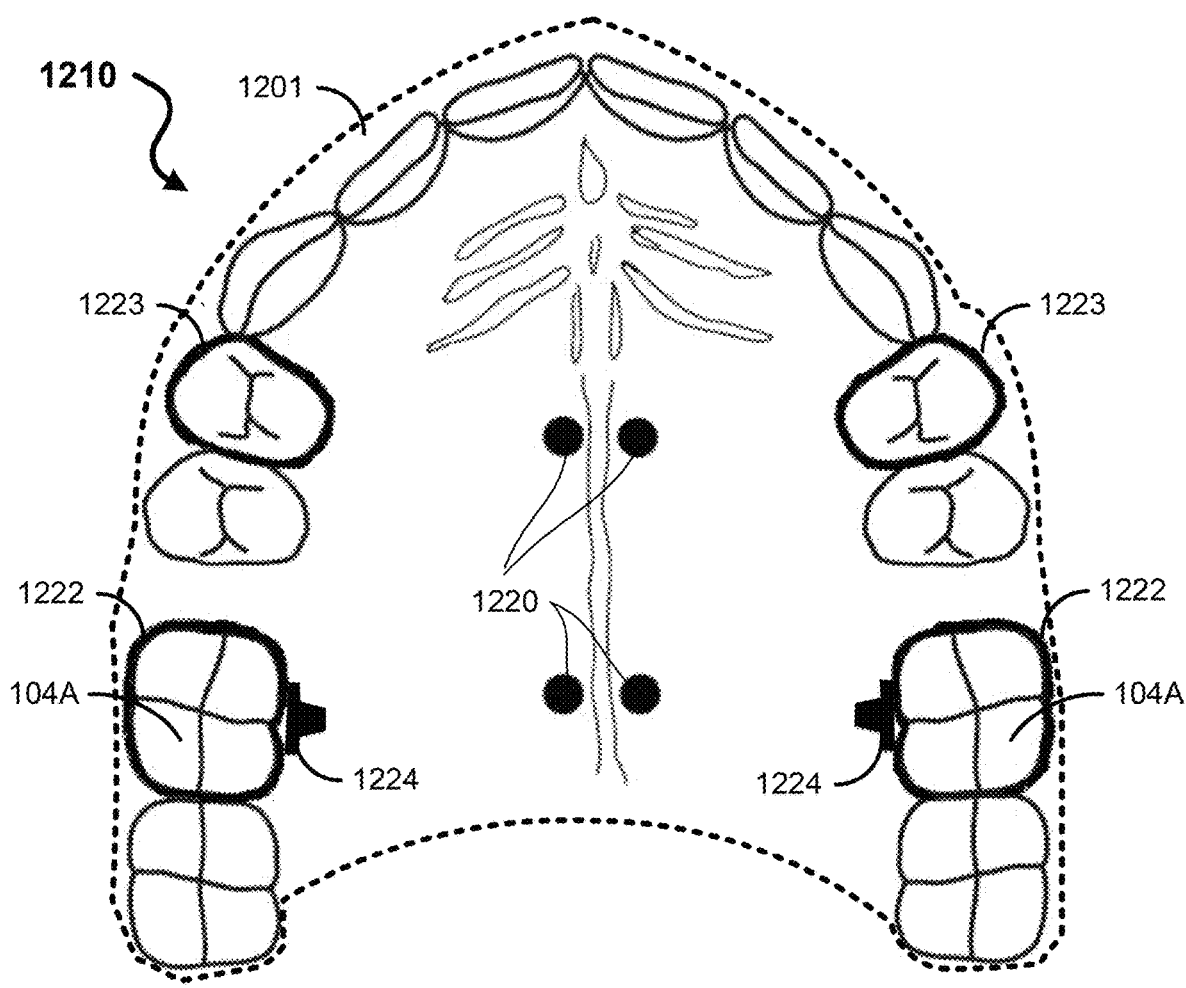
FIGS. 12A-12D show diagrams depicting an example embodiment of a plastic aligner-integrated orthodontic distalization and/or expansion apparatus in accordance with the present technology.

FIG. 12A shows a diagram of an example embodiment of an orthodontic distalization and/or mesialization apparatus in accordance with the present technology, labeled apparatus 1210. The apparatus 1210 can be configured to integrate into a wearable aligner (e.g., disposable aligner, such as plastic aligners) to achieve distalization and/or mesialization based on anchorage created by an anchorage device in order to result in controlled movement of teeth for a desired orthodontic correction. As shown in the diagram, the distalizing/expander apparatus 1210 is integrated into a plastic aligner 1201, e.g., instead of the adjustable hardware implementations. The aligner-based distalizing/expander apparatus 1210 includes temporary anchorage devices 1220 (TADs, e.g., two to four, or more) that are placed near the mid-palatal suture with front to back locations of the bisect of mesial of upper first molars and distal of upper canines. The molars 104A can be attached to attachment articles 1222 of the apparatus 1210 (e.g., metal rings, also referred to as "band attachments") that have attached receiver components 1224, e.g., soldered to the metal rings. In some embodiments of the apparatus 1210, for example, non-molar 104B or 104C can be attached to attachment articles 1223. In some embodiments, the receiver components 1224 can include one or more lugs that accept a portion of the plastic aligner 1201 or slots with corresponding metal tapered inserts that are embedded into the plastic aligner 1201. In some embodiments, the receiver components 1224 can include a lingual or buccal box that can be filled with composite attachments shaped in a way that optimizes translation of aligner forces onto the molars. The forces upon plastic attachments bonded to teeth are significant in the expansion and anterio-posterior movements, and breakage of conventional plastic attachments does not help efficiency because new records would have to be taken to restore the accuracy of the treatment aligner series, so that the rings and connected attachments are far more stable than bonded attachments. Each aligner is designed with incremental intention to transfer energy bound in aligner plastic to TADs in a lateral direction for expansion of bones of the palate and each TAD allows reciprocal resistance of incrementally-designed aligners that are translating bound up energy in plastic aligners to molars in a distal (or mesial) direction).

As shown in FIG. 12A, the example plastic aligner 1201 is extended to cover the whole palate, and the apparatus 1210 includes four TADs 1220, e.g., a set of two anterior (front) TADs and a set of posterior (back) TADs. In example implementations to distalize, the front set of TADs and/or the back set of TADs can allow a coupled receiver component 1224-attachment article 1222 assembly (e.g., lug-connected-to-metal ring) to push off from the TADs so that each incremental pushback of molars (programmed into aligners) would not allow front teeth to move reciprocally forward, i.e., the TADs 1220 would take the reciprocal hit of force. The example lug-connected-to-metal ring assembly can provide the connection like a "weld" of plastic to metal ring. For example, progressive aligners would then be able to have the example lug-connected-to-metal ring assembly push off the TADs 1220 so that distalization can occur.

The 1201 plastic aligner can be made to fit tightly around the receiver component 1224-attachment article 1222 assembly (e.g., around the inside lugs on the rings) to hold the aligner. In implementations, for example, the TADs 1220 can provide a 'handle' to make the palate wider, e.g., because each aligner can be made so that the TAD receivers in the aligner are slightly wider than in the mouth. For example, the TADs (and higher up bone in the skeletal complex) could be separated width-wise by the aligner-integrated device, thereby expanding the palate.

In some embodiments, the posterior set of TADs 1220 allows the aligner 1201 to resist bite closure as biting energy is not allowed to intrude posterior teeth as much because the TAD(s) resist compression of posterior teeth into bone as aligner plastic is prevented from compressing soft tissue in biting. This firm anchorage fortifies control of vertical dimension, e.g., to keep the bite from over-closing in aligner treatment.

It is noted that the example embodiments of the aligner-based distalizing/expander apparatus 1210 can include relevant components and features as described for the hardware-based embodiments of the apparatus 110, e.g., described in FIGS. 2A-7C and 7E-7G, and can include various combinations of such relevant components and features.

Figure 12B:
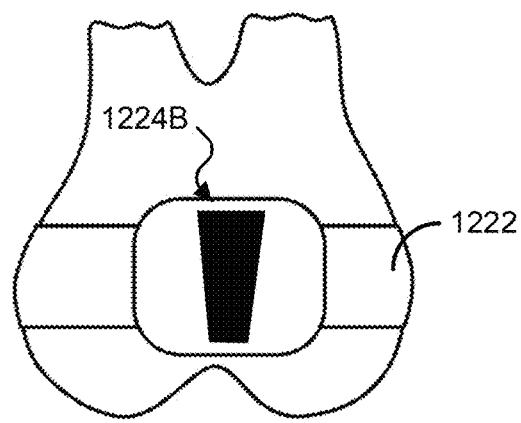

FIG. 12B shows a diagram illustrating an example embodiment of a lug receiver component 1224B that is able to attach on the inside of the example band attachment article 1222. In this example, one of the band attachments 1222 is shown (e.g., a single tapered rhomboid coupled to (e.g., welded to) a rectangular body pad that is coupled to (e.g., welded to) a band. In some embodiments, the band attachment 1222 can include a taper on a band for a slot component of the attachment that could have a metallic counterpart that would embed in aligner plastic, e.g., to ease the friction.

Figure 12C:
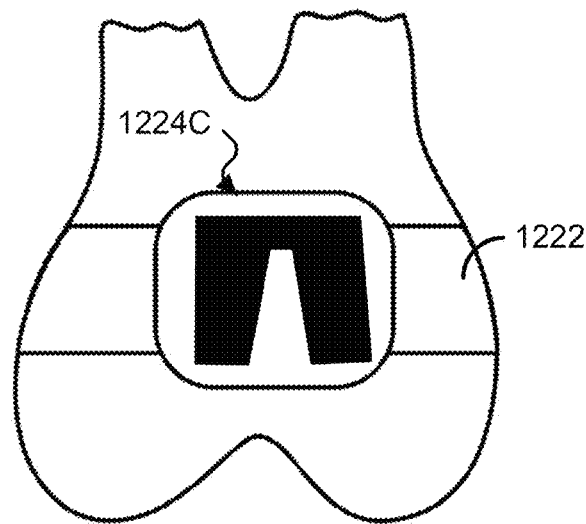

FIG. 12C shows a diagram illustrating an example embodiment of a dual-lug receiver component 1224C that is able to attach on the inside or outside of the example band attachment article 1222.

Figure 12D:
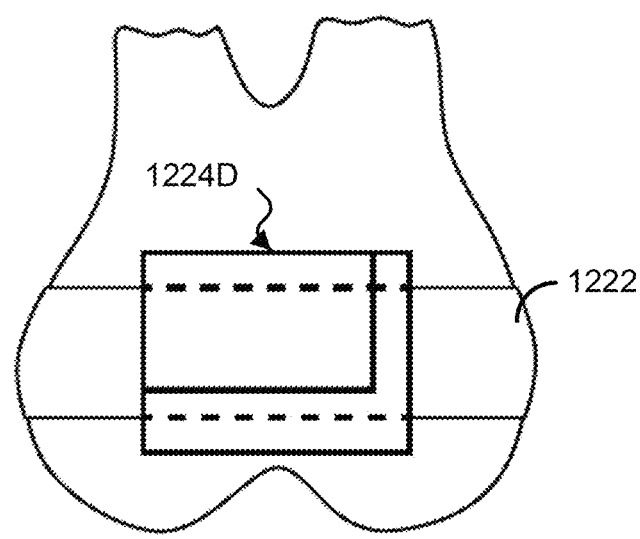

FIG. 12D shows a diagram illustrating an example embodiment of the lingual or buccal box receiver component 1224D that is able to attach on the inside or outside of the example band attachment article 1222. In implementations, for example, the lingual or buccal box receiver component 1224D allow a custom-shaped plastic attachment to be embedded into the box so that aligners can be interfacing with optimally-custom designed attachments.

EXAMPLES

In some embodiments in accordance with the disclosed technology (example A1), an apparatus for distalizing or mesializing molars in the upper dental arch of a patient's mouth includes an apparatus body having an adjustment-drive mechanism, distalization arms coupled to the adjustment-drive mechanism of the apparatus body and attachable to the molars, forward arms coupled to the apparatus body and attachable to other teeth of the patient's mouth including bicuspids or indirectly to incisors, and an anchorage device attachable to a bone of the patient's mouth (e.g., palatal bone or buccal bone or labial bone), wherein the distalization arms are configured to transfer a force onto the molars when the adjustment-drive mechanism is actuated (e.g., a rotatable component of the drive rotates in a first direction) to cause movement of the molars in a posterior direction, wherein the distalization arms are configured to transfer a force onto the molars when the adjustment-drive mechanism is adjusted in a second direction opposite the first direction to cause movement of the molars in an anterior direction.

Example A2 includes the apparatus of any of examples A1-A4, wherein the adjustment-drive mechanism includes a rack and pinion device or an expansion screw drive having a rotatable component, wherein, when the rotatable component is rotated in the first direction, the adjustment-drive mechanism creates the force to cause the movement of the molars in the posterior direction for distalization, and/or wherein, when the rotatable component is rotated in the second direction, the adjustment-drive mechanism creates the force to cause the movement of the molars in the anterior direction for mesialization.

Example A3 includes the apparatus of any of examples A1-A4, wherein the apparatus includes anchoring arms coupled to the apparatus body and to the anchorage device.

Example A4 includes the apparatus of any of examples A1-A4, wherein the apparatus includes a first set of attachment articles attachable to the molars and coupled to the distalization arms and/or a second set of attachment articles attachable to the other teeth and coupled to the forward arms.

In some embodiments in accordance with the disclosed technology (example A5), a method for correcting Class II malocclusion and overcrowding in the upper dental arch of a patient's mouth using the apparatus of any of examples A1-A4 includes, applying a force on the patient's molars transferred by the distalization arms to cause the molars to move in the posterior direction to make room for teeth located in an anterior direction with respect to the molars to shift into a gap created from movement of the molars in the posterior direction, wherein the anchoring device is able to provide a stable anchoring point for the apparatus to at least reduce an amount of force applied to other teeth in the upper dental arch during distalization of the molars as the molars move in the posterior direction.

In some embodiments in accordance with the disclosed technology (example A6), a method for correcting Class II malocclusion and overcrowding in the upper dental arch of a patient's mouth using the apparatus of any of examples A1-A4 includes applying expansive and distalizing forces on the molars using distalization arms to move the molars in the posterior and lateral direction, wherein movement of the molars in the posterior and lateral direction is able to modify a transverse bite relationship and make room for teeth located in an anterior region of the upper dental arch by distalizing the teeth in the upper dental arch.

In some embodiments in accordance with the disclosed technology (example A7), a method for correcting Class III malocclusion in the upper dental arch of a patient's mouth using the apparatus of any of examples A1-A4 includes applying expansive and mesializing forces on the molars using the distalization arms to move the molars in the anterior and lateral direction, wherein movement of the molars in the anterior and lateral direction is able to modify a transverse bite relationship of the upper dental arch by mesializing the teeth in the upper dental arch.

In some embodiments in accordance with the disclosed technology (example B1), an apparatus for distalization or mesialization of molars in an upper dental arch of a mouth includes an apparatus body having an adjustment-drive mechanism, the adjustment-drive mechanism including an actuatable component; a first arm coupled to the adjustment-drive mechanism of the apparatus body and attachable to a molar tooth in the upper dental arch; a second arm coupled to the apparatus body and attachable to a non-molar tooth of the upper dental arch; and an anchorage device coupled to the apparatus body and attachable to a bone in the mouth, wherein the first arm is configured to transfer a force onto the molar tooth when the adjustment-drive mechanism is actuated to cause movement of the molar tooth in the upper dental arch in a direction determined by actuation of the adjustment-drive mechanism, and wherein the anchorage device is operable to positionally stabilize the apparatus body and the second arm to reduce force potentially applied to the non-molar tooth to prevent movement of the non-molar tooth in the upper dental arch.

Example B2 includes the apparatus of any of the examples B1-B23, wherein the direction of the movement of the molar tooth is in a posterior direction into the mouth when the adjustment-drive mechanism is actuated for distalization, and wherein the direction of the movement of the molar tooth is in an anterior direction out of the mouth when the adjustment-drive mechanism is actuated for mesialization.

Example B3 includes the apparatus of any of the examples B1-B23, wherein the adjustment-drive mechanism includes a rack and pinion assembly having a rotatable shaft providing the actuatable component and having a pinion gear at a first end of the shaft that interfaces with a rack gear having a linear array of rack teeth, wherein, when the rotatable shaft is rotated in a first rotation direction, the adjustment-drive mechanism translates rotational motion of the rotatable shaft into linear motion to generate the force to cause the movement of the molar tooth in the upper dental arch.

Example B4 includes the apparatus of any of the examples B1-B23, wherein the adjustment-drive mechanism includes a screw coupled to the first arm within a housing of or attached to the apparatus body, wherein the screw provides the actuatable component that is operable to adjust a change in length of the first arm outward or inward with respect to the apparatus body and thereby generate the force to cause the movement of the molar tooth in the upper dental arch.

Example B5 includes the apparatus of any of the examples B1-B23, wherein the adjustment-drive mechanism includes a cam assembly coupled to the first arm within a housing of the apparatus body, wherein the cam assembly includes an adjustment dial coupled to a cam shaft providing the actuatable component that is operable to adjust a change in length of the first arm outward or inward with respect to the apparatus body and thereby generate the force to cause the movement of the molar tooth in the upper dental arch.

Example B6 includes the apparatus of any of the examples B1-B23, wherein the adjustment-drive mechanism is directly or indirectly coupled to the first arm and configured to apply a force by adjusting a length or a tension of the first arm that thereby causes the movement of the molar tooth in the upper dental arch.

Example B7 includes the apparatus of any of the examples B1-B23, including one or more anchoring arms coupled to the apparatus body and to the anchorage device, the one or more anchoring arms including a rigid material and spanning from at least one side of the apparatus body to the connect the anchorage device to the apparatus body at a fixed distance.

Example B8 includes the apparatus of example B7, wherein the rigid material includes a hard plastic, a metal, or a composite.

Example B9 includes the apparatus of any of the examples B1-B23, wherein the anchorage device includes a head portion, a tapered portion, and a body portion between the head portion and the tapered portion, wherein the body portion provides a structure that allows the anchorage device to be coupled to the apparatus body, and the tapered portion provides a structure that is insertable into the bone.

Example B10 includes the apparatus of any of the examples B9-B14, wherein the tapered portion includes a threaded section allows the tapered portion to be screwed into the bone and securely hold the anchorage device to the bone.

Example B11 includes the apparatus of any of the examples B9-B14, including a cap reversibly attachable to the head portion to the to assist in attachment or detachment of the anchorage device to or from the bone.

Example B12 includes the apparatus of any of the examples B9-B14, including a pad attachable to the head portion to provide an interface surface for the anchorage device to rest on soft tissue of the mouth.

Example B13 includes the apparatus of any of the examples B1-B23, wherein the anchorage device includes a pad to provide an interface surface for the anchorage device to rest on soft tissue of the mouth.

Example B14 includes the apparatus of any of the examples B12 or B13, wherein the pad includes acrylic.

Example B15 includes the apparatus of any of the examples B1-B23, wherein the adjustment-drive mechanism further includes a rods assembly, and wherein the apparatus body includes two body portions that can be spaced apart and brought together by the adjustment-drive mechanism, where the rods assembly includes one or more rods disposed within one or more channels of the two body portions, respectively, that span across a separation gap between the two body portions, such that the rods assembly is operable to guide an expansion movement of the two body portions apart from each other across the separation gap.

Example B16 includes the apparatus of any of the examples B1-B23, including one or more eyelets coupled to the apparatus body and including an opening to allow the anchorage device to traverse through to attach to the bone in the mouth.

Example B17 includes the apparatus of any of the examples B1-B23, including one or more anchoring arms coupled to the apparatus body and to the anchorage device, the one or more anchoring arms spanning outward from the apparatus body and coupled to one or more eyelets, respectively, positioned at an outer end of each of the one or more anchoring arms, wherein the one or more eyelets include an opening to allow the anchorage device to traverse through to attach to the bone in the mouth.

Example B18 includes the apparatus of any of the examples B1-B23, including a first attachment article attachable to the molar tooth and coupled to the first arm, and a second attachment article attachable to the non-molar tooth and coupled to the second arm.

Example B19 includes the apparatus of any of the examples B1-B23, wherein the adjustment-drive mechanism is configured to cause a lateral movement of the molar tooth in the upper dental arch.

Example B20 includes the apparatus of any of the examples B1-B23, wherein the bone to which the anchorage device attaches includes palatal alveolar bone located superior to the palate of the mouth or indirectly to buccal bone or labial bone in a lateral region of the mouth.

Example B21 includes the apparatus of any of the examples B1-B23, including a third arm coupled to the adjustment-drive mechanism of the apparatus body and attachable to a second molar tooth in the upper dental arch; and a fourth arm coupled to the apparatus body and attachable to a second non-molar tooth teeth of the upper dental arch, wherein the apparatus body is configured to be positioned proximate a roof of the mouth, wherein the third arm is configured to transfer a force onto the second molar tooth when the adjustment-drive mechanism is actuated to cause movement of the second molar tooth in the upper dental arch in the direction determined by actuation of the adjustment-drive mechanism, and wherein the fourth arm is configured with the apparatus body to be stabilized by the anchorage device to reduce potential force applied to the fourth non-molar tooth to prevent movement of the fourth non-molar tooth in the upper dental arch.

Example B22 includes the apparatus of any of examples B21 or B23, wherein the direction of the movement of the second molar tooth is in a posterior direction into the mouth when the adjustment-drive mechanism is actuated for distalization, and wherein the direction of the movement of the second molar tooth is in an anterior direction out of the mouth when the adjustment-drive mechanism is actuated for mesialization.

Example B23 includes the apparatus of any of examples B21-B23, including a third attachment article attachable to the second molar tooth and coupled to the third arm, and a fourth attachment article attachable to the second non-molar tooth and coupled to the fourth arm.

In some embodiments in accordance with the disclosed technology (example B24), an apparatus for distalization or mesialization of molars in an upper dental arch of a mouth, including an apparatus body having an adjustment-drive mechanism, the adjustment-drive mechanism including an actuatable component; a set of posterior arms coupled to the adjustment-drive mechanism of the apparatus body and attachable to molar teeth in the upper dental arch, the set of posterior arms comprising (i) a first rigid arm that spans from the apparatus body to a first molar tooth and (ii) a second rigid arm that spans from the apparatus body to a second molar tooth; a set of anterior arms coupled to the apparatus body and attachable to non-molar teeth in the upper dental arch, the set of anterior arms comprising (i) a third rigid arm that spans from the apparatus body to a first non-molar tooth and (ii) a fourth rigid arm that spans from the apparatus body to a second non-molar tooth; and an anchorage device coupled to the apparatus body and attachable to a bone in the mouth, wherein the set of posterior arms are configured to transfer a force onto the molar teeth when the adjustment-drive mechanism is actuated to cause movement of the molar teeth in the upper dental arch in a direction determined by actuation of the adjustment-drive mechanism, and wherein the anchorage device is operable to positionally stabilize the apparatus body and the set of anterior arms to reduce force potentially applied to the non-molar teeth to prevent movement of the non-molar teeth in the upper dental arch.

Example B25 includes the apparatus of any of the examples B24-B41, wherein the direction of the movement of the molar teeth is in a posterior direction into the mouth when the adjustment-drive mechanism is actuated for distalization, and wherein the direction of the movement of the molar teeth is in an anterior direction out of the mouth when the adjustment-drive mechanism is actuated for mesialization.

Example B26 includes the apparatus of any of the examples B24-B41, wherein the adjustment-drive mechanism includes a rack and pinion assembly having a rotatable shaft providing the actuatable component and having a pinion gear at a first end of the shaft that interfaces with a rack gear having a linear array of rack teeth, wherein, when the rotatable shaft is rotated in a first rotation direction, the adjustment-drive mechanism translates rotational motion of the rotatable shaft into linear motion to generate the force to cause the movement of the molar teeth in the upper dental arch.

Example B27 includes the apparatus of any of the examples B24-B41, wherein the adjustment-drive mechanism includes a first screw coupled to the first rigid arm within a housing of or attached to the apparatus body and a second screw coupled to the second rigid arm within the housing of attached to the apparatus body, wherein the first and second screws provide the actuatable component that is operable to adjust a change in length of the first rigid arm and the second rigid arm, respectively, outward or inward with respect to the apparatus body and thereby generate the force to cause the movement of the molar teeth in the upper dental arch.

Example B28 includes the apparatus of any of the examples B24-B41, wherein the adjustment-drive mechanism includes a cam assembly coupled to the first rigid arm and to the second rigid arm within a housing of the apparatus body, wherein the cam assembly includes an adjustment dial coupled to a cam shaft providing the actuatable component that is operable to adjust a change in length of the first rigid arm and the second rigid arm outward or inward with respect to the apparatus body and thereby generate the force to cause the movement of the molar teeth in the upper dental arch.

Example B29 includes the apparatus of any of the examples B24-B41, wherein the adjustment-drive mechanism is directly or indirectly coupled to the set of posterior arms and configured to apply a force by adjusting a length or a tension of the first rigid arm and the second rigid arm that thereby causes the movement of the molar teeth in the upper dental arch.

Example B30 includes the apparatus of any of the examples B24-B41, including one or more anchoring arms coupled to the apparatus body and to the anchorage device, the one or more anchoring arms including a rigid material and spanning from at least one side of the apparatus body to the connect the anchorage device to the apparatus body at a fixed distance.

Example B31 includes the apparatus of any of the examples B24-B41, wherein the anchorage device includes a head portion, a tapered portion, and a body portion between the head portion and the tapered portion, wherein the body portion provides a structure that allows the anchorage device to be coupled to the apparatus body, and the tapered portion provides a structure that is insertable into the bone.

Example B32 includes the apparatus of any of examples B31, B33, or B34, wherein the tapered portion includes a threaded section allows the tapered portion to be screwed into the bone and securely hold the anchorage device to the bone.

Example B33 includes the apparatus of any of examples B31, B32, or B34, including a cap reversibly attachable to the head portion to the to assist in attachment or detachment of the anchorage device to or from the bone.

Example B34 includes the apparatus of any of examples B31, B32, or B33, including an acrylic pad attachable to the head portion to provide an interface surface for the anchorage device to rest on soft tissue of the mouth.

Example B35 includes the apparatus of any of the examples B24-B41, wherein the anchorage device includes an acrylic pad to provide an interface surface for the anchorage device to rest on soft tissue of the mouth.

Example B36 includes the apparatus of any of the examples B24-B41, wherein the adjustment-drive mechanism further includes a rods assembly, and wherein the apparatus body includes two body portions that can be spaced apart and brought together by the adjustment-drive mechanism, where the rods assembly includes one or more rods disposed within one or more channels of the two body portions, respectively, that span across a separation gap between the two body portions, such that the rods assembly is operable to guide an expansion movement of the two body portions apart from each other across the separation gap.

Example B37 includes the apparatus of any of the examples B24-B41, including one or more eyelets coupled to the apparatus body and including an opening to allow the anchorage device to traverse through to attach to the bone in the mouth.

Example B38 includes the apparatus of any of the examples B24-B41, including one or more anchoring arms coupled to the apparatus body and to the anchorage device, the one or more anchoring arms spanning outward from the apparatus body and coupled to one or more eyelets, respectively, positioned at an outer end of each of the one or more anchoring arms, wherein the one or more eyelets include an opening to allow the anchorage device to traverse through to attach to the bone in the mouth.

Example B39 includes the apparatus of any of the examples B24-B41, including a first set of attachment articles attachable to the molar teeth and coupled to the set of posterior arms, and a second set of attachment articles attachable to the non-molar teeth and coupled to the set of anterior arms.

Example B40 includes the apparatus of any of the examples B24-B41, wherein the adjustment-drive mechanism is configured to cause a lateral movement of the molar teeth in the upper dental arch.

Example B41 includes the apparatus of any of the examples B24-B41, wherein the bone to which the anchorage device attaches includes palatal alveolar bone located superior to the palate of the mouth or indirectly to buccal bone or labial bone in a lateral region of the mouth.

In some embodiments in accordance with the disclosed technology (example B24), an apparatus for distalization or mesialization of molars in an upper dental arch of a mouth, including a plastic aligner configured to fit in a patient's mouth; a set of anchorage devices coupled to the plastic aligner and attachable to a bone in the mouth; and attachment articles coupled to the plastic aligner and attachable to molar teeth and to non-molar, wherein the plastic aligner is configured to transfer a force onto the molar teeth to cause movement of the molar teeth in the upper dental arch, and wherein the set of anchorage devices are operable to positionally stabilize the non-molar teeth and reduce force potentially applied upon the non-molar teeth by the plastic aligner to prevent movement of the non-molar teeth in the upper dental arch.

Example B43 includes the apparatus of any of the examples B42-B50, including a set of aligner-receiver components coupled to the attachment articles and operable to connect with plastic of the plastic aligner to couple the plastic aligner to the attachment articles.

Example B44 includes the apparatus of any of the examples B43, B45, or B46, wherein at least some of the aligner-receiver components include one or more lugs that accept a portion of the plastic aligner.

Example B45 includes the apparatus of any of the examples B43, B44, or B46, wherein at least some of the aligner-receiver components include one or more slots that correspond to tapered inserts that protrude from the plastic aligner.

Example B46 includes the apparatus of any of the examples B43-B45, wherein at least some of the aligner-receiver components include a lingual or buccal box that can be filled with composite attachments shaped in a way that optimizes translation of aligner forces onto the molars.

Example B47 includes the apparatus of any of the examples B42-B50, wherein the attachment articles include metal rings that encompass the molar teeth and the non-molar teeth.

Example B48 includes the apparatus of any of the examples B42-B50, wherein the set of anchorage devices includes a set of two anterior temporary anchorage devices and a set of posterior temporary anchorage devices.

Example B49 includes the apparatus of any of the examples B42-B50, wherein the set of anchorage devices includes two temporary anchorage devices placeable proximate a mid-palatal suture with front to back locations of a bisect of mesial of upper first molars and distal of upper canines.

Example B50 includes the apparatus of any of the examples B42-B50, wherein the apparatus is configured to transfer force to cause expansion and antero-posterior movements.

In some embodiments in accordance with the disclosed technology (example B51), a method for determining orthodontic treatment parameters and/or determining recommendations for orthodontic treatment options, including receiving, by a computing device, image data associated of an upper dental arch, a lower dental arch, or a combination of the upper and lower dental arches of a patient; determining, by the computing device, a set of quantitative prospective pre-treatment values by analyzing the image data; calculating, by the computing device, dynamic variables associated with a prospective orthodontic treatment procedure to determine teeth movement trajectories that keep aligned teeth on the pre-treatment dental arch; and generating, by the computing device, one or more prospective treatment plans displayable on the a display of the computing device that information indicative of a long-term result for the patient for the one or more of the prospective treatment plans based on the determined set of quantitative prospective pre-treatment value.

Example B52 includes the method of any of examples B51-B62, wherein the quantitative prospective pre-treatment values include one or more of (i) equilibrium pretreatment values that characterize a degree of teeth crowding in the upper or lower dental arch, (ii) curve of Spee values, or (iii) variance values that characterize variance from ideal Class I antero-postero (AP) plane of occlusion.

Example B53 includes the method of any of examples B51-B62, wherein the analyzing the image data includes quantitatively comparing the parameters extracted from the image data to a standard set of values associated with an ideal alignment of teeth and corrected occlusion, such that the determined quantitative prospective pre-treatment values are within an original pre-treatment curve.

Example B54 includes the method of any of examples B51-B62, including receiving, by the computing device, one or more user preferences associated with orthodontic treatment procedures for the patient; and incorporating the received one or more user preferences in the determining of the set of quantitative prospective pre-treatment values.

Example B55 includes the method example B54, wherein the user preferences include maximum and/or minimum constraints for certain parameters associated with a practitioner's tentative treatment choices, including one or more of an extraction, interproximal reduction (IPR), or installation of a temporary anchorage device.

Example B56 includes the method of any of examples B51-B62, wherein the image data includes three-dimensional (3D) images.

Example B57 includes the method of any of examples B51-B62, wherein the image data is obtained by a computed tomography (CT) system, such as a Cone Beam Tomography (CBT) diagnostics system.

Example B58 includes the method of any of examples B51-B62, including processing the image data to extract data containing parameters associated with one or more of the patient's teeth, bone structure, soft tissue density or dental, orthodontic and/or periodontic information of interest.

Example B59 includes the method of any of examples B51-B62, wherein the calculating the dynamic variables associated with the prospective orthodontic treatment procedure includes determining a ranked set of the prospective orthodontic treatment procedures based on a degree of risk in forcing teeth into surrounding cortical bone as a result of the prospective orthodontic treatment procedure.

Example B60 includes the method of any of examples B51-B62, wherein the dynamic variables include one or more of force vectors, torque, translational motion vectors, or degrees of rotation with respect to teeth.

Example B61 includes the method of any of examples B51-B62, wherein the displayed information includes text and/or a graphic about the patient's tooth or teeth with respect to the patient's underlaying symphysis bone.

Example B62 includes the method of any of examples B51-B62, wherein the display includes a graphic user interface (GUI).

In some embodiments of the disclosed orthodontic distalization and/or mesialization apparatus, for example, the apparatus is operable to transfer an anchorage force reference through the center of tip rotation of upper molars to minimize relapse force moments of molars moving forward. In some embodiments, the apparatus includes an electronic adjustment tracking device including a wireless transmitter and a rotary sensor, coupled to the adjustment-drive mechanism, that allows adjustments of the adjustment-drive mechanism to be sent as data to a remote computer so that the data can be processed to generate a report, e.g., of progress containing patient feedback for equivalents of saved elastic wear, of graphic representation of progress in bite correction, and of goals ahead.

In some embodiments, the adjustment-drive of the apparatus is able to be adjusted by an adjustment device. In some embodiments, the adjustment device includes a wrench that allows separate adjustment of expansion and distalizing planes of space. In some embodiments, the apparatus is operable to allow adjustment of planes by a horizontally-oriented, accessible adjustment dial of the adjustment-drive mechanism, wherein in some embodiments the dial is operable to be turned by the adjustment device. In some embodiments, the apparatus is operable to includes a sound emitter or a light emitter (e.g., LED) to allow a sonic beep and/or indication light to be emitted when the adjustment device is properly placed on the adjustment dial and ready for activation of expansion or distalization.

In some embodiments, the apparatus is configured for use with a software app operable on a computing device, which provides graphic and numerical display of decisions and resultant effects of decisions for treatment by practitioner. In some embodiments, the apparatus with the software app is able to facilitate use of screen sliders for a user to define and set a desired VTO goal for antero-postero incisor position of the patient, with which treatment decision variables of IPR, Distalization, TAD control, Extraction, Elastics, or other variables can be adjusted on a graphical user interface producible on a display screen of the computing device (e.g., by display sliders or tabular entries), in any variable combination, to produce decision recommendations for attaining the VTO of teeth positions in the x axis, y axis, or z axis, or any combination of these axes. In some implementations using the software app, after locking in a VTO goal, setting one slider variable will affect the degree of remaining variable slider changes to allow the most ideal balance of decisions for treatment, e.g., which may be to leave incisor position unchanged altogether. In some implementations using the software app, alternatively, instead of setting a fixed VTO, any slider combination will affect the virtual graphic of teeth in virtual bone or actual x-ray bone image, utilizing separate layer(s) of virtual teeth on top of or under virtual bone or actual bone image, so that any one treatment decision or combination of decisions will move vector graphics and change tabular results of decisions upon resultant teeth positions relative to virtual or real bone image. In some embodiments, the apparatus with the software app is able to classify symphysis types (normal, semi-thin bone, thin bone) for decision making.

In some implementations, the apparatus allows distalization of upper teeth in conjunction with maxillary expansion in adults using TAD anchorage to expand high up in the skeletal complex. In some implementations, the apparatus independently adjusts distalization of upper molars. In some implementations, the apparatus can use a labial or buccal anchorage device to attach to indirectly. In some implementations, the apparatus uses TAD guides and safety holds for TAD placement. In some implementations, the apparatus is removable to prepare for patient use of subsequent disposable aligner articles.

Example Embodiments of Two-Axis Expander Distalization Apparatuses and Methods

In palatal expansion, pressure is put on the molars laterally, and the molars translate the course in the palatal bone. Conventionally, palatal expansion is performed on younger patients whose palate still possess cartilage in the midline and not fully fused to form the maxilla bone. Orthodontic (non-surgical) technology is limited if not non-existent for palatal expansion beyond the age of 14, for example; and even in such younger patients, existing orthodontic solutions for palatal expansion pose problems for both patients and orthodontists in implementing a correct expansion.

Disclosed are further embodiments of distalization and/or mesialization devices, systems, and methods that include a bi-axial expander distalizer. In various embodiments discussed below, the disclosed two-axis expander-distalizer utilizes a first expander adjustment mechanism to control lateral expansion of the maxilla bone, and may also utilize a second adjustment mechanism to control push-back (distalization) of upper teeth. In the various embodiments, the disclosed two-axis expander-distalizer can be fastened to the palate by an anchorage device, e.g., through eyelets, and/or by bracing arms that couple anchorage devices and can transfer anchorage to main device body for distalizing forces. In such embodiments, one or more of the anchorage devices are anchored to the maxilla bone directly in combination with one or more anchorage devices that are anchored to the palatal bone, such that the two-axis expander-distalizer is able to apply pressure into the maxilla bone to drive forces that causes their expansion, and in such a way that does not put substantial pressure on the molar teeth. In such implementations, the two-axis expander-distalizer is able to cause palatal expansion in patients that have fused maxilla bones (in addition to those who still have cartilage). The following examples illustrate further embodiments in accordance with the present technology (e.g., in addition to the example embodiments described previously) operable to achieve palatal expansion in conjunction with distalization and/or mesialization.

Figure 13:
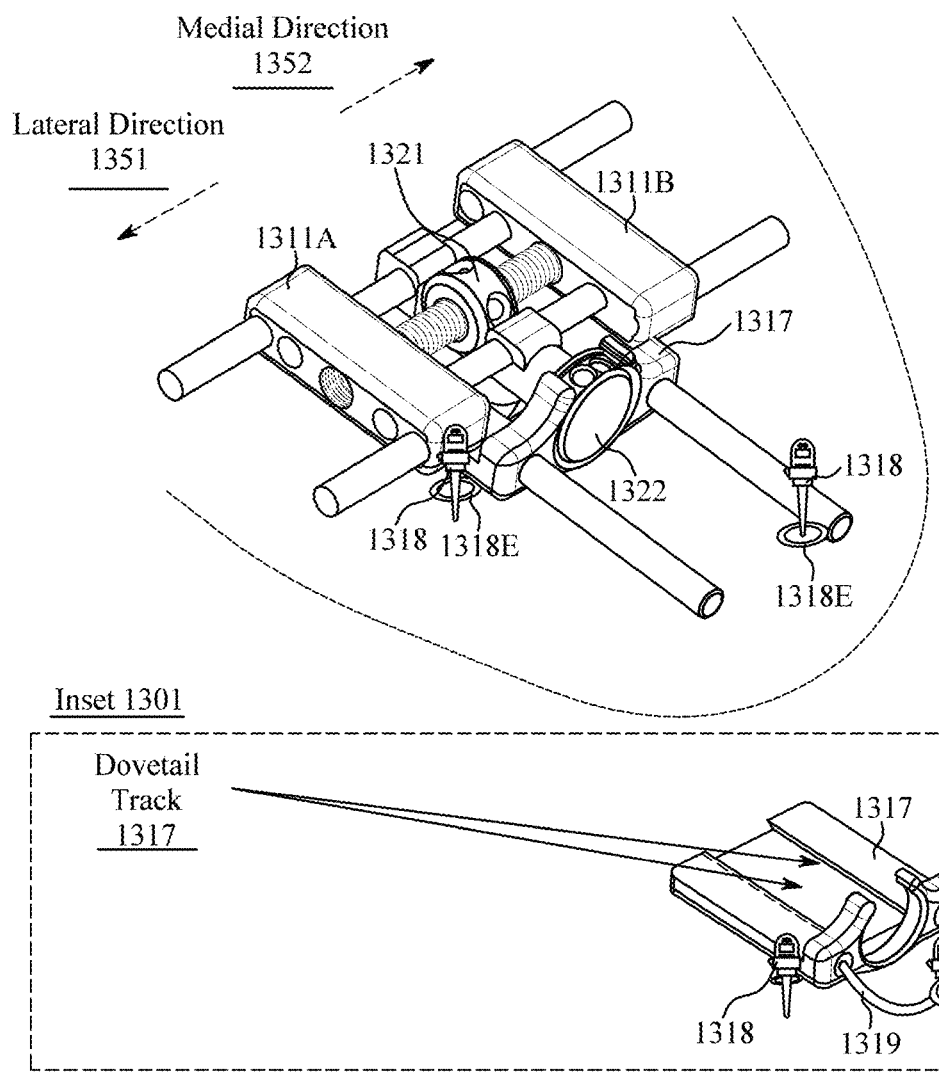
FIG. 13 shows an example embodiment of a two-axis expander-distalizer apparatus in accordance with the present technology.

FIG. 13 shows an example embodiment of a two-axis expander-distalizer apparatus 1310. The two-axis expander-distalizer apparatus 1310 includes a two-layer expander body 1311, comprising a first body layer that includes two expandable body portions 1311A and 1311B, and a second layer that includes a fixed housing with a dovetail track structure 1317.

In implementations, for example, the two-axis expander-distalizer apparatus 1310 uses the expander adjustment screw 1321 to control lateral expansion of the maxilla bone. For example, the two-axis expander-distalizer apparatus 1310 can control maxillary bone expansion as a secondary effect of expanding the molars directly. The second adjustment screw 1322 controls push-back (distalization) of upper teeth. During such movements, the stabilized dovetail structure 1317 remains fixed, with respect to the first body layer (i.e., body portions 1311A, 1311B) in the lateral and push-back dimensions. The two-axis expander-distalizer apparatus 1310 can be fastened to the palate by one or more anchorage devices 1318, e.g., which securely couple to the two-axis expander-distalizer apparatus 1310 through one or more eyelets 1318E, such that the two-axis expander-distalizer apparatus 1310 is able to transfer anchorage demands from the one or more anchorage devices 1318 to the first layer of the expander body 1311, i.e., body portions 1311A, 1311B. The body portions 1311A, 1311B are configured to travel distally along the fixed dovetail track structure 1317. In some embodiments, for example, (as illustrated in the inset 1301) the two-axis expander-distalizer apparatus 1310 can include one or more bracing arms 1319 that extend from the fixed dovetail track structure 1317 to provide further anchorage placement options for force control for the apparatus 1310 during distalization.

Figure 14:
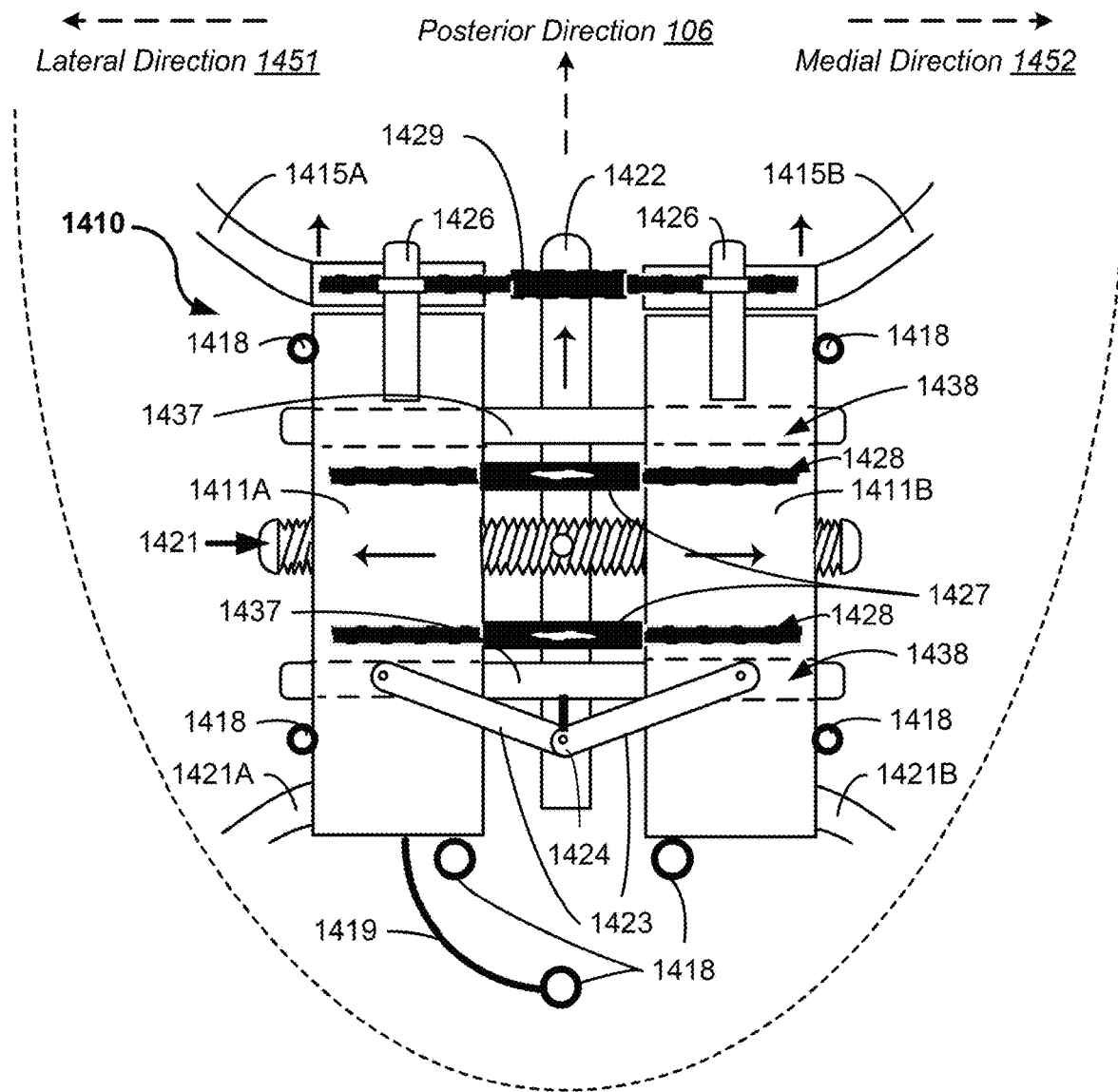
FIG. 14 shows an example embodiment of a two-axis linkage expander-distalizer apparatus in accordance with the present technology.

FIG. 14 shows an example embodiment of a two-axis linkage expander-distalizer apparatus 1410. The two-axis linkage expander-distalizer apparatus 1410 includes two body portions 1411A and 1411B (collectively as body portion 1411 or expander body 1411), which can be spaced apart and brought together by a two-axis linkage adjustment-drive mechanism (described below). The body portions 1411A and 1411B are coupled to distalization arms 1415A and 1415B, respectively, via a connector plate 1429 with one or more internal slots for one or more guide structures (e.g., of a guide assembly 1426) to slide within, in which the distalization arms 1415A and 1415B can attach the two-axis linkage expander-distalizer apparatus 1410 to posterior teeth (not shown) in the upper dental arch (or in the lower arch). In the example shown in FIG. 14, the body portions 1411A and 1411B are also coupled to forward arms 1421A and 1421B, respectively, which extend from the body portions 1411A and 1411B and can attach the two-axis linkage expander-distalizer apparatus 1410 to anterior teeth (not shown) in the upper dental arch (or lower arch), e.g., directly to bicuspids or indirectly to incisors. The distalization arms 1415A and 1415B and/or the forward arms 1421A and 1421B can be embodied as other distalization arms and/or forward arms described herein, e.g., such as distalization arms 115 and/or forward arms 121. The two-axis linkage expander-distalizer apparatus 1410 can include one or more anchoring arms 1419 coupled to and spanning outward from the body portions 1411A and/or 1411B and coupled to one or more anchorage devices 1418, in which an anchorage device may couple to the anchoring arm(s) 1419 via an eyelet (which may be ring-like structures to allow secure a portion of the anchorage device). An anchorage device may also be coupled to the body portions 1411A and 1411B, e.g., via an eyelet. Examples of eyelets, anchorage arm(s) 1419, and anchorage device 1418 can include those described previously or subsequently herein.

The linkage adjustment-drive mechanism includes (i) an expander adjustment mechanism, which can operate in a lateral/medial direction (e.g., lateral direction 1451 and/or medial direction 1452), and (ii) a distalization adjustment mechanism, which can operate in a posterior/anterior direction (e.g., posterior direction 106). The expander adjustment mechanism includes an adjustment screw 1421 to control lateral expansion of the maxilla bone. The distalization adjustment mechanism includes a rod assembly comprising a rod 1422, linkages 1423, and rotator pin or screw 1424, in which the rod 1422 receives expansive force from the linkages 1423 (via rotator 1424) to cause the rod 1422 to move.

The body portions 1411A and 1411B (e.g., also referred to as the expander body) of the two-axis linkage expander-distalizer apparatus 1410 can be anchored via one or more anchorage devices 1418 for distalization anchorage arm (or bracing arm) 1419 only for distalization before or after teeth-borne or skeletal expansion. In implementations, for example, the two-axis linkage expander-distalizer apparatus 1410 uses the expander adjustment screw 1421 to control lateral expansion of the maxilla. The rod 1422 of the distalization adjustment mechanism receives expansive force via linkages 1423 between the expander layer (i.e., body portions 1411A and 1411B) and a distalization layer, which can include a connector plate 1429 that couples to the distalizer arms 1415a and 1415b. The rod 1422 is passively supported by one or more support ribs 1427 that slide within slots 1428 of the expander body portions 1411A, 1411B. For example, the rod 1422 is passively supported by the one or more support ribs 1427, where the one or more support ribs 1427 is stable in the perpendicular plane (to the posterior direction 106) while allowing movement in the lateral-medial plane (e.g., for lateral expansion). In some optional embodiments, the two-axis linkage expander-distalizer apparatus 1410 includes one or more dowels 1437 that are positioned in parallel to the expander adjustment screw 1421, in which the one or more dowels run through corresponding bore holes 1438 of the body portions 1411A and 141l B to stabilize these parts from twisting.

As expansion increases, the linkages 1423 push the distalization rod 1422 toward posterior direction 106. The rod 1422 is connected to the connector plate 1429, and the connector plate 1429 can be indexed or interfaced with the body portions 1411A and 1411B using a guide assembly 1426, e.g., which can include guide rods, guide plates, and/or guide tracks. In implementations, for example, the distalization arms 1415a and 1415b, coupled to the connector plate 1429, transfer distalization energy to upper teeth (not shown) to push them back.

Figure 15:
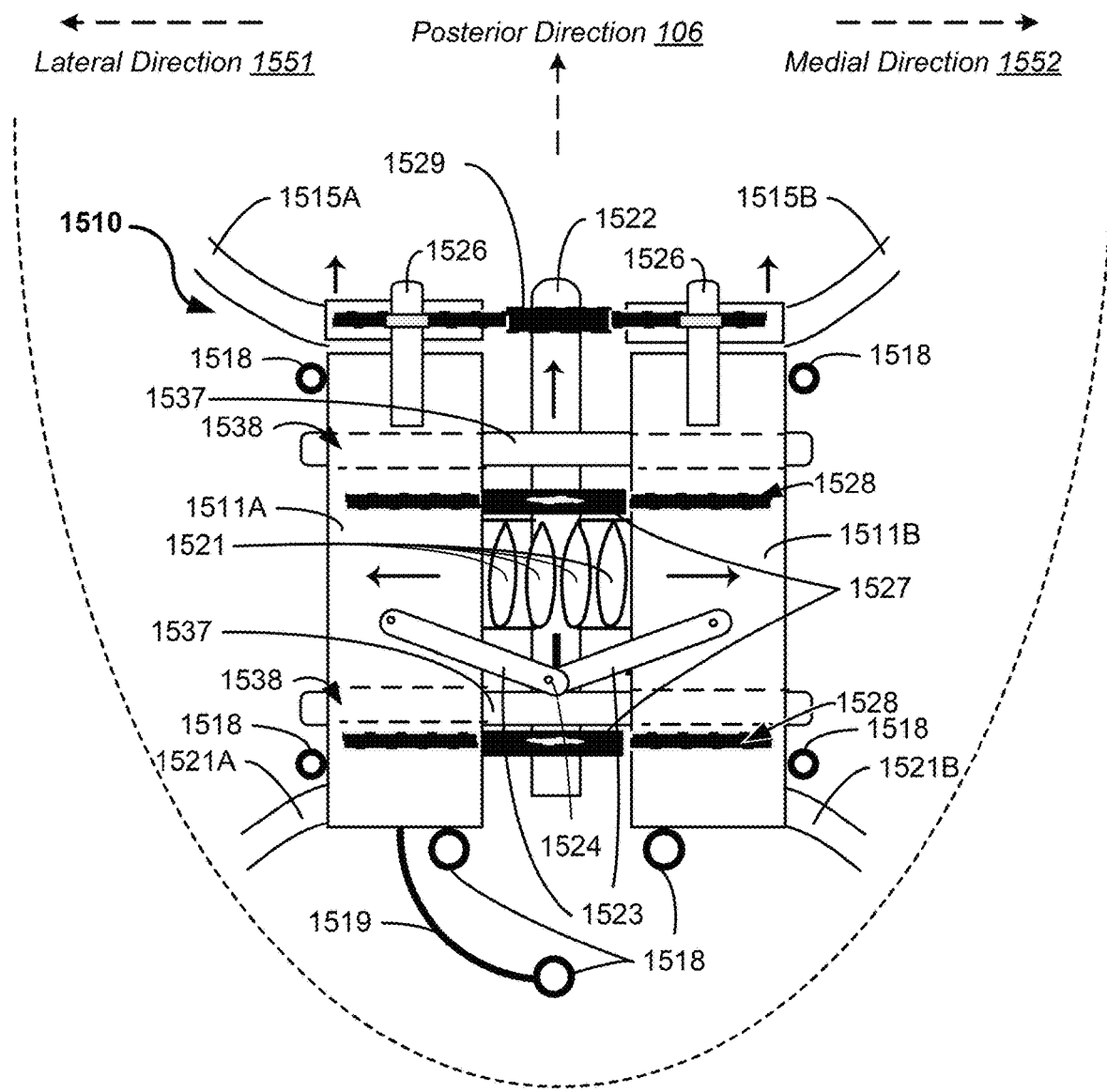
FIG. 15 shows an example embodiment of a two-axis spring expander-distalizer apparatus in accordance with the present technology.

FIG. 15 shows an example embodiment of a two-axis spring expander-distalizer apparatus 1510. The two-axis spring expander-distalizer apparatus 1510 includes two body portions 1511A and 1511B (collectively as body portion 1511 or expander body 1611), which can be spaced apart and brought together by a two-axis spring and linkage adjustment-drive mechanism (described below). The body portions 1511A and 1511B are coupled to distalization arms 1515A and 1515B, respectively, e.g., via a connector plate 1529 with one or more internal slots for one or more guide structures (e.g., of a guide assembly 1526) to slide within, in which the distalization arms 1515A and 1515B can attach the two-axis spring expander-distalizer apparatus 1510 to posterior teeth (not shown) in the upper dental arch (or in the lower arch). In the example shown in FIG. 15, the body portions 1511A and 1511B are also coupled to forward arms 1521A and 1521B, respectively, which extend from the body portions 1511A and 1511B and can attach the two-axis spring expander-distalizer apparatus 1510 to anterior teeth (not shown) in the upper dental arch (or lower arch), e.g., directly to bicuspids or indirectly to incisors. The distalization arms 515A and 1515B and/or the forward arms 1521A and 1521B can be embodied as other distalization arms and/or forward arms described herein, e.g., such as distalization arms 115 and/or forward arms 121. The two-axis spring expander-distalizer apparatus 1510 can include one or more anchoring arms 1519 coupled to and spanning outward from the body portions 1511A and/or 1511B and coupled to one or more anchorage devices 1518, in which an anchorage device may couple to the anchoring arm(s) 1519 via an eyelet. Examples of eyelets, anchorage arm(s) 1519, and anchorage device 1518 can include those described previously or subsequently herein.

The spring and linkage adjustment-drive mechanism includes (i) an expander adjustment mechanism, which can operate in a lateral/medial direction (e.g., lateral direction 1551 and/or medial direction 1552), and (ii) a distalization adjustment mechanism, which can operate in a posterior/anterior direction (e.g., posterior direction 106). The expander adjustment mechanism of the apparatus 1510 includes uses a series of springs 1521 to assist in control of lateral expansion of the maxilla. In some embodiments, the series of springs 1521 includes a plurality of springs configured to provide expansion force in the lateral and/or medial directions 1551, whereas in some embodiments the series of springs 1521 include a single spring to provide the lateral and/or medial force. In implementations, for example, the series of springs 1521 can exert lateral and/or medial pressure, e.g., like embodiments that utilize a screw. In some embodiments, for example, the series of springs 1521 can include Nickel Titanium.

Similar to the apparatus 1410, the distalization adjustment mechanism of the apparatus 1510 includes a rod assembly comprising a rod 1522, linkages 1523, and rotator pin or screw 1524, in which the rod 1522 receives expansive force from the linkages 1523 (via rotator 1524) to cause the rod 1522 to move (e.g., in the posterior direction 106). Also similar to the apparatus 1410, the rod 1522 of the apparatus 1510 is supported by one or more support ribs 1527 that slide within slots 1528 of expander body portions 1511A, 1511B, and the rod 1522 connects to a connector plate 1529. For example, the rod 1522 is passively supported by the one or more support ribs 1527, where the one or more support ribs 1527 is stable in the perpendicular plane (to the posterior direction 106) while allowing movement in the lateral-medial plane (e.g., for lateral expansion). In some optional embodiments, the two-axis spring expander-distalizer apparatus 1510 includes one or more dowels 1537 that run through corresponding bore holes 1538 of the body portions 1511A and 1511B to stabilize these parts from twisting.

As expansion increases, for example, the linkages 1524 push back the distalization rod 1522. The connector plate 1529 can be interfaced via guide assembly 1526 (e.g., which can include guide rods, guide plates, and/or guide tracks). The connector plate 1529 is coupled to the distalization arms 1515A, 1515B that transfer distalization energy to upper teeth to push them back. Also, in implementations, for example, the expander body portions 1511A, 1511B can be anchored via one or more anchorage devices 1518 for skeletal expansion and distalization anchorage arm (or bracing arm) 1419 only for distalization with teeth-borne expansion.

Figure 16:
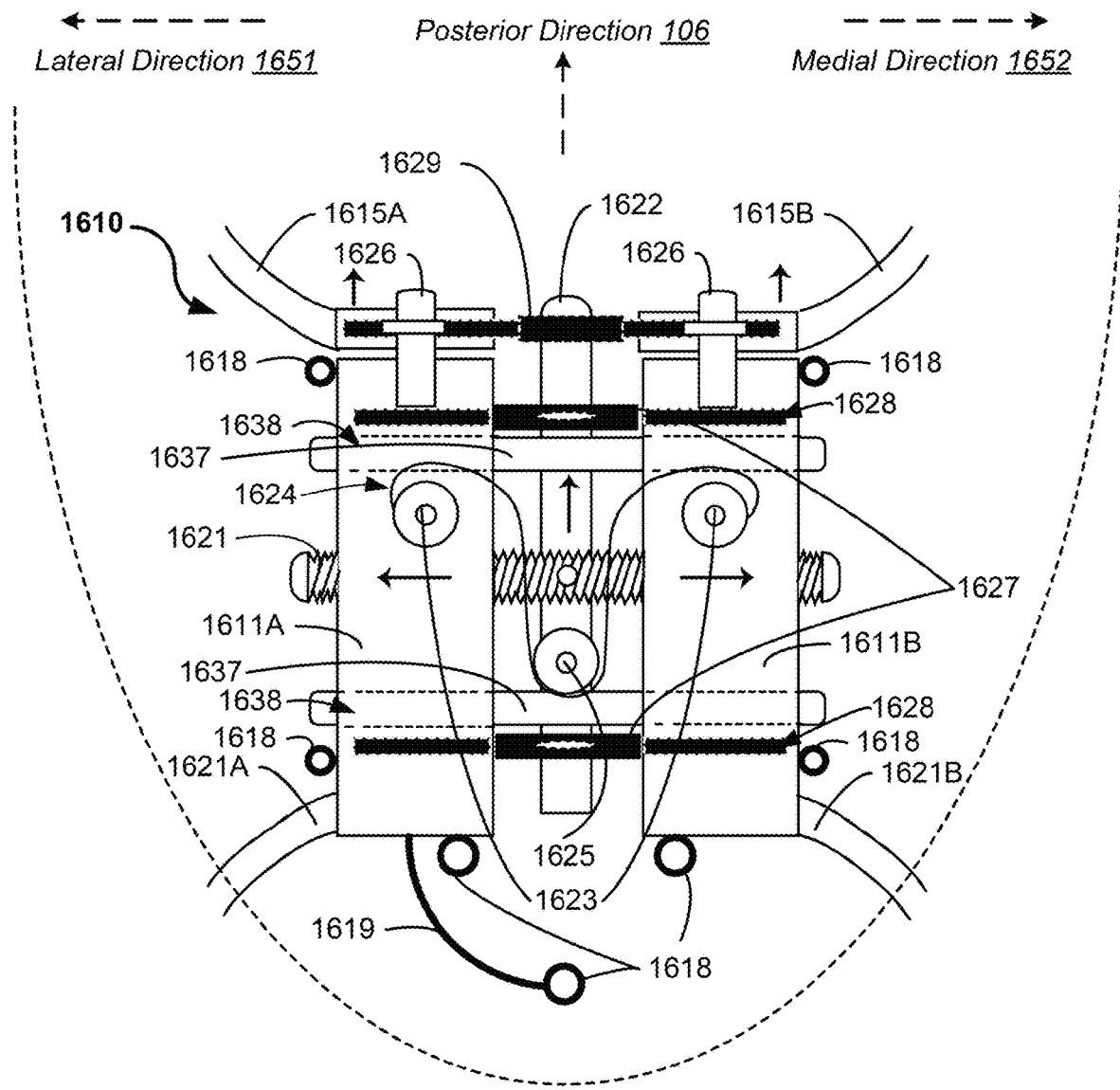
FIG. 16 shows an example embodiment of a two-axis hypoid expander-distalizer apparatus in accordance with the present technology.

FIG. 16 shows an example embodiment of a two-axis hypoid expander-distalizer apparatus 1610. The two-axis hypoid expander-distalizer apparatus 1610 includes two body portions 1611A and 1611B (collectively as body portion 1611 or expander body 1611), which can be spaced apart and brought together by a two-axis hypoid adjustment-drive mechanism (described below). The body portions 1611A and 161/ B are coupled to distalization arms 1615A and 1615B, respectively, e.g., via a connector plate 1629 with one or more internal slots for one or more guide structures (e.g., of a guide assembly 1626) to slide within, in which the distalization arms 1615A and 1615B can attach the two-axis hypoid expander-distalizer apparatus 1610 to posterior teeth (not shown) in the upper dental arch (or in the lower arch). In the example shown in FIG. 16, the body portions 1611A and 1611B are also coupled to forward arms 1621A and 1621B, respectively, which extend from the body portions 1611A and 1611B and can attach the two-axis hypoid expander-distalizer apparatus 1610 to anterior teeth (not shown) in the upper dental arch (or lower arch), e.g., directly to bicuspids or indirectly to incisors. The distalization arms 1615A and 1615B and/or the forward arms 1621A and 1621B can be embodied as other distalization arms and/or forward arms described herein, e.g., such as distalization arms 115 and/or forward arms 121. The two-axis hypoid expander-distalizer apparatus 1610 can include one or more anchoring arms 1619 coupled to and spanning outward from the body portions 1611A and/or 1611B and coupled to one or more anchorage devices 1618, in which an anchorage device may couple to the anchoring arm(s) 1619 via an eyelet. Examples of eyelets, anchorage arm(s) 1619, and anchorage device 1618 can include those described previously or subsequently herein.

The hypoid adjustment-drive mechanism includes (i) an expander adjustment mechanism, which can operate in a lateral/medial direction (e.g., lateral direction 1651 and/or medial direction 1652), and (ii) a distalization adjustment mechanism, which can operate in a posterior/anterior direction (e.g., posterior direction 106). The expander adjustment mechanism of the apparatus 1610 includes an expander adjustment lead screw 1621 to control lateral expansion of the maxilla. In some embodiments of the expander adjustment lead screw 1621, for example, the direction of threads is opposite on right and left halves, such that turning the lead screw pushes body portions 1611A and 1611B apart. The distalization adjustment mechanism of the apparatus 1610 includes a cable 1624 that is anchored on each of the expander body portions 1611A and 1611B by an adjustment pulley component 1623, which transfers adjusted force/tension to a rod assembly that comprises a distalization rod 1622 and pulley component 1625 (to which the cable 1624 is coupled). For example, the rod 1622 is passively supported by the one or more support ribs 1627 that slides within a slot 1628 across the expander body portions 1611A and 1611B, where the one or more support ribs 1627 is stable in the perpendicular plane (to the posterior direction 106) while allowing movement in the lateral-medial plane (e.g., for lateral expansion). In some optional embodiments, the two-axis hypoid expander-distalizer apparatus 1610 includes one or more dowels 1637 that run through corresponding bore holes 1638 of the body portions 1611A and 1611B to stabilize these parts from twisting.

Similar to the apparatuses 1410 and 1510, the distalization rod 1622 of the apparatus 1610 connects to a connector plate 1629. As expansion increases, for example, the linkage pulley component 1625 pushes back the distalization rod 1622 and connector plate 1629. The connector plate 1629 can be indexed (e.g., interfaced) to the expander body 1611 via a guide assembly 1626, which can include guide rods, guide plates, and/or guide tracks. The connector plate 1629 is also coupled to the distalization arms 1615A, 1615B that transfer distalization energy to upper teeth to push them back. In implementations, for example, the expander body portions 1611A, 1611B can be anchored via one or more anchorage devices 1618 for skeletal expansion and distalization or using anchorage arm (or bracing arm) 1619 only for distalization with teeth-borne expansion.

Figure 17:
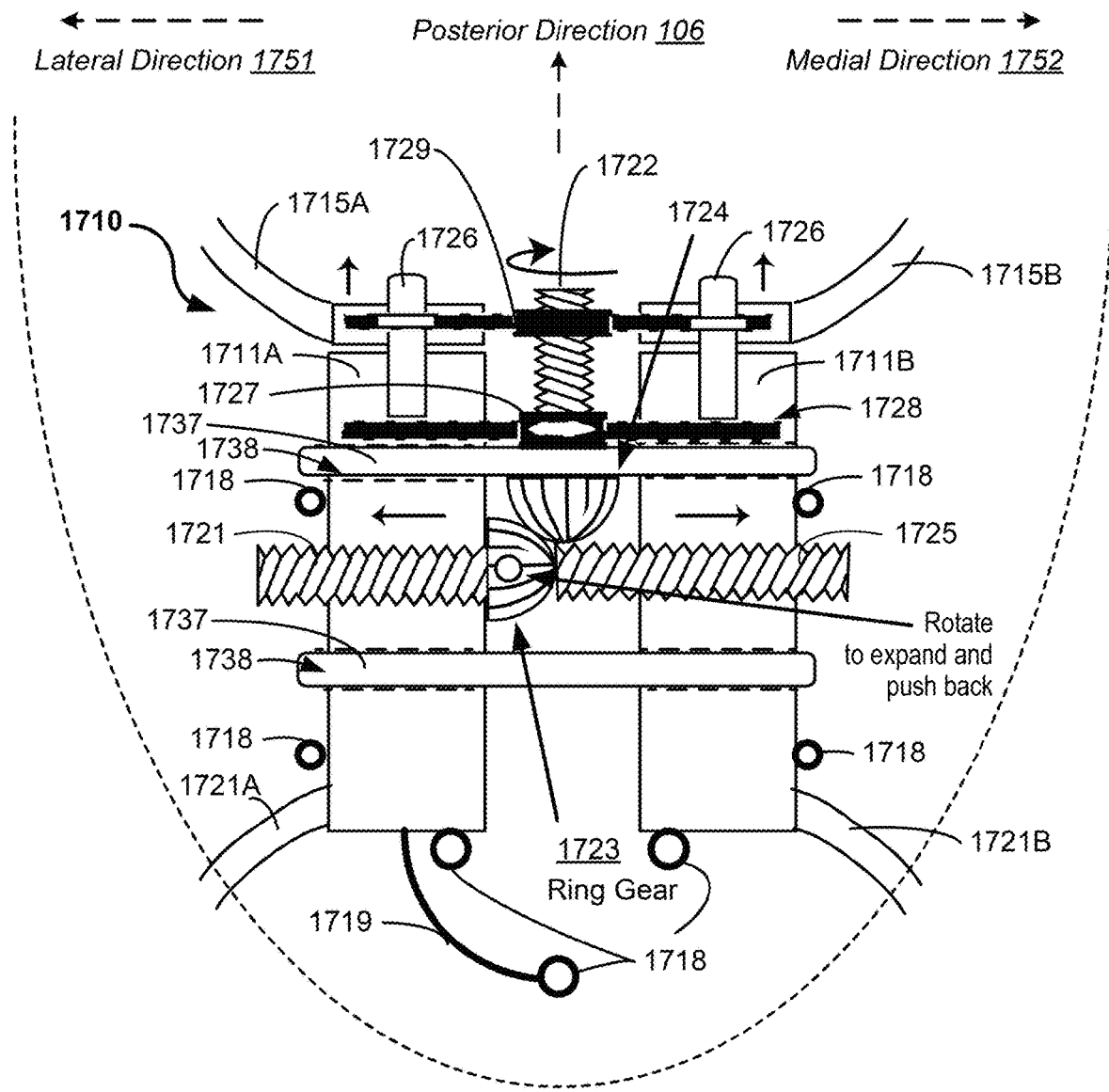
FIG. 17 shows an example embodiment of a two-axis pinion expander-distalizer apparatus in accordance with the present technology.

FIG. 17 shows an example embodiment of a two-axis pinion expander-distalizer apparatus 1710. The two-axis pinion expander-distalizer apparatus 1710 includes two body portions 1711A and 1711B (collectively as body portion 1711 or expander body 1711), which can be spaced apart and brought together by a two-axis pinion assembly adjustment-drive mechanism (described below). The body portions 1711A and 1711B are coupled to distalization arms 1715A and 1715B, respectively, e.g., via a connector plate 1729 with one or more internal slots for one or more guide structures (e.g., of a guide assembly 1726) to slide within, in which the distalization arms 1715A and 1715B can attach the two-axis pinion expander-distalizer apparatus 1710 to posterior teeth (not shown) in the upper dental arch (or in the lower arch). In the example shown in FIG. 17, the body portions 1711A and 1711B are also coupled to forward arms 1721A and 1721B, respectively, which extend from the body portions 1711A and 1711B and can attach the two-axis pinon expander-distalizer apparatus 1710 to anterior teeth (not shown) in the upper dental arch (or lower arch), e.g., directly to bicuspids or indirectly to incisors. The distalization arms 1715A and 1715B and/or the forward arms 1721A and 1721B can be embodied as other distalization arms and/or forward arms described herein, e.g., such as distalization arms 115 and/or forward arms 121. The two-axis pinion expander-distalizer apparatus 1710 can include one or more anchoring arms 1719 coupled to and spanning outward from the body portions 1711A and/or 1711B and coupled to one or more anchorage devices 1718, in which an anchorage device may couple to the anchoring arm(s) 1719 via an eyelet. Examples of eyelets, anchorage arm(s) 1719, and anchorage device 1718 can include those described previously or subsequently herein.

The pinion assembly adjustment-drive mechanism includes in integrated expander and distalization adjustment mechanism that expands in a lateral/medial direction (e.g., lateral direction 1751 and/or medial direction 1752) and distalizes in a posterior/anterior direction (e.g., posterior direction 106). The pinion assembly adjustment-drive mechanism of the apparatus 1710 includes uses an expander adjustment screw 1721 to control lateral expansion of the maxilla. The pinion assembly adjustment-drive mechanism of the apparatus 1710 includes a ring gear 1723 coupled on the end (of the interior side) of the expander screw 1721 that interfaces with a pinion gear 1724 (having a shaft 1722 of the pinion gear 1724), at 90 degrees, and interfaces with shaft 1725. The pinion shaft 1722 is supported by a support rib 1727 that slides within a slot 1728 across the expander body portions 1711A and 1711B. In some optional embodiments, the two-axis pinion expander-distalizer apparatus 1710 includes one or more dowels 1737 that run through corresponding bore holes 1738 of the body portions 1711A and 1711B to stabilize these parts from twisting.

As expansion increases, for example, the pinion gear 1724 turns the distalization shaft 1722, such that the distalization shaft 1722 engages with the connector plate 1729. For example, in some embodiments, the distalization shaft 1722 includes threads that engage with a threaded region of the connector plate 1729. As the distalization shaft 1722 turns, the connector plate 1729 pushes back, which exerts forces that are transferred through the distalization arms 1715A, 1715B to the posterior teeth the arms 1715A, 1715B couple the apparatus 1710 to. In some embodiments, for example, the connector plate 1729 can be indexed (e.g., interfaced) to the expander body portions 1711A, 1711B via a guide assembly 1726 (e.g., which can include guide rods, guide plates, and/or guide tracks). The distalization arms 1715A, 1715B transfer distalization energy from the connector plate 1729 to the posterior teeth to push them back. In implementations, for example, the expander body portions 1711A, 1711B can be anchored via one or more anchorage devices 1718 for skeletal expansion and distalization anchorage arm (or bracing arm) 1719 only for distalization with teeth-borne expansion.

Figure 18:
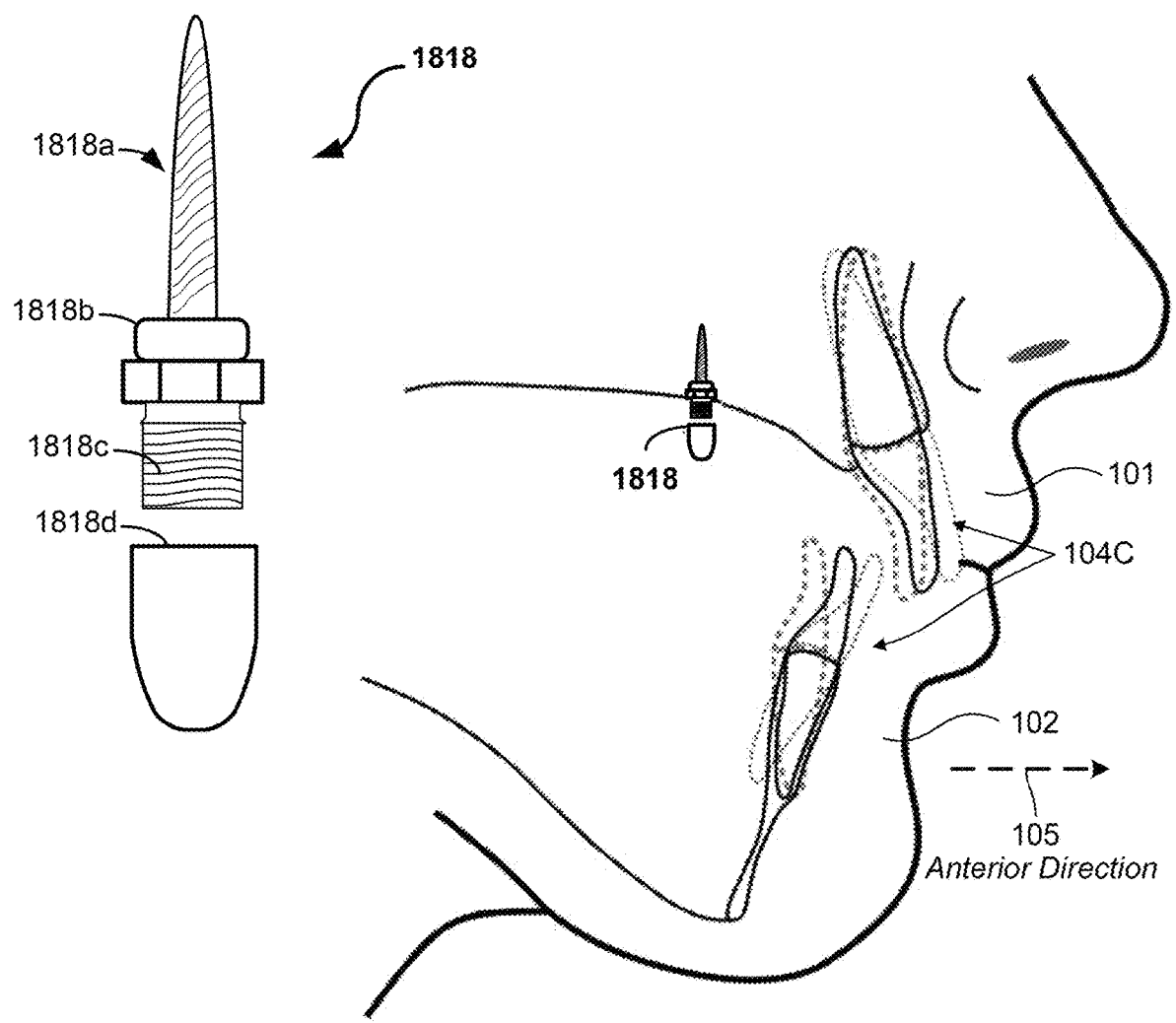
FIG. 18 shows a diagram depicting an example embodiment of the anchorage device in accordance with the present technology.

FIG. 18 shows a diagram depicting an example embodiment of the anchorage device 1818. The anchorage device 1818 includes a threaded tapered portion 1818a that can be inserted into the patient's palatal alveolar bone, e.g., screwed into the bone and the threads can securely hold the anchorage device 1818 to the bone. The anchorage device 1818 includes a head portion 1818c at an end opposite the apex of the threaded tapered portion 1818a. The anchorage device 1818 includes a collar portion 1818b positioned between the threaded tapered portion 1818a and the head portion 1818c. In various embodiments of the anchorage device 1818, like in the example shown in FIG. 18, the collar portion 1818b can include multiple collars to allow different gripping regions for a practitioner to utilize when inserting and/or removing the anchorage device 1818 from the bone. Also, for example, the head portion 1818c can be configured rectangular or cylindrical with a shaped terminus, such as a rectangular block shape shown in the example of FIG. 18. In some embodiments, the anchorage device 1818 includes a cap 1818d that can be removably coupled to the head portion 1818c, e.g., to aid in inserting the anchorage device 1818 into the patient's mouth as well as simplifying the disassembly and removal of the anchorage device 1818 when treatment is complete. In some embodiments, the cap 1818d includes a retention component (not shown) on an inside surface of a cavity that interfaces with the terminus of the head portion 1818c. Furthermore, in some implementations, one or more collars of the collar portion 1818b can interface with eyelets on the main body or the anchoring arms of the disclosed distalizer and/or mesializer devices.

In implementations of the example anchorage device 1818, threaded tapered portion 1818a can be inserted (e.g., driven) into palatal bone by self-tapping, or may utilize a pilot hole. The collar portion 1818b can serve as a stop for anchorage device insertion into soft tissue, e.g., in some implementations. In other embodiments of the anchorage device 1818, there may be no defined collar stop. In the example shown, a polygonal collar functions as a purchase point for a driving wrench or socket to rotate the anchorage device 1818 as it is inserted into palatal bone. In such implementations, the polygonal collar is not inserted into soft tissue. The threads of the threaded tapered portion 1818a can be external or internal to the body of the anchorage device 1818. In some implementations, the head portion 1818c can include threads, e.g., allowing the cap 1818d to be fastened to the head portion 1818c of the anchorage device 1818. Whereas, in some embodiments, the cap 1818d can be also be attached to the anchorage device 1818 via a pressed fit, "O" Ring, clip release, or other mechanism. In various embodiments, for example, the cap 1818d be made of plastic or metal and fabricated in various shapes to optimize engagement of aligner plastic onto the cap to facilitate a tight connection for transference of anchorage by the anchorage device 1818 to aligner(s).

In producing components of the example anchorage device 1818, the shape of the cap 1818*d* may be determined by CAM/CAM software for ideal undercut. For example, an undercut refers to how materials must stretch to fit over an "egg-shaped" contour; and the undercut is considered in order to allow devices to stay in the mouth via retentiveness, but not so tight that the device locks into place and cannot be removed. In various implementations, a cap for an anchorage device, such as the example cap 1818*d*, can be designed for optimal retention by a mild undercut for plastic to snap around to go into place. The degree of undercut built into the cap shape is variable and determined by both aligner path of insertion and aligner plastic rigidity. Alternatively, the cap 1818*d* may be built directly into the anchorage device 1818 as one non-removable unit.

For example, the anchorage device 1818 and its cap complex provide anterior or posterior anchorage for optimizing anterio-posterior force control. Aligner software can instruct preferred, "non-anchored" teeth to preferentially move without reciprocally moving un-preferred, "anchored" teeth. In implementations, for example, multiple anchorage devices 1818 (and their cap 1818*d* complexes/units) can provide purchase points for aligner material to expand or hold the maxilla's dimensions, with placement of an anchorage device on each side of the palate. The anchorage device 1818 thereby provides several unique functionalities for varieties of orthodontic appliances, including plastic aligners, distalizers and/or mesializers, and other devices.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contain many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An apparatus for distalization or mesialization of molars in an upper dental arch of a mouth, comprising:
an apparatus body having an adjustment-drive mechanism, the adjustment-drive mechanism including rotatable shafts operable to move upon an orthodontic adjustment action when the apparatus body is placed within the mouth to actuate the adjustment-drive mechanism;
a first arm coupled to the adjustment-drive mechanism of the apparatus body and attachable to a molar tooth in the upper dental arch;
a second arm coupled to the apparatus body and attachable to a non-molar tooth of the upper dental arch; and
an anchorage device including one or both of a pin and a pad coupled to the apparatus body and attachable to a bone in the mouth,
wherein the first arm is configured to transfer a force onto the molar tooth when the adjustment-drive mechanism is actuated to cause movement of the molar tooth in the upper dental arch in a direction determined by actuation of the adjustment-drive mechanism, and
wherein the anchorage device is operable to positionally stabilize the apparatus body and the second arm to reduce force potentially applied to the non-molar tooth to prevent movement of the non-molar tooth in the upper dental arch,
wherein the adjustment-drive mechanism includes a rack and pinion assembly comprising a first rack and pinion set and a second rack and pinion set configured perpendicular to the first rack and pinion set, where each of the first and second rack and pinion sets has one of the rotatable shafts and a pinion gear at a first end of the rotatable shaft that interfaces with a rack gear having a linear array of rack teeth, wherein, when the rotatable shaft is rotated in a first rotation direction, the adjustment-drive mechanism translates rotational motion of the rotatable shaft into linear motion to generate the force to cause the movement of the molar tooth in the upper dental arch.

2. The apparatus of claim 1, wherein the direction of the movement of the molar tooth is in a posterior direction into the mouth when the adjustment-drive mechanism is actuated for distalization, and wherein the direction of the movement of the molar tooth is in an anterior direction out of the mouth when the adjustment-drive mechanism is actuated for mesialization.

3. The apparatus of claim 1, wherein the adjustment-drive mechanism is directly or indirectly coupled to the first arm and configured to apply a force by adjusting a length or a tension of the first arm that thereby causes the movement of the molar tooth in the upper dental arch.

4. The apparatus of claim 1, wherein the adjustment-drive mechanism further includes a rods assembly, and wherein the apparatus body includes two body portions that can be spaced apart and brought together by the adjustment-drive mechanism, where the rods assembly includes one or more rods disposed within one or more channels of the two body portions, respectively, that span across a separation gap between the two body portions, such that the rods assembly is operable to guide an expansion movement of the two body portions apart from each other across the separation gap.

5. The apparatus of claim 1, comprising:
one or more eyelets coupled to the apparatus body and including an opening to allow the anchorage device to traverse through to attach to the bone in the mouth.

6. The apparatus of claim 1, comprising:
one or more anchoring arms coupled to the apparatus body and to the anchorage device, the one or more anchoring arms spanning outward from the apparatus body and coupled to one or more eyelets, respectively, positioned at an outer end of each of the one or more anchoring arms, wherein the one or more eyelets include an opening to allow the anchorage device to traverse through to attach to the bone in the mouth.

7. The apparatus of claim 1, comprising:
a first attachment article attachable to the molar tooth and coupled to the first arm, and
a second attachment article attachable to the non-molar tooth and coupled to the second arm,
wherein the first attachment article and the second attachment article include at least one of a ring, a hook, a slot with a locking clip, or a plastic aligner.

8. The apparatus of claim 1, comprising:
a third arm coupled to the adjustment-drive mechanism of the apparatus body and attachable to a second molar tooth in the upper dental arch; and
a fourth arm coupled to the apparatus body and attachable to a second non-molar tooth of the upper dental arch,
wherein the apparatus body is configured to be positioned proximate a roof of the mouth,
wherein the third arm is configured to transfer a force onto the second molar tooth when the adjustment-drive mechanism is actuated to cause movement of the second molar tooth in the upper dental arch in the direction determined by actuation of the adjustment-drive mechanism, and
wherein the fourth arm is configured with the apparatus body to be stabilized by the anchorage device to reduce potential force applied to the fourth non-molar tooth to prevent movement of the fourth non-molar tooth in the upper dental arch.

9. The apparatus of claim 8, wherein the direction of the movement of the second molar tooth is in a posterior direction into the mouth when the adjustment-drive mechanism is actuated for distalization, and wherein the direction of the movement of the second molar tooth is in an anterior direction out of the mouth when the adjustment-drive mechanism is actuated for mesialization.

10. The apparatus of claim 1, wherein the adjustment-drive mechanism is configured to cause a lateral movement of the molar tooth in the upper dental arch.

11. An apparatus for distalization or mesialization of molars in an upper dental arch of a mouth, comprising:
an apparatus body having an adjustment-drive mechanism, the adjustment-drive mechanism including rotatable shafts operable to move upon an orthodontic adjustment action;
a set of posterior arms coupled to the adjustment-drive mechanism of the apparatus body and attachable to molar teeth in the upper dental arch, the set of posterior arms comprising (i) a first rigid arm that spans from the apparatus body to a first molar tooth and (ii) a second rigid arm that spans from the apparatus body to a second molar tooth;
a set of anterior arms coupled to the apparatus body and attachable to non-molar teeth in the upper dental arch, the set of anterior arms comprising (i) a third rigid arm that spans from the apparatus body to a first non-molar tooth and (ii) a fourth rigid arm that spans from the apparatus body to a second non-molar tooth; and an anchorage device including one or both of a pin and a pad coupled to the apparatus body and attachable to a bone in the mouth, wherein the set of posterior arms are configured to transfer a force onto the molar teeth when the adjustment-drive mechanism is actuated to cause movement of the molar teeth in the upper dental arch in a direction determined by actuation of the adjustment-drive mechanism, and wherein the anchorage device is operable to positionally stabilize the apparatus body and the set of anterior arms to reduce force potentially applied to the non-molar teeth to prevent movement of the non-molar teeth in the upper dental arch, wherein the adjustment-drive mechanism includes a rack and pinion assembly comprising a first rack and pinion set and a second rack and pinion set configured perpendicular to the first rack and pinion set, where each of the first and second rack and pinion sets has one of the rotatable shafts and a pinion gear at a first end of the rotatable shaft that interfaces with a rack gear having a linear array of rack teeth, wherein, when the rotatable shaft is rotated in a first rotation direction, the adjustment-drive mechanism translates rotational motion of the rotatable shaft into linear motion to generate the force to cause the movement of the molar teeth in the upper dental arch.

12. The apparatus of claim 11, wherein the direction of the movement of the molar teeth is in a posterior direction into the mouth when the adjustment-drive mechanism is actuated for distalization, and wherein the direction of the movement of the molar teeth is in an anterior direction out of the mouth when the adjustment-drive mechanism is actuated for mesialization.

13. The apparatus of claim 11, comprising:
one or more eyelets coupled to the apparatus body and including an opening to allow the anchorage device to traverse through to attach to the bone in the mouth.

14. The apparatus of claim 11, comprising:
one or more anchoring arms coupled to the apparatus body and to the anchorage device, the one or more anchoring arms spanning outward from the apparatus body and coupled to one or more eyelets, respectively, positioned at an outer end of each of the one or more anchoring arms, wherein the one or more eyelets include an opening to allow the anchorage device to traverse through to attach to the bone in the mouth.

15. The apparatus of claim 11, wherein the adjustment-drive mechanism is configured to cause a lateral movement of the molar teeth in the upper dental arch.

16. An apparatus for distalization or mesialization and lateral expansion of molars in an upper dental arch of a mouth, comprising:

an apparatus body having an adjustment-drive mechanism, the adjustment-drive mechanism including rotatable shafts;

a first arm coupled to the adjustment-drive mechanism of the apparatus body and attachable to a molar tooth in the upper dental arch;

a second arm coupled to the apparatus body and attachable to a non-molar tooth of the upper dental arch; and an anchorage device including one or both of a pin and a pad coupled to the apparatus body and attachable to a bone in the mouth, wherein the first arm is configured to transfer a force onto the molar tooth when the adjustment-drive mechanism is actuated to cause movement of the molar tooth in the upper dental arch in a direction determined by actuation of the adjustment-drive mechanism, and wherein the anchorage device is operable to positionally stabilize the apparatus body and the second arm to reduce force potentially applied to the non-molar tooth to prevent movement of the non-molar tooth in the upper dental arch, wherein the direction of the movement of the molar tooth is in a posterior direction into the mouth when the adjustment-drive mechanism is actuated for distalization, and wherein the direction of the movement of the molar tooth is in an anterior direction out of the mouth when the adjustment-drive mechanism is actuated for mesialization, and wherein the adjustment-drive mechanism is configured to cause a lateral movement of the molar tooth in the upper dental arch, wherein the adjustment-drive mechanism includes a rack and pinion assembly comprising a first rack and pinion set and a second rack and pinion set configured perpendicular to the first rack and pinion set, where each of the first and second rack and pinion sets has one of the rotatable shafts and a pinion gear at a first end of the rotatable shaft that interfaces with a rack gear having a linear array of rack teeth, wherein, when the rotatable shaft is rotated in a first rotation direction, the adjustment-drive mechanism translates rotational motion of the rotatable shaft into linear motion to generate the force to cause the movement of the molar tooth in the upper dental arch.

17. The apparatus of claim 16, wherein the adjustment-drive mechanism is directly or indirectly coupled to the first arm and configured to apply a force by adjusting a length or a tension of the first arm that thereby causes the movement of the molar tooth in the upper dental arch.

18. The apparatus of claim 16, comprising:
the pad attachable to a head portion to provide an interface surface for the anchorage device to rest on soft tissue of the mouth.

19. The apparatus of claim 16, wherein the rotatable shafts are shaft operable to move upon an orthodontic adjustment action when the apparatus body is placed within the mouth to actuate the adjustment-drive mechanism.

* * * * *